US006856707B2

(12) United States Patent
Enomoto

(10) Patent No.: US 6,856,707 B2
(45) Date of Patent: Feb. 15, 2005

(54) IMAGE PROCESSING METHOD AND APPARATUS

(75) Inventor: Jun Enomoto, Kanagawa (JP)

(73) Assignee: Fuji Photo Film Co., Ltd., Kanagawa (JP)

(*) Notice: Subject to any disclaimer, the term of this patent is extended or adjusted under 35 U.S.C. 154(b) by 40 days.

(21) Appl. No.: 10/201,895

(22) Filed: Jul. 25, 2002

(65) Prior Publication Data
US 2003/0031375 A1 Feb. 13, 2003

Related U.S. Application Data

(62) Division of application No. 09/301,538, filed on Apr. 29, 1999, now Pat. No. 6,603,885.

(30) Foreign Application Priority Data

Apr. 30, 1998 (JP) .......................................... 10-121263
Aug. 27, 1998 (JP) .......................................... 10-241495
Sep. 16, 1998 (JP) .......................................... 10-261304
Sep. 16, 1998 (JP) .......................................... 10-261305
Sep. 30, 1998 (JP) .......................................... 10-276679

(51) Int. Cl.$^7$ ................................................ G06K 9/36
(52) U.S. Cl. ...................................... 382/277; 382/260
(58) Field of Search ................................ 382/276–279, 382/260–629, 199–200

(56) References Cited

U.S. PATENT DOCUMENTS 6,661,931 B1 * 12/2003 Kawada ...................... 382/276
2002/0191838 A1 * 12/2002 Setterholm .................. 382/154

FOREIGN PATENT DOCUMENTS

| JP | 6-311425 | 11/1994 | |
| JP | 06311425 A | * 11/1994 | .......... H04N/5/243 |
| JP | 9-281613 | 10/1997 | |

* cited by examiner

Primary Examiner—Thomas D. Lee
Assistant Examiner—Stephen Brinich
(74) Attorney, Agent, or Firm—Sughrue Mion, PLLC

(57) ABSTRACT

The image processing method and apparatus acquire input image data from the image recorded optically with a taking lens, acquire the information about the lens used to record the image and perform image processing schemes on the input image data using the acquired lens information, provided that the type of the lens used is identified from the acquired lens information and the intensity of sharpness enhancement of the corresponding image is altered in accordance with the identified lens type. Using the obtained lens characteristics as well as the position information for the recorded image, the input image data is subjected to aberration correction for correcting the deterioration in image quality due to the lens characteristics.

33 Claims, 24 Drawing Sheets

ORIGINAL IMAGE

IMAGE THAT HAS BEEN
CORRECTED FOR LF ABERRATIONS
AND SUBJECTED TO ELECTRONIC
SCALING IN y -DIRECTION $\Delta y$ $YY (= Y \cdot my)$ IMAGE THAT HAS BEEN
CORRECTED FOR LF ABERRATIONS
AND SUBJECTED TO ELECTRONIC
SCALING x -DIRECTION $XX$
$(= X \cdot mx)$ $\Delta x$ $Y$

FIG.22A

ORIGINAL IMAGE

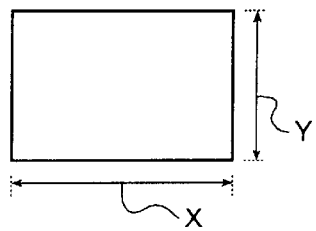

FIG.22B

IMAGE SUBJECTED TO LF ABERRATION CORRECTION AND ELECTRONIC SCALING IN y-DIRECTION

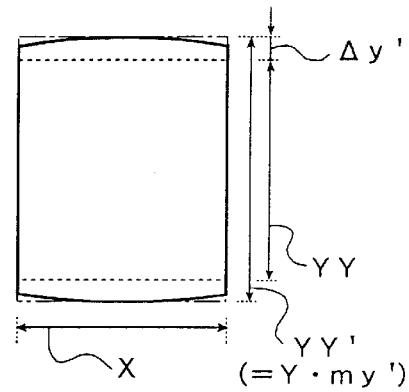

$\Delta y'$, $YY$, $YY'$ $(= Y \cdot my')$

FIG.22C

IMAGE AFTER REMOVAL OF PIXEL LOSSES IN y-DIRECTION

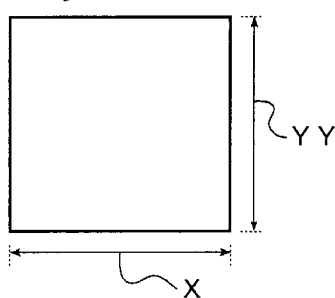

FIG.22D

IMAGE SUBJECTED TO LF ABERRATION CORRECTION AND ELECTRONIC SCALING IN x-DIRECTION

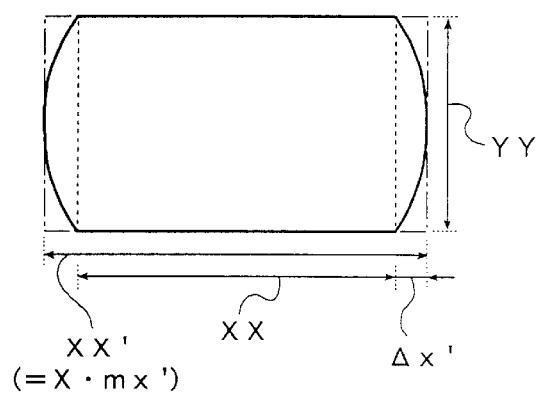

$XX'$ $(= X \cdot mx')$, $XX$, $\Delta x'$

FIG.22E

OUTPUT IMAGE
(IMAGE AFTER REMOVAL OF PIXEL LOSSES IN x-DIRECTION)

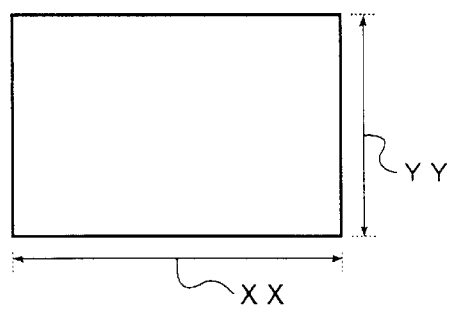

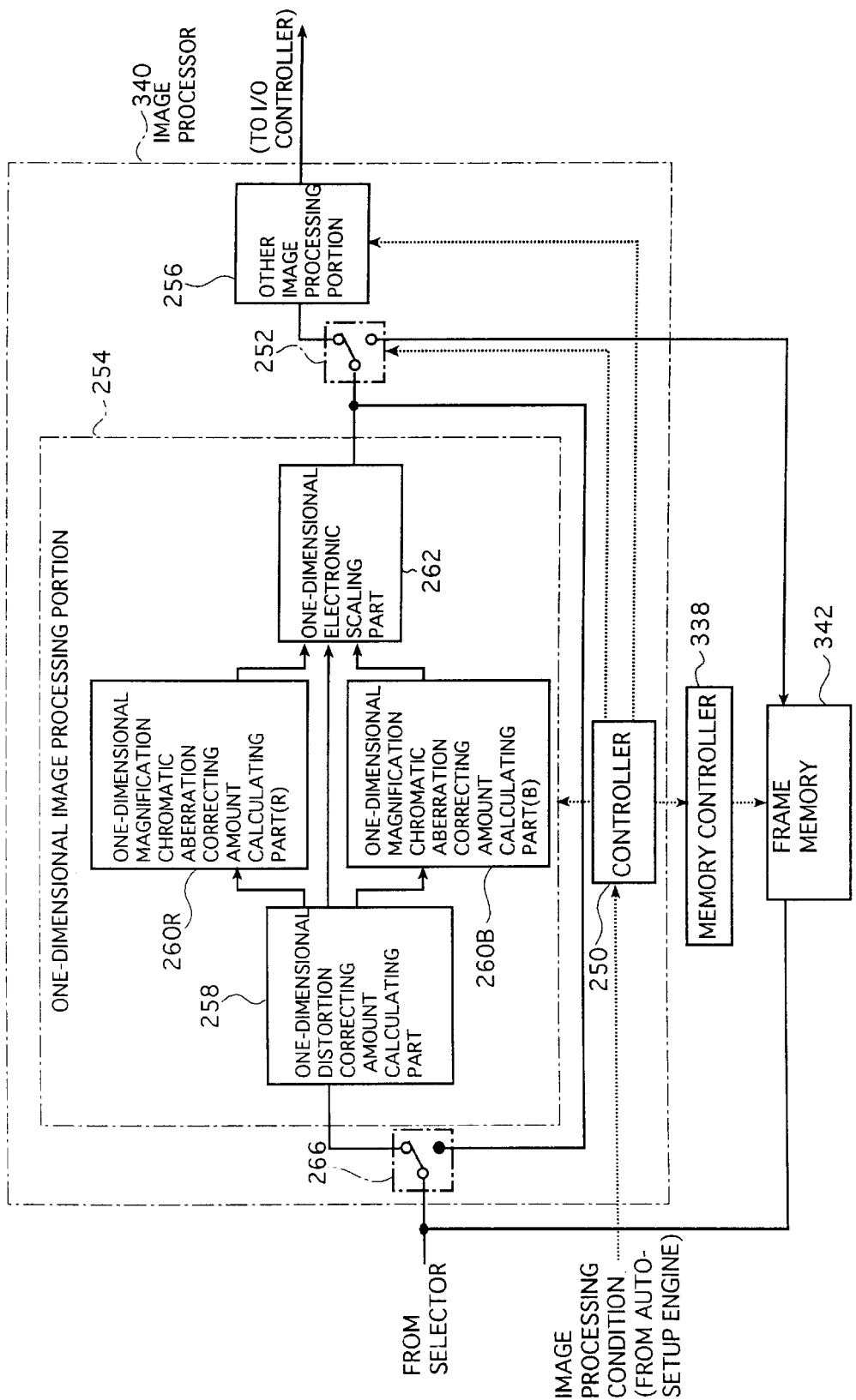

IMAGE PROCESSING METHOD AND APPARATUS

This is a divisional of application Ser. No. 09/301,538 filed Apr. 29, 1999 now U.S. Pat. No. 6,603,885; which is a disclosure of which is incorporated herein by reference.

BACKGROUND OF THE INVENTION

This invention relates to the field of digital image processing method and apparatus technologies. More particularly, the invention relates to image processing methods and image processing apparatus which can apply this image processing methods for typical use with digital photoprinters that read film images photoelectrically to produce prints (photographs) reproducing the images and which are capable of achieving one of the following results: producing a high-quality image even if the input image is taken with low-performance lenses as in films with lens, inexpensive compact cameras and low-cost digital cameras; correcting aberrations such as chromatic aberration of magnification and distortion that develop in the images taken with those low-performance lenses; producing a high-quality image free from the image deterioration due to lens aberrations even if the input image is taken with those low-performance lenses; and particularly performing image processing on the image data representing the image recorded on an image recording medium.

Heretofore, the images recorded on photographic films such as negatives and reversals (which are hereunder referred to simply as "films") have been commonly printed on light-sensitive materials (photographic paper) by means of direct (analog) exposure in which the film image is optically projected onto the light-sensitive material to achieve its areal exposure.

A printer which relies upon digital exposure has recently been commercialized as a digital photoprinter, in which the image recorded on a film is read photoelectrically, converted to digital signals and subjected to various image processing operations to produce image data for recording purposes; recording light that has been modulated in accordance with the image data is used to scan and expose a light-sensitive material to record a latent image, which is subsequently developed to produce a finished print (photograph).

In the digital photoprinter, images are handled as digital image data and the exposing conditions for printing can be determined by image (data) processing. Hence, processing operations such as the correction of washed-out highlights or flat (dull) shadows due to the taking of pictures with rear light or an electronic flash and sharpness enhancement (sometimes referred to simply as "sharpening") can be effectively performed to produce prints of the high quality that has not been attainable by the conventional direct exposure technique. In addition, the synthesizing of images and characters can be accomplished by image (data) processing and, as a result, prints can be output after editing and/or processing operations have been performed freely in accordance with specific uses.

Aside from the images recorded on films, the digital photoprinter can also output prints of images recorded with digital cameras or processed with computers. Other than being output as prints, images can be supplied to computers and so forth or stored in recording media such as floppy disks; hence, the image data can be put to various non-photographic uses.

Having these features, the digital photoprinter is basically composed of the following units: a scanner (image reading apparatus) that illuminates the film with reading light and captures the projected light to read the image on the film photoelectrically; an image processing apparatus that performs specified image processing on the image data captured with the scanner or the image data supplied from a digital camera or the like, thereby producing image data for image recording and exposing conditions; a printer (image recording apparatus) that scans and exposes a light-sensitive material to record a latent image on it, for example, by scanning with optical beams in accordance with the image data output from the image processing apparatus; and a processor (developing apparatus) that performs development processing on the printer exposed light-sensitive material to produce a print reproducing the input image.

Users in general who intend to take ordinary pictures seldom use expensive, high-performance cameras such as a single-lens reflex camera but they normally use so-called "compact cameras" that are inexpensive and which are capable of automatic exposing and focusing. Most recently, there are a lot of users who prefer using so-called "films with lens" by the reason of easy handling.

In cameras such as a single-lens reflex camera that needs a cost to some extent, high-precision lens elements are used, and a plurality of lens elements are combined to record images of very high quality.

In contrast, films with lens and inexpensive compact cameras cannot afford the use of costly lenses and only one or two lens elements may be adopted. With such lens design, images of adequate quality cannot be taken and the image reproduced on prints does not necessarily have high quality.

If the image recorded on films is deteriorated in quality, there is a case that the quality of the output image on prints cannot be adequately improved by the aforementioned corrections. Major causes of the deterioration of the image reproduced from films to be output on prints are lens aberrations such as "chromatic aberration of magnification" and "distortion" that originate from the low performance of the lenses mounted in the camera used to take the input image.

Color images are formed of three primary colors, for example, red (R), green (G) and blue (B). The refractive index (imaging magnification) of a lens, even if it is a single element, varies subtly with wavelength and differing refractive indices occur with R, G and B lights. In other words, even though the same position in a particular scene, a focused position on a film are slipped off and differ among the R, G and B lights. This is the phenomenon generally called "chromatic aberration of magnification" and the image reproduced from the film has a definite color divergence.

In order to obtain a satisfactory and appropriately recorded image, a plane of a scene of interest that is perpendicular to the optical axis must be focused on the same plane as the imaging plane perpendicular to the optical axis. In fact however, ordinary lenses have the imaging plane displaced along the optical axis and the resulting displacement of the focused position in the axial direction causes a distortion of the focused object. As a natural consequence, the reproduction of the image on the film is distorted.

Other causes of the image deterioration are the reduction of the brightness at the edge of image field which means a phenomenon in which the peripheral area of the image looks darker than the central area which is closer to the optical axis corresponding to the performance of the lens used, and the point spread function (PSF) which is attributable to differing focal positions in the plane of the film.

As noted above, if one uses a camera such as a single-lens reflex camera that needs a cost to some extent, high-precision lens elements may be used and a plurality of lens elements combined to correct various aberrations including chromatic aberration of magnification, distortion, deterioration of marginal lumination and PSF and an appropriate image can be recorded on the film.

However, cameras such as films with lens and compact cameras required to be a low cost can not use high-cost lenses and aberrations will develop in the images recorded on films. As a result, the images reproduced on prints will eventually have color divergence and distortion.

To deal with this problem of image deterioration involving the difficulty in improving the quality of output images on prints, techniques have been proposed in connection with image processing methods and apparatus that correct image aberrations in accordance with the characteristics of lens aberrations that are obtained via certain image acquisition means and two typical examples of such technology are disclosed in Unexamined Published Japanese Patent Application (kokai) Nos. 311425/1994 and 281613/1997, the latter being assigned to the present Applicant. According to these patents, the proposed technology can correct aberrations due to lenses and prevent the deterioration of image quality in the marginal area, thereby ensuring the production of high-quality images at all times.

Specifically, Unexamined Published Japanese Patent Application (kokai) No. 281613/1997 proposes a process of correcting the problem of deterioration of marginal lumination in a photographic processing apparatus and method. In the process, the quantity of light $f(i,j)$ on an image in a given pixel position $(i,j)$ is multiplied by a correction coefficient $g(i,j)$ based on lens characteristics and the obtained product $f'(i,j)$ is substituted as the corrected quantity of light in the pixel position $(i,j)$. To make the correction for the entire part of the image, j is first moved with i held constant and then i is moved, or alternatively, i is first moved with j held constant and then j is moved; in either way, the whole image can be corrected. When correcting distortion and chromatic aberration of magnification by this method, the position of the subject in an image of interest is changed so that a huge frame memory is required to store the information about all pixel positions of not only before correction but also after the correction. In addition, a circuit is necessary that performs two processing schemes for i and j as described above and this not only increases the cost of the apparatus but also causes a significant drop in the correction speed, thus there is a problem the practical use of the apparatus is difficult.

On the other hand, unexamined Published Japanese Patent Application (kokai) No. 311425/1994 discloses an image correcting apparatus capable of rapid image correction in accordance with the characteristics of lens aberrations. In this apparatus, the subjects of the correction are the amount of defocusing, the decrease in the quantity of light, and the degree of unsharpness in the hue and chromas of a color image. According to the disclosure, a quantity of deterioration in each of these correction subjects increases as it goes from the center of the image to the peripheral area so that the data of specified patterns that are increased as going from the center toward the peripheral in an image area that is formed by concentric circles or squares extending radially outward from the center of the image are only used for each of given lens characteristics as correction enhancement coefficients for correcting these correction subjects. This approach is capable of rough correction but not image corrections aberrant from the patterns that is prepared beforehand. Hence, there is a problem that it is impossible to perform appropriate corrections according to the characteristics of individual taking lenses.

If one wants to accomplish the appropriate correction by this technology, correction enhancement coefficients must be made available for all patterns that are predicted for the given lens characteristics and to meet this need, a memory of sufficiently large capacity is required. What is more, if the available patterns are not simple concentric circles or squares whose center coincides with that of the image, an increased amount of data has to be calculated to correct matrices and the overall image processing speed is lowered. These practical problems with cost and processing speed are particularly serious in the case of print services that involve the volume reproduction of images.

As mentioned hereinabove, an image processing system is conventionally known that is able to perform various image processing schemes on the image data obtained by reading the film image recorded on photographic films or on the image data input from a digital camera or the like and which then outputs an image in various output modes such as by recording the image on recording materials such as photographic paper or storing the image data in information recording media. Compared to a conventional photographic processing system that records the film image by areal exposure, the image processing system just described above can control the output image quality by image processing onto the image data, thereby output images of high quality are realized.

Speaking of films with lens, the lens is usually composed of an inexpensive plastic lens that inevitably suffers from great amounts of aberrations such as distortion and chromatic aberration of magnification. Hence, the film image recorded on a photographic film by exposure with the film with lens has a comparatively high level of geometric distortion according to the lens distortion (so-called "pincushion-type distortions) as typically shown in FIG. 25A (FIGS. 25A and 25B illustrate how an image consisting of multiple lines in a grid pattern appears if it is recorded on a photographic film by shooting with a film with lens); at the same time, a color divergence occurs at a comparatively high level due to chromatic aberration of magnification. To deal with this problem, distortion correction for correcting the geometric distortion of an image due to the distortion of the lens on the film with lens and magnification chromatic aberration correction for correcting the color divergence in an image due to the chromatic aberration of magnification of the same lens are being review in order to ensure that the image processing system described above can produce an output image of high quality from the original (input) image recorded with the film with lens.

With a view to increasing the speed of the various processing schemes to be performed with the above-mentioned image processing system, the contents of image processing and the value of a parameter to be applied in a specific image processing scheme have been set identical in specified directions, such as vertical and horizontal, of the image represented by the image data. For instance, if the image processing to be done is electronic scaling, the electronic scaling ratio is set identical in both the vertical and horizontal directions of the image represented by the image data to be processed.

What is unique about image data is that its volume is tremendous and that it represents an image having a two-dimensional extent. Hence, image processing schemes such as ones for correcting distortion and chromatic aberration of magnification are so much complicated in contents that they not only take prolonged time but also require storage means of large capacity. As a result, the image processing section capable of performing image processing schemes such as the correction of distortion and chromatic aberration of magnification is considerably complicated in configuration and, what is more, the processing performance of the image processing system is eventually deteriorated.

Consider, for example, the correction of distortion. First, distortion correcting data representing the direction and the amount of the shift in the position of each of the pixels in the original film image due to the distortion of a lens, as referenced to the inherent position of each pixel (the position of its grid point) composing the film image, are preliminarily measured and stored for each of the lens types used; given the image data to be processed, the distortion correcting data associated with the lens type used in actual shooting are captured; on the basis of the captured distortion correcting data, the positions of the pixels represented by their data in the case where no distortion is present are evaluated; and the density value at the inherent position of a particular pixel (the position of its grid point) is determined by arithmetic interpolation. Among the steps described above, arithmetic interpolation of the density values at grid points requires arithmetic estimation of the density value in the position of a particular grid point from the density values of a plurality of pixels surrounding said grid point (i.e., the pixels within a region having a two-dimensional extent, with the grid point lying in the center) should be repeated for the two-dimensional distribution of the multiple grid points that are to be processed. Obviously, this involves quite complicated procedures.

As is clear from the above, the distortion correction involves the shift of the pixel positions represented by the yet to be corrected image data and, hence, the shape of the outer edge of the image represented by the as-corrected image data also changes from a rectangular to a non-rectangular form (such as a barrel or pincushion shape) as the result of the aforementioned aberration (distortion) correction. Consider, for example, the case of correcting an image which, due to distortion, has suffered from a "pincushion-type" geometric distortion as shown in FIG. 25A. After the correction, the figure of the outer edge of the image represented by the corrected image data is "barrel-shaped" as shown in FIG. 25B. On the other hand, images generally have rectangular outer edges. Therefore, if the distortion corrected image data is simply output, blanks or regions having indeterminate density values occur in some areas of the output image (blanks or so-called "pixel holes" that appear in areas near the four corners of the image shown in FIG. 25B). The same defect occurs in the correction of chromatic aberration of magnification since it also involves the shift of pixel positions although it is very small.

As already mentioned, the content of image processing and the value of a parameter to be applied to a specific image processing scheme in the conventional image processing system have been set identical in specified directions, such as vertical and horizontal, of the image represented by image data. Hence, it has been impossible to perform different image processing schemes in different directions and this has reduced the latitude in the overall image processing operation.

Take, for example, the aforementioned case of performing electronic scaling with the conventional image processing system, in which the electronic scaling ratio is set to be identical in both the vertical and horizontal directions. In this situation, it has been impossible to perform a special image processing scheme such as a so-called "finish to slender" technique by which a human subject in the original image is finished to appear slender on the principal image.

SUMMARY OF THE INVENTION

The present invention has been accomplished under these circumstances and has as a first object providing an image processing method and apparatus that can output prints (photographs) of high quality reproducing high-quality images even if the original image has been taken with inexpensive cameras such as films with lens and compact cameras or taken with inexpensive digital cameras.

A second object of the invention is to provide a digital image processing method and apparatus which, by image processing, can correct the image aberrations due to poor lens performance (the deterioration in image quality due to lens aberrations) so that high-quality images free from distortion, color divergence and other defects can be output consistently without regard to the shooting magnification (focal length) even if the original image has been taken with inexpensive cameras such as films with lens and compact cameras or taken with inexpensive digital cameras.

A third object of the invention is to provide a digital image processing method and apparatus which, by image processing, can correct the image aberrations due to poor lens performance (the image deterioration due to lens aberrations) so that high-quality images free from distortion, color divergence and other defects can be output even if the original image has been taken with inexpensive cameras such as films with lens and compact cameras or taken with inexpensive digital cameras.

A fourth object of the invention is to provide an image processing method and apparatus which are capable of rapidly correcting aberrations such as distortion and chromatic aberration of magnification so that high-quality images free from distortion, color divergence and other defects can be produced at lower cost even if the original image has been taken with inexpensive cameras such as films with lens and compact cameras or taken with inexpensive digital cameras.

A fifth object of the invention is to provide an image processing method and apparatus that adopt a simple configuration and which can yet perform high-speed image processing on the image data with a higher degree of flexibility.

As already mentioned, films with lens and compact cameras do not justify the use of costly lenses, so they are unable to shoot images of sufficient quality to guarantee finished prints of high quality that reproduce high-quality images. To correct such image quality deteriorations due to poor lens performance, in particular, blurred images, the phase of the image has to be taken into account, namely, an inverse transform of PSF must be performed. However, this approach requires a bulky processing circuit and involves complicated processing procedures.

The present inventor made intensive studies in order to solve the aforementioned problems with the images taken with inexpensive cameras such as films with lens and found that by altering the intensity of sharpness enhancement processing (sharpening), particularly by performing more intense sharpening than in the usual case (in a default condition), prints of adequate image quality that were compensated for defocusing could be produced without difficult-to-perform PSF correction. The inventor also found that using an apparatus having a capability for sharpness enhancement, he could simply alter the intensity of the sharpening process to compensate for the deterioration in image quality due to poor lens performance without increasing the cost of finished products and so forth. The present invention has been accomplished on the basis of these findings.

In order to attain the first object described above, an image processing method of the present invention comprises the steps of: acquiring input image data from an image recorded optically with a lens for taking a picture; acquiring an information about the lens used to record the image; and performing image processing schemes including at least sharpness enhancement on the input image data using the acquired information about the lens to produce output image data; wherein a type of the lens used is identified from the acquired information about the lens and an intensity of the sharpness enhancement of the corresponding image is altered in accordance with the identified type of the lens.

In this case, it is preferable that the intensity of the sharpness enhancement is altered uniformly for an entire part of the image in one frame or, alternatively, the image in the one frame is divided into a plurality of image areas and the intensity is altered for each of the divided image areas.

Preferably, the intensity of the sharpness enhancement is altered independently for each of three primary colors or altered uniformly for the three primary colors.

In the above-described image processing method, it is also preferable that a type of a film on which the image is recorded is further acquired and the intensity of the sharpness enhancement is altered in accordance with not only the type of the lens but also the acquired type of the film.

In the above-described image processing method, it is further preferable that lens characteristics of the taking lens are further acquired from the lens information and using the acquired lens characteristics and a position information for the recorded image, the sharpness enhancement is performed on the input image data at different intensities on a pixel basis.

In the above-described image processing method, it is still further preferable that lens characteristics of the taking lens are further acquired from the lens information and using the acquired lens characteristics and a position information for the recorded image, the input image data for the image taken with the lens of the type requiring a change in the intensity of the sharpness enhancement is also subjected to aberration correction for correcting deterioration in image quality derived from the lens characteristics.

Preferably, the aberration correction is for correcting at least one of distortion, chromatic aberration of magnification, deterioration of marginal lumination, and defocusing derived from the lens characteristics.

Preferably, the defocusing is corrected by subjecting the sharpness enhancement to the input image data at different intensities on a pixel basis using the lens characteristics and the position information for the recorded image.

In the above-described image processing method, it is preferable that lens characteristics of the taking lens are further acquired from the lens information and using the acquired lens characteristics and a position information for the recorded image, at least one of aberration correction for correcting deterioration in image quality derived from the lens characteristics, electronic scaling and sharpness enhancement at different intensities on a pixel basis as the sharpness enhancement is performed on the input image data as one of the image processing schemes.

In the above-described image processing method of the first aspect, it is preferable that an information about the focal length effective at a time of recording the image is further acquired in addition to the lens information and lens characteristics of the taking lens are acquired from the lens information, and using the acquired lens characteristics, a position information for the recorded image and the information about the focal length, the input image data is subjected to aberration correction for correcting deterioration in image quality derived from the lens characteristics. Here, in this image processing method, it is also preferable that an information about a diaphragm used to record the image is further acquired and taking account into the obtained diaphragm information, correction of deterioration of marginal lumination is performed on the input image data as the aberration correction. Preferably, the lens characteristics of the taking lens are calculated in terms of the focal length effective at the time of recording the image using lens characteristics of the taking lens obtained previously at a plurality of focal lengths.

In the above-mentioned image processing of the first aspect, it is preferable that lens characteristics of the taking lens are further acquired from the lens information and using the acquired lens characteristics and a position information for the recorded image, the input image data is subjected to the image processing schemes in a first direction of the recorded image and a second direction crossing the first direction. Here, it is also preferable that the image processing schemes include at least one of correction of aberrations derived from the taking lens, electronic scaling and the sharpness enhancement. Preferably, the image processing schemes are performed in the first and second directions independently of each other. Preferably, an order of the image processing schemes is selectable in the first and second directions. In the above-described image processing method, it is further preferable that unidirectional image processing is further performed in at least one of the first and second directions. Preferably, contents of the image processing schemes are altered in each of the first and second directions. Preferably, alteration of the contents of the image processing schemes is change in values of parameters in the image processing schemes in each of the first and second directions.

Preferably, if the image processing schemes include at least correction of distortion and chromatic aberration of magnification, either an amount of correction of the chromatic aberration of magnification or an amount of correction of the distortion or both amounts differ between the first and second directions. Preferably, if the image processing schemes include at least correction of distortion and chromatic aberration of magnification, the correction in whichever of the first and second directions that requires the chromatic aberration of magnification and the distortion to be corrected in smaller amounts precedes the correction in the other direction. Preferably, if the input image data is acquired by reading photoelectrically the recorded image with line sensors that have the first direction as a main scanning direction and the second direction as an auxiliary scanning direction, the image processing schemes in the second direction further including correction of color divergence caused by the line sensors.

Moreover, in the above-described image processing method of the first aspect, if the image processing schemes include aberration correction for correcting aberrations in the image derived from the taking lens, preset parameters for correcting the aberrations which the taking lens used to record the image causes in a plane where the image is focused are scaled with at least one of an electronic scaling ratio for producing the output image data, number of input pixels in the input image data, a size of the input image and a size of the output image to produce aberration correction parameters that are related to the output image data on a pixel basis, and then is performed using the aberration correction to correct the aberrations in the image derived from the taking lens.

In order to attain the first object described above, an image processing apparatus of the first aspect of the present invention that acquires input image data from an image recorded optically with a lens for taking a picture and performs image processing schemes on the input image data to produce output image data, and which comprises: first acquisition means for acquiring a lens information about the taking lens used to record the image; identifying means for identifying a lens type from the acquired lens information; and image processing means for performing at least sharpness enhancement of the image; wherein the image processing means alters an intensity of the sharpness enhancement of the corresponding image in accordance with an identification result of the lens type by the identifying means.

In this aspect, it is preferable that the image processing means comprises not only sharpness enhancing means for performing the sharpness enhancement on the image but also storage means for storing lens characteristics related to the lens type and aberration correcting means for receiving the lens characteristics of the corresponding lens type and correcting deterioration in image quality of the image based on a position information of the image and the lens characteristics, wherein correction the deterioration of the image quality by the aberration correcting means is also performed on the image that alters the intensity of the sharpness enhancement.

Preferably, the aberration correcting means corrects at least one of distortion, chromatic aberration of magnification and deterioration of marginal lumination derived from the lens characteristics.

Preferably, the image processing means performs the sharpness enhancement by the sharpness enhancing means after the correction of the image quality deterioration by the aberration correcting means.

Preferably, the aberration correcting means corrects the chromatic aberration of magnification and the distortion derived from the lens characteristics or further the deterioration of the marginal lumination derived from the lens characteristics, and wherein the aberration correcting means assigns one of three primary colors as a reference color, calculates offsets in image positions of the other colors from the image position of the reference color derived from the chromatic aberration of magnification, uses the offsets derived from the chromatic aberration of magnification and the offset in the image position of the reference color derived from the distortion to calculate appropriate positions of the respective images as corrected not only for the distortion but also for the chromatic aberration of magnification, and corrects the image quality deterioration based on the appropriate positions of the respective images or uses the appropriate positions of the respective images to correct the image quality deterioration and perform electronic scaling.

Preferably, the lens type that requires change in the intensity of the sharpness enhancement of the image is the lens of a film with lens.

Preferably, the image processing means alters the intensity of the sharpness enhancement uniformly for an entire part of the image in one frame or divides the image in the one frame into a plurality of image areas and alters the intensity for each of the divided image areas.

Preferably, the image processing means alters the intensity of the sharpness enhancement independently for each color of three primary colors or uniformly for each color of the three primary colors.

Preferably, the image processing means further alters the intensity of the sharpness enhancement in accordance with a film type.

It is preferable that the above-described image processing apparatus of the first aspect further comprises: second acquisition means for acquiring an information about a focal length of the taking lens effective at the time of recording the image if the taking lens used to record the image is a lens of variable focal length; wherein the image processing means comprises storage means for storing lens characteristics of the taking lens used to record the image and aberration correcting means for acquiring the lens characteristics of the corresponding lens from the storage means in accordance with the lens information acquired by the first acquisition means and correcting aberrations in the image derived from the taking lens used to record the image using the acquired lens characteristics, the position information of the image and the information about the focal length of the taking lens acquired by the second acquisition means. In this case, it is also preferable that when the aberration correcting means corrects deterioration of marginal lumination, the second acquisition means further acquires an information about the diaphragm used at the time of image recording and the aberration correcting means additionally uses the diaphragm information to correct the deterioration of the marginal lumination. Preferably, the storage means stores, as the lens characteristics, the lens characteristics at a plurality of focal lengths of the lens and the aberration correcting means calculates the lens characteristics at the plurality of the focal lengths in terms of the focal length effective at the time of the image recording that was acquired by the second acquisition means to determine the lens characteristics of the lens at the focal length effective at the time of the image recording. Preferably, the aberration correcting means assigns one of three primary colors as a reference color, calculates offsets in image positions of the other colors from the image position of the reference color derived from the chromatic aberration of magnification, uses the offsets derived from the chromatic aberration of magnification and the offset in the image position of the reference color derived from the distortion to calculate appropriate positions of the respective images as corrected for both the distortion and the chromatic aberration of magnification, and corrects the distortion and the chromatic aberration of magnification based on the appropriate positions or uses the appropriate positions to perform electronic scaling.

It is further preferable that the above-described image processing apparatus of the first aspect further includes storage means for storing lens characteristics of the taking lens in accordance with the lens information about the taking lens and wherein the image processing means has bi-directional image processing means for performing the image processing schemes on the input image data in a first direction of the recorded image and a second direction crossing the first direction, using an information about pixel positions of an input image and the characteristics of the related taking lens as read from the storage means in accordance with the taking lens information acquired by the first acquisition means. Preferably, the bi-directional image processing means has at least one of a first and a second distortion correcting part that correct distortion in the first and second directions, respectively; a first and a second magnification chromatic aberration correcting part that correct chromatic aberration of magnification in the first and second directions, respectively; a first and a second marginal lumination deterioration correcting part that correct deterioration of marginal lumination in the first and second directions, respectively; a first and a second defocusing correcting part that correct defocusing in the first and second directions, respectively; a first and a second electronic scaling part that perform electronic scaling in the first and second directions, respectively; and a first and a second sharpening part that perform sharpness enhancement in the first and second directions, respectively. Preferably, the bi-directional image processing means has a first image processing part and a second image processing part that perform image processing schemes independently of each other in the first and second directions, respectively. Preferably, the bi-directional image processing means is capable of selecting an order of the image processing schemes that are performed by the first and second image processing parts. It is still further preferable that the above-described image processing apparatus further includes uni-directional image processing means for performing unidirectional image processing in at least one of the first and second directions. preferably, if the input image data is acquired by line sensors that read the image recorded on the film, the unidirectional image processing means has a color divergence correcting part that corrects the color divergence derived from the line sensors.

It is preferable that the above-described image processing apparatus further includes control means for altering contents of the image processing schemes in each of the first and second directions. Preferably, the control means alters the contents of the image processing schemes by changing a kind or degree of the image processing schemes. Preferably, the control means alters the contents of the image processing schemes by changing values of parameters in the image processing schemes in each of the first and second directions. Preferably, the parameters in the image processing schemes are at least one of a filter coefficient of a filter used; a correction coefficient for correction of distortion; a correction coefficient for the correction of chromatic aberration of magnification; a correction coefficient for correction of deterioration of marginal lumination; a correction coefficient for correction of defocusing; an electronic scaling ratio; and a coefficient of the sharpness enhancement.

Preferably, if the bi-directional image processing means includes at least a distortion correcting part and a magnification chromatic aberration correcting part, either an amount of correction of chromatic aberration of magnification or an amount of correction of distortion or both amounts in the distortion and magnification chromatic aberration correcting parts differ between the first and second directions. Preferably, if the bi-directional image processing means includes at least a distortion correcting part and a magnification chromatic aberration correcting part, correction in whichever of the first and second directions that requires the chromatic aberration of magnification and distortion to be corrected in smaller amounts precedes the correction in the other direction. It is preferable that if the input image data is acquired by photoelectric reading of the recorded image with line sensors that have the first direction as a main scanning direction and the second direction as an auxiliary scanning direction, the image processing apparatus described above further includes a color divergence correcting part that corrects the color divergence derived from the line sensors in the second direction.

It is preferable that the above-described image processing apparatus of the first aspect further includes storage means for storing parameters for correcting aberrations which the lens used to record the image causes in an imaging plane where the image is focused and the image processing means further includes: selection means for selecting a parameter which corrects the aberrations that the related taking lens causes on the imaging plane from the storage means in accordance with the lens information acquired by the first acquisition means; conversion means by which the parameter for correcting the aberrations on the imaging plane as selected by the selection means is scaled with at least one of an electronic scaling ratio for producing the output image data, number of input pixels in the input image data, size of an input image and the size of the output image, whereby the parameter is converted to an aberration correcting parameter that is related to the output image data on a pixel basis; and aberration correcting means which corrects the aberrations of the image derived from the image taking lens using the thus obtained, pixel-dependent aberration correcting parameter. Preferably, the image is one that is recorded on a photographic film and the size of the input image is equal to the size of the image as it is read from the photographic film.

In order to attain the second object described above, an image processing method of the second aspect of the resent invention that acquires not only input image data from an image recorded optically with a taking lens but also a lens information about the taking lens used to record the image and which performs image processing schemes on the input image data using the obtained lens information, thereby producing output image data, and which comprises the steps of: acquiring not only an information about focal length effective at the time of recording the image but also lens characteristics of the taking lens from the lens information; and correcting aberrations in the image derived from the taking lens used to record the image using the obtained lens characteristics, a position information for the recorded image and the information about the focal length.

Preferably, the aberrations comprise at least one of chromatic aberration of magnification, distortion, deterioration of marginal lumination and defocusing. It is preferable that the above-described image processing method further comprises steps of acquiring an information about a diaphragm used to record the image and correcting deterioration of marginal lumination of the input image data as the aberration taking account of the diaphragm information. Preferably, the characteristics of the taking lens are calculated in terms of the focal length effective at image recording using preliminarily obtained lens characteristics of the taking lens at a plurality of focal lengths. Preferably, the correction of aberrations includes distortion and chromatic aberration of magnification and comprises the steps of assigning one of three primary colors as a reference color, calculating offsets in image positions of the other colors from the image position of the reference color derived from the chromatic aberration of magnification, calculating appropriate positions of the respective images as corrected for both the distortion and the chromatic aberration of magnification by using the offsets derived from the chromatic aberration of magnification and the offset in the image position of the reference color derived from the distortion, and performing either the correction of the distortion and the chromatic aberration of magnification or electronic scaling or both by using the appropriate positions.

In order to the second object described above, an image processing apparatus of the second aspect of the present invention which acquires input image data from the image recorded optically with a taking lens of variable focal length and performs image processing schemes on the input image data to produce output image data, and which comprises: first acquisition means for acquiring an information about the taking lens used to record the image, second acquisition means for acquiring an information about the focal length of the taking lens effective at the time of recording the image, storage means for storing lens characteristics of the lens used to record the image, and aberration correcting means which, in accordance with the lens information acquired by the first acquisition means, obtains the lens characteristics of the corresponding lens from the storage means and which uses the obtained lens characteristics, a position information for the image and the information about the focal length of the lens acquired by the second acquisition means, thereby correcting the aberrations in the image derived from the taking lens used to record the image.

In this case, it is preferable that the aberrations comprise at least one of chromatic aberration of magnification, distortion, deterioration of marginal lumination and defocusing.

Preferably, if the aberration correcting means is to correct deterioration of marginal lumination, the second acquisition means also acquires an information about a diaphragm used to record the image and the aberration correcting means corrects the marginal lumination deterioration taking account of the diaphragm information.

Preferably, the storage means stores, as the lens characteristics, characteristics of the lens at a plurality of focal lengths and the aberration correcting means calculates the lens characteristics at the plurality of focal lengths in terms of the focal length effective at the time of recording the image that was acquired by the second acquisition means, thereby determining the lens characteristics of the lens at the focal length effective at the time of image recording.

Preferably, the aberration correcting means assigns one of three primary colors as a reference color, calculates offsets in image positions of the other colors from the image positions of the reference color derived from chromatic aberration of magnification, calculates the appropriate positions of the respective images as corrected for both distortion and chromatic aberration of magnification by using the offsets derived from chromatic aberration of magnification and the offset in the image position of the reference color derived from distortion, and corrects the distortion and chromatic aberration of magnification based on the appropriate positions or performs electronic scaling by using the appropriate positions.

In order to attain the third object described above, an image processing method of the third aspect of the present invention which acquires input image data from an optically recorded image and performs image processing schemes on the input image data to produce output image data, and which comprises the steps of: scaling preset parameters for correcting the aberrations which the lens used to record the image causes in the plane where the image is focused by means of at least one of an electronic scaling ratio for producing the output image data, number of input pixels in the input image data, a size of the input image and a size of the output image to produce aberration correction parameters that are related to the output image data on a pixel basis; and correcting the aberrations in the image derived from the lens used to record the image by using the aberration correction parameters on the pixel basis.

In order to attain the third object described above, an image processing apparatus of the third aspect of the present invention which acquires input image data from an optically recorded image and performs image processing schemes on the input image data to produce output image data, and which comprises: acquisition means for acquiring an information about taking lens used to record the image; storage means for storing parameters for correcting the aberrations which the lens used to record the image causes in an imaging plane where the image is focused; selection means by which a parameter for correcting the aberrations which the related lens causes on the imaging plane is selected from the storage means in accordance with the lens information acquired by the first acquisition means; conversion means by which the parameter for correcting the aberrations on the imaging plane as selected by the selection means is scaled with at least one of an electronic scaling ratio for producing the output image data, number of input pixels in the input image data, a size of the input image and a size of the output image, whereby the parameter is converted to an aberration correcting parameter that is related to the output image data on a pixel basis; and aberration correcting means which corrects the image aberrations derived from the image taking lens by using the aberration correcting parameter on the pixel basis converted by the conversion means.

In this aspect, it is preferable that the image is one that is recorded on a photographic film and the size of the input image is equal to a size of the image as it is read from the photographic film. Preferably, the aberration comprises at least one of chromatic aberration of magnification, distortion, deterioration of marginal lumination and defocusing.

In order to attain the fourth object described above, an image processing method of the fourth aspect of the present invention comprises the steps of: acquiring not only input image data from the image recorded optically with a taking lens but also an information about the taking lens used to record the image; obtaining lens characteristics of the taking lens from the acquired lens information; and performing image processing schemes on the input image data by using the obtained lens characteristics and a position information for the recorded image; wherein the input image data is subjected to the image processing schemes a first direction of the recorded image and a second direction crossing the first direction. Preferably, the image processing schemes include at least one of correction of aberrations derived from the taking lens, electronic scaling and sharpening. Preferably, the correction of the aberrations includes at least one of distortion, chromatic aberration of magnification, deterioration of marginal lumination, and defocusing. Preferably, the image processing schemes are performed in the first and second directions independently of each other. Preferably, an order of the image processing schemes is selectable in the first and second directions. It is preferable that the above-described image processing method further comprises the step of performing unidirectional image processing in at least one of the first and second directions. Preferably, when the input image data is acquired by line sensors that read the image recorded on a film, the unidirectional image processing is color divergence correction that corrects the color divergence derived from the line sensors. Preferably, contents of the image processing schemes are altered in each of the first and second directions. Preferably, the contents of the image processing schemes are altered by changing a kind or degree of the image processing schemes. Preferably, the contents of the image processing schemes are altered by changing values of parameters in the image processing schemes in each of the first and second directions. Preferably, parameters in the image processing schemes are at least one of a filter coefficient of a filter used; a correction coefficient for correction of distortion; a correction coefficient for correction of chromatic aberration of magnification; a correction coefficient for correction of deterioration of marginal lumination; a correction coefficient for correction of defocusing; an electronic scaling ratio; and a coefficient of sharpening.

Preferably, if the image processing schemes include at least correction of distortion and chromatic aberration of magnification, either an amount of correction of chromatic aberration of magnification or an amount of correction of distortion or both amounts differ between the first and second directions. Preferably, if the image processing schemes include at least correction of distortion and chromatic aberration of magnification, the correction in whichever of the first and second directions that requires the chromatic aberration of magnification and distortion to be corrected in smaller amounts precedes the correction in the other direction. Preferably, if the input image data is acquired by photoelectric reading of the recorded image with line sensors that have the first direction as a main scanning direction and the second direction as an auxiliary scanning direction, the image processing schemes in the second direction further include correction of color divergence caused by the line sensors. Preferably, the first and second directions cross at right angles.

In order to attain the fourth object described above, an image processing apparatus of the fourth aspect of the present invention which acquires input image data from the image recorded optically with a taking lens and performs specified image processing schemes on the input image data to produce output image data, and which comprises: acquisition means for acquiring an information about the taking lens used to record the image; storage means for storing characteristics of the taking lens in accordance with the information about the taking lens; and image processing means which performs the image processing schemes on the input image data in both a first direction of the recorded image and a second direction crossing the first direction, by using an information about pixel positions of the input image and the characteristics of the related taking lens as read from the storage means in accordance with the information about the taking lens acquired by the acquisition means.

In this aspect, it is preferably that the image processing means has at least two parts of first and second distortion correcting parts that correct distortion in the first and second directions, respectively; first and second magnification chromatic aberration correcting parts that correct chromatic aberration of magnification in the first and second directions, respectively; first and second marginal lumination deterioration correcting parts that correct deterioration of marginal lumination in the first and second directions, respectively; first and second defocusing correcting parts that correct defocusing in the first and second directions, respectively; first and second electronic scaling parts that perform electronic scaling in the first and second directions, respectively; and first and second sharpening parts that perform sharpening in the first and second directions, respectively. Preferably, the image processing means has a first image processing part and a second image processing part that perform image processing schemes independently of each other in the first and second directions. Preferably, the image processing means is capable of selecting an order of the image processing schemes that are performed by the first and second image processing parts. It is preferable that the above-described image processing apparatus further includes unidirectional image processing means for performing unidirectional image processing in at least one of the first and second directions. Preferably, if the input image data is acquired by line sensors that read the image recorded on a film, the unidirectional image processing means has a color divergence correcting part that corrects the color divergence derived from the line sensors.

It is also preferable that the above-described image processing apparatus further includes control means for altering contents of the image processing schemes in each of the first and second directions. Preferably, the control means alters the contents of the image processing schemes by changing a kind or degree of the image processing schemes. Preferably, the control means alters the contents of the image processing schemes by changing values of parameters in the image processing schemes in each of the first and second directions. Preferably, the parameters in the image processing schemes are at least one of a filter coefficient of a filter used; a correction coefficient for correction of distortion; a correction coefficient for correction of chromatic aberration of magnification; a correction coefficient for correction of deterioration of marginal lumination; a correction coefficient for correction of defocusing; an electronic scaling ratio; and a coefficient of sharpening.

Preferably, if the image processing means includes at least a distortion correcting part and a magnification chromatic aberration correcting part, either an amount of correction of chromatic aberration of magnification or an amount of correction of distortion or both amounts in the distortion and magnification chromatic aberration correcting parts differ between the first and second directions. Preferably, if the image processing means includes at least a distortion correcting part and a magnification chromatic aberration correcting part, correction in whichever of the first and second directions that requires chromatic aberration of magnification and distortion to be corrected in smaller amounts precedes the correction in the other direction. Preferably, if the input image data is acquired by photoelectric reading of the recorded image with line sensors that have the first direction as a main scanning direction and the second direction as an auxiliary scanning direction, it further includes a color divergence correcting part that corrects the color divergence derived from the line sensors in the second direction. Preferably, the image processing means allows the first and second directions to cross at right angles.

In order to attain the fifth object described above, an image processing method of the fifth aspect of the present invention comprises the step of subjecting image data representing an image recorded on an image recording medium to image processing schemes in either a first direction or a second direction crossing the first direction or both directions, wherein if the image processing schemes are to be performed in both the first and second directions, contents of the image processing schemes in each of the first and second directions are altered. In this aspect, the alternation of contents of the image processing schemes in each of the first and second directions includes cases that the kind of the image processing scheme is altered and that the degree of the image processing scheme is altered while the kind of the image processing scheme is the same.

For example, if the above-mentioned image data is obtained with the three-line color CCD corresponding to each of R, G and B components, the image which is formed on the basis of the above-mentioned image data may have color divergence in the direction (auxiliary scanning direction) that is perpendicular to the direction (main scanning direction) in which lines of the three-line color CCD extend. In this case, the image processing may be performed to correct the color divergence only in the auxiliary direction. Therefore, the above-mentioned color divergence can be corrected by the image processing only in one direction which applies the auxiliary direction as either one of the first and second directions in the image processing method of the present aspect, as well as the above-mentioned correction processing of color divergence as the image processing whereby the image processing only in one direction can be performed at a higher speed than the image processing in both first and second directions can.

Moreover, for example, when the image recorded in the image recording medium is projected through the lens so that the correction of the aberrations of the above lens is performed as the image processing, the correction processing must normally be performed in both main scanning and auxiliary scanning directions; hence, by adopting the main scanning and the auxiliary scanning directions as the first and second directions respectively in the image processing method of the present aspect, the correction of the aberrations of the lens is performed in both directions as the image processing in this method. In this case, in the method of the present aspect, aberration correction is performed in each direction of the first and second directions. Therefore, a moving direction of a pixel position caused by the aberration correction is limited to one direction so that, for example, the interpolation operation can be performed using data of pixels lined along one direction to allow the aberration correction processing to be performed in a high speed.

On the other hand, for example, if the image recorded in the image recording medium is projected through the lens, as well as the data thereof are obtained corresponding to each of R, G and B components with the three-line color CCD, it may be in cases required that only aberration correction of lens is performed in the main scanning direction while both the correction processing of color divergence caused by the three-line color CCD and the aberration correction processing of lens are performed. In this case, the aberration correction of lens in the auxiliary direction is normally performed with a different correction coefficient from that of the aberration correction in the main scanning direction. Also in this case, image processing in each direction can be realized by adopting the main scanning and auxiliary scanning directions as the first and second directions in the method of the present aspect respectively, as well as the aberration correction as the image processing for the first direction, and the above-mentioned color divergence correction and the aberration correction which has different correction coefficient from that for the first direction as the image processing for the second direction.

Thus, according to the method of the present aspect, the image data representing the image recorded on the image recording medium is subjected to the image processing schemes in either the first direction or the second direction crossing said first direction or both directions, so that the image processing of the image data can be performed at high speed. As well as, if the image processing is to be performed in both the first and second directions, the contents of the image processing in the first direction are changed from those in the second direction; hence, compared to the case of making no changes in their contents, the intended image processing schemes can be performed with a higher degree of flexibility.

In the present aspect of the invention, a preferred embodiment of the image processing method is characterized in that the contents of the image processing schemes are altered by changing values of parameters in the image processing schemes in each of the first and second directions. Therefore, for example, if the electronic scaling processing is performed as the image processing schemes, the parameter in the image processing schemes in each of the first and second directions is rendered to the electronic scaling ratio and thereby the aspect ratio of the image represented by the image data after the image processing allow to differ from the aspect ratio of the image represented by the image data before the image processing, for example, it is able to perform a finish to slender.

Thus, according to the preferred embodiment, the contents of image processing schemes are altered by changing the values of parameters in the image processing schemes in each of the first and second directions; hence, highly flexible image processing can be accomplished by a simple method of only changing the values of pertinent parameters.

In order to attain the fifth object described above, an image processing apparatus of the fifth aspect of the present invention comprises: image processing means for performing unidirectional image processing schemes on image data that represents an image recorded on an image recording medium; and control means for controlling the image processing means such that image processing schemes are performed on the image data in either a first direction or a second direction crossing the first direction or both directions, wherein if the control means controls the image processing means such that the image processing schemes are performed in both the first and second directions, the control means alters contents of the image processing schemes in each of the first and second directions.

According to the image processing apparatus of the present aspect, the image processing means for performing the unidirectional image processing schemes on the image data that represents the image recorded on the image recording medium is provided, and the image processing means is controlled by the control means such that the image processing schemes are performed on the image data in at least one of the first direction and the second direction crossing the first direction, as well as, if image processing means is controlled such that the image processing schemes are performed in both the first and second directions, contents of the image processing schemes in each of the first and second directions are altered.

Thus, according to the apparatus of the present aspect, in the same way as the method of the present aspect, since the image data representing the image recorded on the image recording medium is subjected to image processing in either the first direction or the second direction crossing said first direction or both directions, the image processing of the image data can be performed at high speed. And if the image processing is to be performed in both the first and second directions, the contents of the image processing in the first direction are changed from those in the second direction; hence, compared to the case of making no changes in their contents, the intended image processing schemes can be performed with a higher degree of flexibility. As well as, if the image processing is to be performed in both the first and second directions, the image processing in the first direction and that in the second direction can be executed by a single image processing means and this helps simplify the construction of the image processing apparatus.

A preferred embodiment of the image processing apparatus is characterized in that the control means alters the contents of image processing schemes by changing the values of parameters in image processing schemes in each of the first and second directions. According to the preferred embodiment, the values of the parameters of the image processing schemes in each of the first and second directions are varied by the control means in the apparatus of the present aspect, thereby the contents of the image processing schemes are changed. Thus, according to the apparatus of the preferred embodiment, since the contents of the image processing schemes are altered by changing the values of the parameters in the image processing schemes in each of the first and second directions, in the same way as the preferred embodiment of the method, highly flexible image processing can be accomplished by a simple method of only changing the values of pertinent parameters. It should be noted that as the parameters in the image processing schemes described above, at least one of a filter coefficient of a filter used, a coefficient of sharpening, a correction coefficient for correction of aberrations, and an electronic scaling ratio can be applied.

BRIEF DESCRIPTION OF THE DRAWINGS

FIGS. 21A, 21B and 21C show in conceptual form the procedure of computing the electronic scaling ratio in the process of FIG. 20, in which FIG. 21A shows the outer edge of the original image, FIG. 21B shows the outer edge of an image that has been corrected for LF aberrations (distortion and chromatic aberration of magnification) and subjected to electronic scaling in y-direction only, and FIG. 21C shows the outer edge of an image that has been subjected to LF aberration correction and electronic scaling in x-direction only;

FIGS. 22A, 22B, 22C, 22D and 22E show in conceptual form the action of the one-dimensional image processing portion in the image processor of FIG. 17, in which FIG. 22A shows the outer edge of the original image, FIG. 22B shows the outer edge of an image that has been subjected to LF aberration correction and electronic scaling in y-direction, FIG. 22C shows the outer edge of an image that has been freed of pixel losses in y-direction, FIG. 22D shows the outer edge of an image that has also been subjected to LF aberration correction and electronic scaling in x-direction, and FIG. 22E shows the outer edge of an image that has been freed of pixel losses in y-direction;

FIG. 24 is a block diagram outlining another construction of the image processor in the image processing apparatus of FIG. 16;

DETAILED DESCRIPTION OF THE INVENTION

The image processing method and apparatus of the invention are now described with reference to the preferred embodiments shown in the accompanying drawings.

Figure 1:
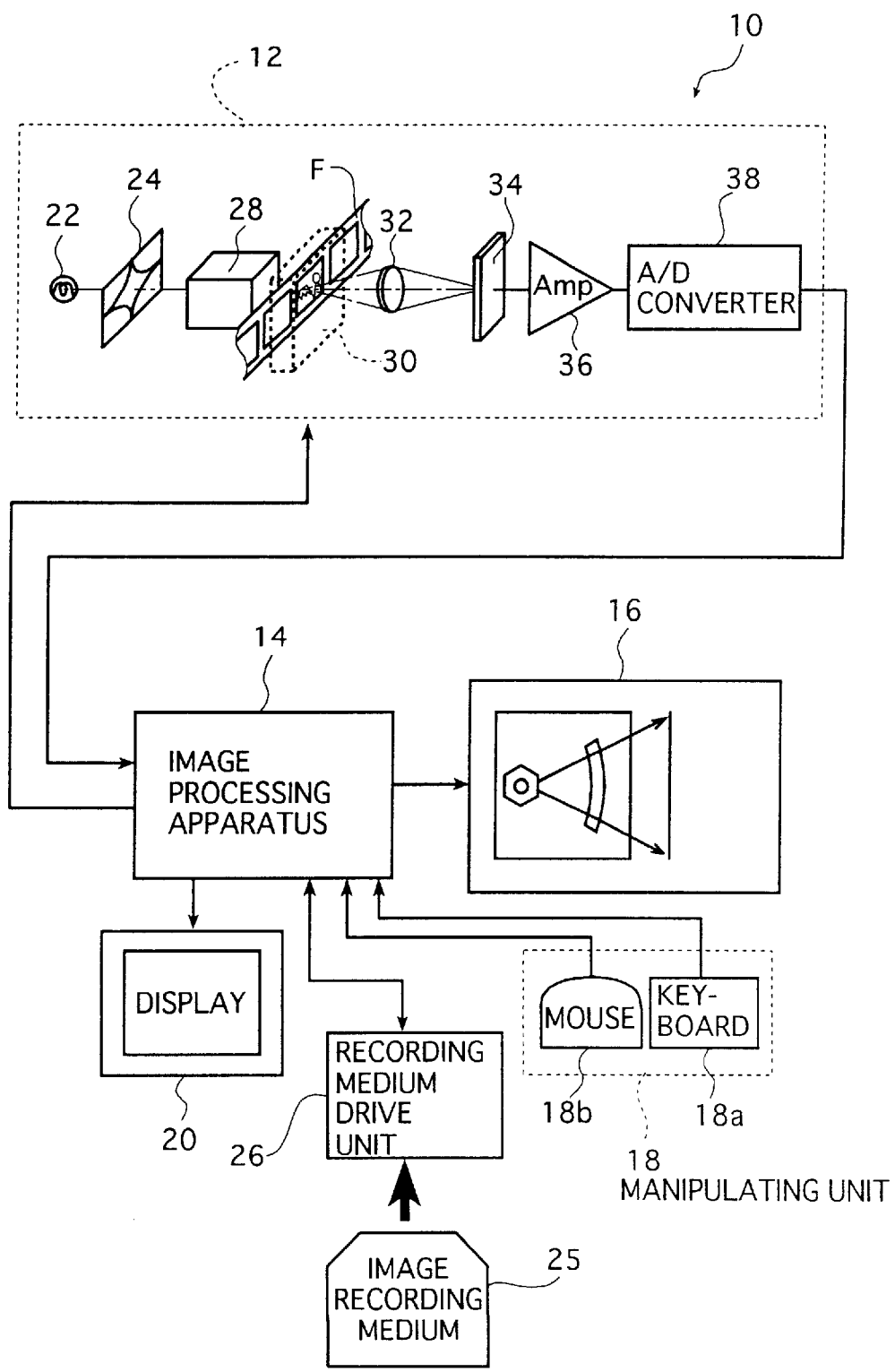
FIG. 1 is a block diagram for an exemplary digital photoprinter using the image processing apparatus of the invention.

FIG. 1 is a block diagram of an exemplary digital photoprinter using the image processing apparatus of the invention which implements the image processing method of the invention.

The digital photoprinter (hereinafter referred to simply as "photoprinter") generally indicated by 10 in FIG. 1 comprises basically a scanner (image reading apparatus) 12 for photoelectrically reading the image recorded on a film F, an image processing apparatus 14 which performs image processing on the thus read image data (image information) and with which the photoprinter 10 as a whole is manipulated and controlled, and a printer 16 which performs imagewise exposure of a light-sensitive material (photographic paper) with light beams modulated in accordance with the image data delivered from the image processing apparatus 14 and which performs development and other necessary processing to produce a print (photograph).

Connected to the image processing apparatus 14 are a manipulating unit 18 having a keyboard 18a and a mouse 18b for inputting (setting) various conditions, selecting and commanding a specific processing step and entering a command and so forth for effecting color/density correction, as well as a display 20 for representing the image captured with the scanner 12, various manipulative commands and pictures for setting and registering various conditions.

The scanner 12 is an apparatus with which the images recorded on the film F are read photoelectrically frame by frame. It comprises a light source 22, a variable diaphragm 24, a diffuser box 28 which diffuses the reading light incident on the film F so that it becomes uniform across the plane of the film F, a carrier 30 for holding the film F in a specified position, an imaging lens unit 32, an image sensor 34 having line CCD sensors capable of reading R (red), G (green) and B (blue) images, an amplifier (Amp) 36 and an A/D (analog/digital) converter 38.

In the photoprinter 10, dedicated carriers 30 are available that can be loaded freely in the scanner 12 in accordance with the type and size of the film used such as a film of the Advanced Photo System (APS; see FIG. 7), a negative (or reversal) film of 135 size, or a film with lens, and in accordance with the format of the film such as a strip (a long film or a piece containing more than one, say, six frames) and a slide. By replacing one carrier with another, the photoprinter 10 can be adapted to process various kinds of films in various modes. The images (frames) that are recorded on the film and which are subjected to the necessary procedure for print production are transported to and held in a specified reading position by means of the carriers 30.

The scanner 12 captures the images recorded on the film F in the following manner: the reading light from the light source 22 has its quantity adjusted by means of the variable diaphragm 24 and is incident on the film F held in the specified reading position by means of the carrier 30 and thereafter passes through the film to produce projected light bearing the image recorded on the film F.

Figure 2A:
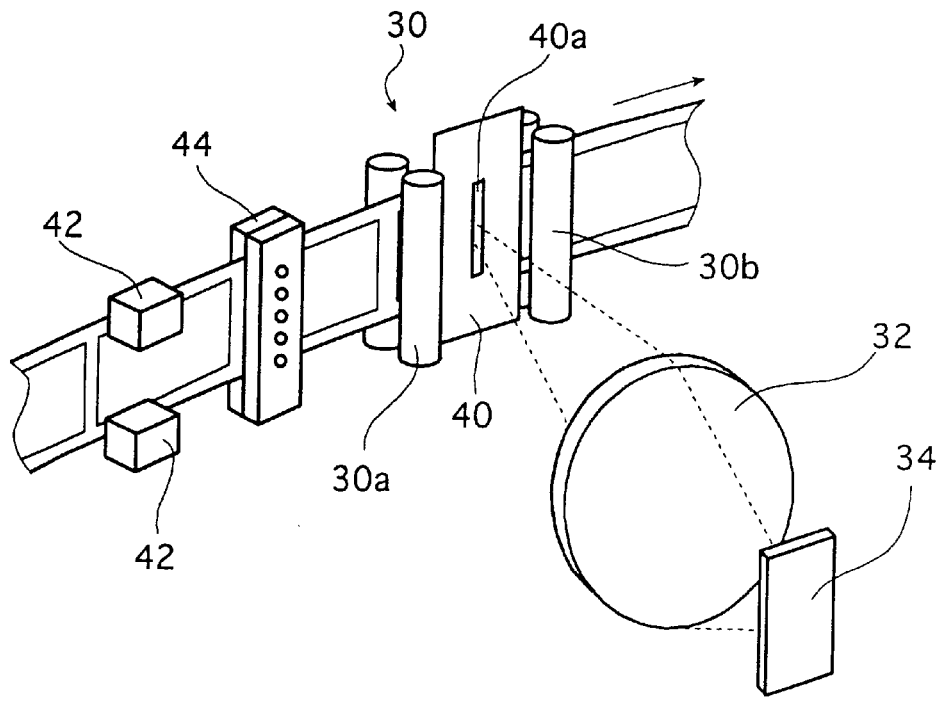
FIG. 2A shows in conceptual form an example of the carrier in the digital photoprinter shown in FIG. 1.

As shown in FIG. 2A, the carrier 30 has a pair of transport roller pairs 30a and 30b and a mask 40 having a slit 40a. The transport rollers 30a and 30b are provided on opposite sides of the specified reading position in an auxiliary scanning direction which is perpendicular to the main scanning direction (i.e., the direction in which the line CCD sensors in the image sensor 34 extend) and they transport the film F with its length being parallel to the auxiliary scanning direction as the film F is held on the reading position. The slit 40a extends in the main scanning direction and defines the projected light from the film F to have a specified narrow shape, on a position corresponding to the reading position.

Being held on the reading position, the film F is transported in the auxiliary scanning direction by means of the carrier 30 as it is illuminated with the reading light. Consequently, the film F is subjected to two-dimensional slit scan with the reading light passing through the slit 40a extending in the main scanning direction, whereupon the image of each frame recorded on the film F is captured.

Figure 7:
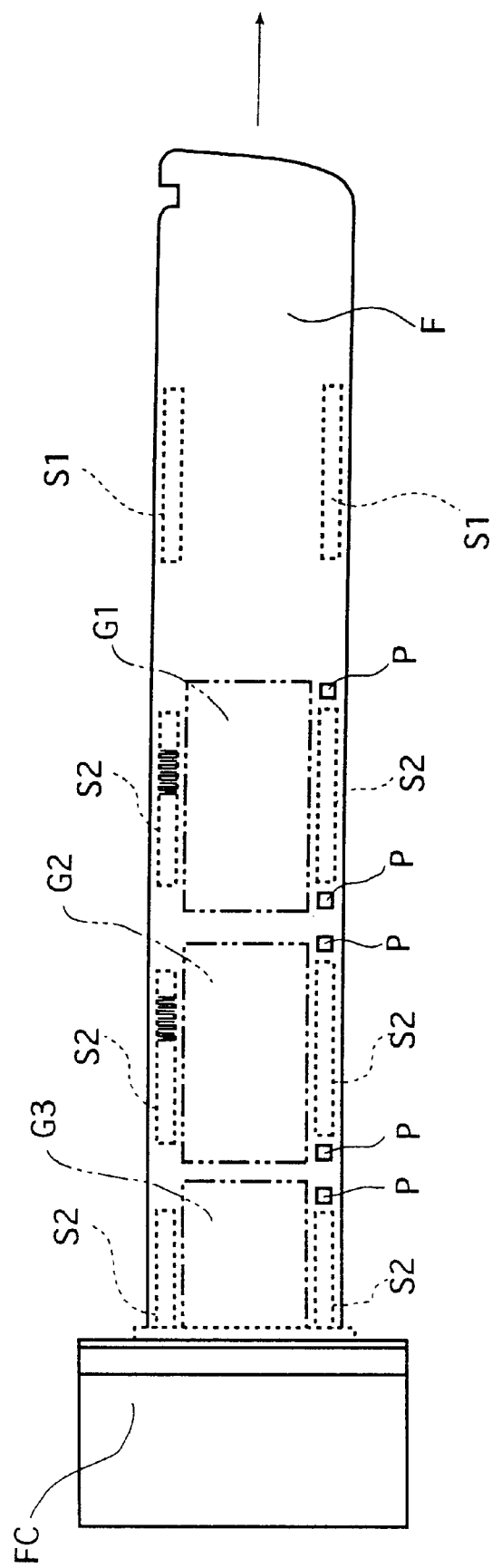
FIG. 7 is a plan view of an exemplary film that may be set in the image processing apparatus in the digital photoprinter shown in FIG. 1.

As is well known, an APS film F has a magnetic recording medium formed in regions S1 and S2 as shown in FIG. 7. The carrier 30 adapted to the APS film (or its cartridge FC) is equipped with magnetic heads 42 for reading the information recorded in said magnetic recording media and recording any necessary information. The information recorded in the magnetic recording media in the film F is read with the magnetic heads 42 and sent from the scanner 12 itself to any necessary sites such as the image processing apparatus 14 and so forth; alternatively, various kinds of information are recorded on the magnetic recording media in the film F by means of the magnetic heads 42. Specifically, referring to the APS film F shown in FIG. 7, a magnetic recording media is provided on the back side of the film F (where there is no emulsion layer) in regions S2 both above and below the image regions G1, G2, G3 and so forth of respective frames, so that information about the taking lens and the time when the image was recorded can be recorded as magnetic information during shooting or printing; during prescan, the thus recorded magnetic information can be read with the magnetic heads 42 shown in FIG. 2A and thereafter sent to the image processing apparatus 14.

In this way, various kinds of information such as the type of the lens used in shooting and the code identifying the type of that lens can be acquired. Alternatively, various kinds of information such as the type of the lens used in shooting and the code identifying the type of that lens may be acquired from the IC memory fitted in the film cartridge FC.

Indicated by numeral 44 in FIG. 2A is a sensor (or bar code reader) for reading bar codes such as a DX code, an expanded DX code and an FNS code that are optically recorded on the film, as well as various kinds of information recorded optically on the film and the image recording regions of individual frames; the various kinds of information read with the sensor 44 are sent to any necessary sites just like the image processing apparatus 14 and so forth. Stated specifically, irrespective of whether the film F is an APS film shown in FIG. 3 or a conventional 135 film or brownie film, the sensor 44 reads the bar codes printed in regions S1 at an end of the film F and in regions S2 both above and below the image regions of respective frames G1, G2 and so forth. If desired, the bar codes in regions S1 and S2 may be read with the image sensor 34 simultaneously with the reading of the image regions G1 and G2. In the case of a film with lens on which an image was taken with a lens of large aberrations, the taking lens is already known, so in region S1 (see FIG. 7), a lens type identifying code is exposed for each type of the lens used and a latent image is printed as a part of the film's lot code so that the bar code is presented on the film F after development. In this way, the bar code can be read either simultaneously with or separately from the image as it is captured with the scanner 12 and the taking lens identifying code can thus be acquired. In FIG. 7, symbol P designates perforations.

Figure 2B:
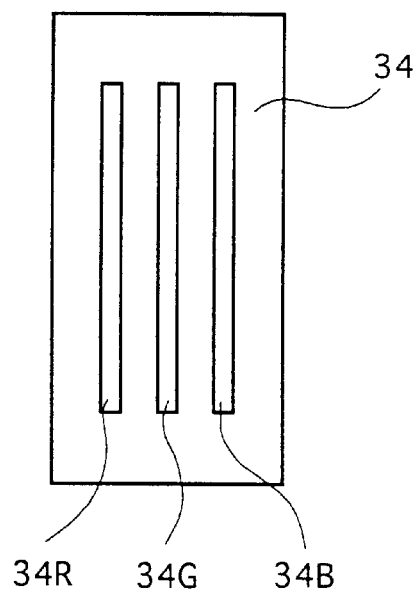
FIG. 2B shows in conceptual form an example of the image sensor assembly in the digital photoprinter shown in FIG. 1.

As already mentioned, the reading light passes through the film F held in a predetermined position by means of the carrier 30 and the resulting image bearing, projected light is focused by the imaging lens unit 32 to form a sharp image on the light-receiving plane of the image sensor 34. As shown in FIG. 2B, the image sensor 34 is a 3-line color CCD sensor comprising a line CCD sensor 34R for reading a R image, a line CCD sensor 34G for reading a G image and a line CCD sensor 34B for reading a B image. As already mentioned, each line CCD sensor extends toward the main scanning direction. The projected light from the film F is separated into three primary colors R, G and B and captured photoelectrically by means of the image sensor 34.

The output signals from the image sensor 34 are amplified with Amp 36, converted to digital form in A/D converter 38 and sent to the image processing apparatus 14.

In the scanner 12, the images recorded on the film F are captured by two scans, the first being "prescan" at low resolution and the second being "fine scan" for obtaining output image data. Prescan is performed under preset reading conditions for prescan that ensure that the images on all films to be handled by the scanner 12 can be read without saturating the image sensor 34. Fine scan uses the prescanned data and is performed under reading conditions for fine scan that are set for each frame such that the image sensor 34 is saturated at a slightly lower density than the minimum density of the image (frame) of interest.

A series of image reading operations in the prescan mode that start with the photoelectric reading with the image sensor 34 and which involve the amplification of the output signals, A/D conversion and the final step of outputting digital signals to the image processing apparatus 14 are not performed for each of the image recording frames of the film F but, instead, the necessary information is read by a single continuous movement of a roll of film at a constant speed. This is not the case with fine scan, in which the film F is stopped at each image recording frame and a series of image reading operations are performed on the basis of the information about the center position of each image frame that has been obtained in the prescan mode.

Hence, the output signals for prescan and fine scan are essentially the same except for resolution and output level.

It should be noted that the scanner 12 to be used in the present invention is by no means limited to a type that relies upon the slit scan technique described above but that it may be of a type that relies upon areal exposure, or a technique that uses an area CCD sensor to have the image in one frame scanned across at a time for R, G and B colors which are sequentially read on an area basis.

The scanner 12 which performs photoelectric reading of the images recorded on negative, reversal or other kinds of films is not the only source of supplying image data to the photoprinter 10 and various other image supply sources may be employed, including image reading apparatus that read the image on a reflection original, imaging devices such as a digital camera and a digital video camera, communication means such as on-line service, and image recording media such as an FD (floppy disk), MO (magneto-optical recording medium) and smart media. These image data supply sources may be connected to the image processing apparatus 14 either directly or via the associated drive unit so that prints can be prepared from the supplied image data.

The present invention is particularly useful if it is applied to the processing of digital image data, or the image in which the subject of interest has been directly recorded with an imaging device such as a digital camera or a digital video camera. In the illustrated photoprinter 10, the digital image data obtained by direct recording of the subject with an imaging device such as a digital camera is recorded on an image recording medium 25 and a recording medium drive unit 26 that drives the medium 25 to capture the recorded digital image data is connected to the image processing apparatus 14. Needless to say, a digital camera or other imaging device may be directly connected to the image processing apparatus 14 so that the recorded image data can be directly input to the image processing apparatus 14.

As already mentioned, the output signals (image data) from the scanner 12, the recording medium drive unit 26 or the like are sent to the image processing apparatus 14. The following description mainly concerns a typical case where image data for one frame is supplied from the scanner 12 to the image processing apparatus 14.

Figure 3:
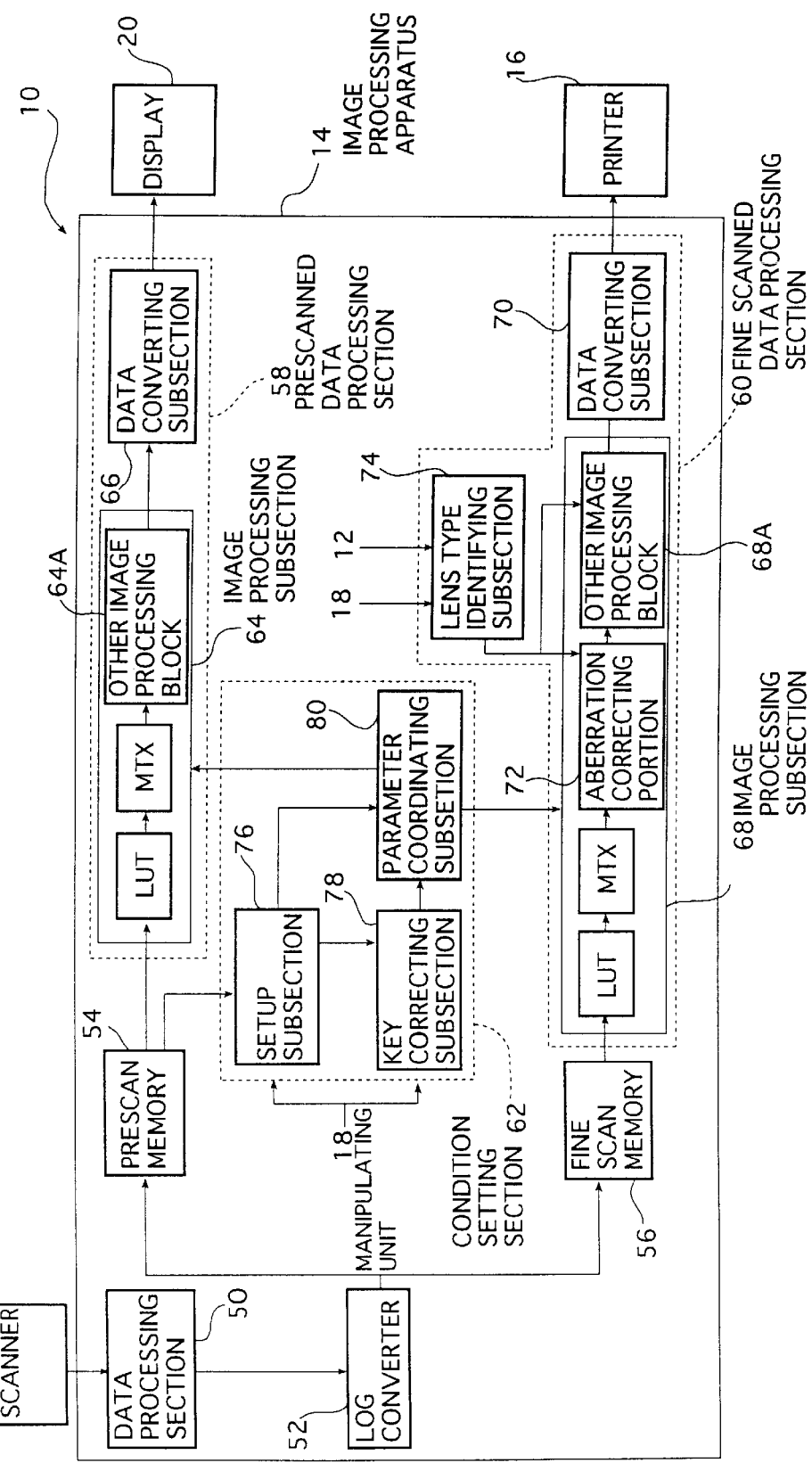
FIG. 3 is a block diagram for an example of the image processing apparatus of the invention that is applied to the digital photoprinter shown in FIG. 1.

FIG. 3 is a block diagram of the image processing apparatus (hereinafter referred to as the "processing apparatus") 14 according to the first embodiment of the invention. The processing apparatus 14 comprises a data processing section 50, a log converter 52, a prescan memory 54, a fine scan memory 56, a prescanned data processing section 58, a fine scanned data processing section 60, and a condition setting section 62.

FIG. 3 shows only the sites related to image processing and besides these sites, the processing apparatus 14 includes a CPU for controlling and managing the overall operation of the photoprinter 10 including the processing apparatus 14, memories for storing the information necessary for the operation and otherwise of the photoprinter 10, and other components. The manipulating unit 18 and the display 20 are connected to related sites via the CPU and the like (CPU bus).

The R, G and B digital signals output from the scanner 12 are sent to the data processing section 50, where they are subjected to specified data processing steps such as DC offset correction, dark correction and shading correction. Thereafter, the processed digital signals are transferred into the log converter 52, where they are converted to digital form (density data), of which prescanned (image) data is stored in the prescan memory 54 and fine scanned (image) data is stored in the fine scan memory 56.

It should be noted that the prescanned data and the fine scanned data are essentially the same except for resolution (pixel density) and signal level.

The prescanned data stored in the prescan memory 54 is processed in the prescanned data processing section 58 and the fine scanned data stored in the fine scan memory 56 is processed in the fine scanned data processing section 60. The prescanned data processing section 58 has an image processing subsection 64 and a data converting subsection 66, whereas the fine scanned data processing section 60 has an image processing subsection 68, a data converting subsection 70 and a lens type identifying subsection 74.

Both the image processing subsection 64 in the prescanned data processing section 58 and the image processing subsection 68 in the fine scanned data processing section 60 are the sites where the image (image data) captured with the scanner 12 is subjected to specified image processing steps in accordance with the image processing conditions that are set by means of the condition setting section 62 to be described later in this specification. The two image processing subsections 64 and 68 perform essentially the same processing except that they process image data of different pixel densities and that the image processing subsection 64 does not have an aberration correcting portion 72; hence, the following explanation is directed to the image processing subsection 68 of the fine scanned data processing section 60 which is taken as a typical example. It should be noted that in the present invention, an aberration correcting portion may also be provided in the image processing subsection 64 of the prescanned data processing section 58 so that the prescanned image can optionally be corrected, in the manner described below, for the image deterioration due to aberrations such as distortion, chromatic aberration of magnification and deterioration of marginal lumination.

LUT in the image processing subsection 68 (or 64) is a site where the image is subjected to color balance adjustment, contrast adjustment (toning) and brightness adjustment (density adjustment) by means of LUTs (look-up tables). MTX in the image processing subsection 68 (or 64) is a site where the image is subjected to chroma adjustment by matrix operations.

The image processing subsection 68 of the fine scanned data processing section 60 has an aberration correcting portion 72 provided between the MTX and a block 68A not only for correcting aberrations such as distortion and chromatic aberration of magnification and correcting image deterioration such as deterioration of marginal lumination (the correction of these phenomena is hereunder collectively referred to as "aberration correction") but also for performing electronic scaling. A lens type identifying subsection 74 is connected to the aberration correcting portion 72 and the block 68A.

As will be described later in this specification, the processing apparatus 14 according to the first embodiment of the invention identifies the type of the lens with which the subject was recorded on the film F or the lens in an imaging device which was used to shoot the subject directly and if the image to be processed is such that it was taken with either one of preset (preselected) lens types, the processing apparatus 14 performs intense sharpness enhancement (sharpening) in the block 68A. This is how prints of high quality that reproduce high-quality images can be output in the present invention without performing complicated PSF correction and other operations even if the input image is recorded with low-cost lenses such as those in films with lens, compact cameras and digital cameras.

In a preferred embodiment, if the image to be processed is of such a type that it was taken with a specified lens type and that it need be subjected to intense sharpening, the illustrated processing apparatus 14 also performs the correction of aberrations due to poor lens characteristics so that the synergistic effect with the intense sharpening contributes to the production of an image of even better quality.

Thus, in the first embodiment, if the image to be processed is of such a type that it was taken with low-performance lenses and that it need be corrected for aberrations to produce an output image of high quality, at least intense sharpening and, optionally, aberration correction is performed to realize reproducing a high-quality image. It should be noted here that in the present invention intense sharpness enhancement may be applied at the same intensity for the entire picture in one frame or, alternatively, as in aberration correction the intensity may be varied in accordance with the lens characteristics, namely, with the distance from the image center. This not only enables fine correction of the defocusing (PSF) due to poor lens characteristics but also the reproduction of a high-quality image that has been subjected to an appropriate degree of sharpening. In other words, the correction of defocusing (PSF) may be performed by varying the intensity of sharpness enhancement in accordance with the lens characteristics of the taking lens, i.e., with the distance from the image center.

The lens type identifying subsection 74 acquires lens information for identifying the lens type, identifies the type of the lens used to record the image onto the film F, determines if, on the basis of the identification, it is necessary to perform intense sharpening and aberration correction, and issues the appropriate instruction to the aberration correcting portion 72 and the block 68A while supplying the aberration correcting portion 72 with the characteristics of the lens of the identified type.

The type of the lens that need perform intense image sharpening in the present invention is not limited in any way but at least the image taken with a film with lens (which is hereunder abbreviated as "LF") is preferably subjected to intense sharpening.

The lens information for identifying the type of the lens used to take the image onto the film F and the means of acquiring said information are not limited in any particular way and various methods can be employed.

Usually, lens type can be identified if the model of the camera used is known. In the case of an APS LF, the cartridge ID and/or film type that are magnetically recorded on the film F may be read with the scanner 12 (or the carrier 30) and used to identify the camera model, or the lens type.

Various kinds of lens information may be used in the present invention and they include: lens information itself; information that is an indirect representation of the lens information such as information of camera model; and codes of such lens information, namely, codes that are either direct or indirect representations of the lens information, as exemplified by codes of lens type and camera model. Examples of such codes may represent the film cartridge ID and camera model from which the above-mentioned lens information can be obtained. The lens information under consideration may be the information about the lens itself or its performance; alternatively, it may be the information about LF or camera model or the information about the amount of image deterioration due to lens, for example, the amount of distortion, chromatic aberration of magnification, deterioration of marginal lumination and other factors.

The lens information exemplified above is recorded optically, magnetically or electrically during film manufacture, film loading, insertion of an image recording medium into a digital camera or other imaging device or during shooting and the lens information recorded on the film F may be read with the scanner 12 (or carrier 30) and subsequently used to identify the lens type. For details of this procedure, see below.

In a case where the subject is shot directly, without using a film, with an imaging device such as a digital camera so that image data is directly recorded on an image recording medium, lens information may be recorded electrically in the header of the image data in a series of frames or of the image data in one frame (data file) when the image recording medium is inserted or during shooting and the recording information is subsequently read to identify the lens type.

In the case of an LF, before loading the camera with the film F (i.e., during its manufacture), lens information such as lens type may be recorded on the film F either magnetically (if it is an APS-LF) or optically (if it is 135-LF or APS-LF) and used to identify the lens type.

For example, in the case of LF such as a 135-LF or APS-LF, the lens information can be optically recorded in the non-recording area of the film (outside the effective area) beforehand during its manufacture as a separate entity from a DX code and an expanded DX code. In the same way, in the case of an APS-LF, the lens information can also be optically recorded beforehand (also during film manufacture) in lot codes at the beginning and end of the APS film that are freely available to the film manufacturer. Alternatively, the lens information can also be magnetically recorded in the magnetic layer of the APS-LF beforehand during film manufacture. In the case of a 135-LF and an APS-LF that use a film cartridge with IC, the lens information can also be electrically recorded in the cartridge IC beforehand during film manufacture.

In the case of an APS camera or an APS-LF, lens information such as camera model or lens type may be magnetically recorded on the film F during film loading or shooting and subsequently used to identify the lens type in the manner described above.

Figure 6A:
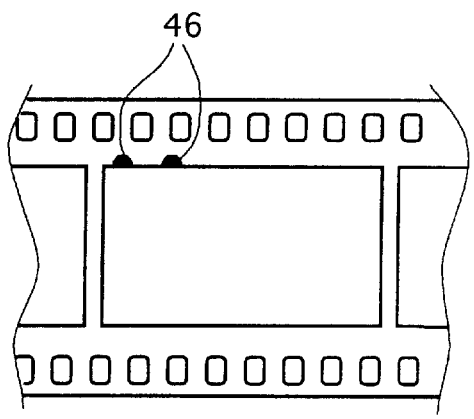
FIGS. 6A, 6B, 6C and 6D are plan views of films where the lens information to be used in the image processing apparatus of the invention are recorded in code form.
Figure 6B:
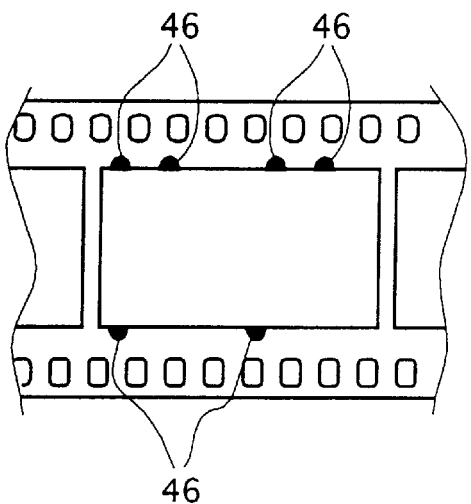
Figure 6C:
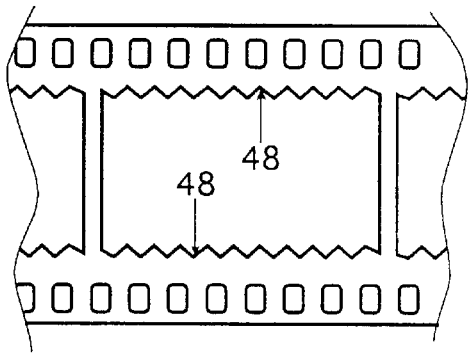
Figure 6D:
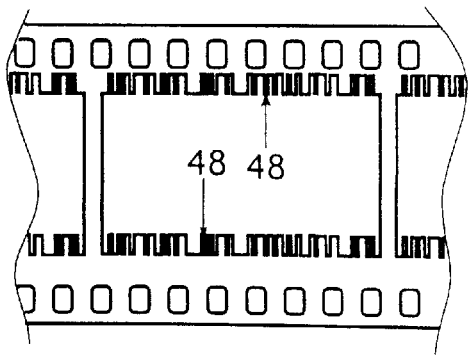

Depending on camera model such as a camera using ordinary 135 films, an APS camera, 135-LF or APS-LF, lens information such as lens type (camera model) can also be optically recorded outside the effective area of the film from the camera side using an LED or the like during film loading or shooting. Alternatively, with the same types of various cameras, notches on the edge of the exposing aperture's frame of the camera may be exposed (printed) on the film during shooting so that notch marks 46 shown in FIGS. 6A and 6B may be optically recorded outside the effective area of the film, or jaggedness setting on the aperture which defines the recording areas of the film in the camera may be exposed on the film during shooting so that jaggedness 48 shown in FIGS. 6C and 6D may be recorded outside the effective area of the film. In the case of the notch marks 46 shown in FIGS. 6A and 6B, lens information can be recorded by means of codes representing their number, shape, interval or the like. In the case of the jaggedness 48 shown in FIGS. 6C and 6D, lens information can also be recorded by means of codes, preferably bar codes that can be read with a bar code reader, which represent their number, shape, interval or the like. In these cases, a range wider than the image recording area (effective area) is first read with the scanner 12 (or carrier 30) and from the thus read notch marks 46 or jaggedness 48, lens information may be read to identify the lens type.

While all frames in an APS film are usually shot with a single camera, some APS cameras have a mid-replacement capability (MRC) and using this capability, one roll of APS film may be shot with different cameras. In this case, the intensity of sharpness enhancement to be performed in the present invention in accordance with lens type should of course be changed in consideration of the MRC with reference to the lens types identified for the respective cameras.

In another method, when a photo shop accepts an order, a customer tells a model of LF or a model of camera which is used to shoot onto a 135 film or other films; the information about the model is recorded and, at the time of print preparation, an operator enters it from the keyboard 18a and the like to identify the lens type.

Identification of lens type is not particularly necessary and in the case of a specified film F, say, one that has been shot with an LF, detection of the film of the LF may be substituted for detection of the lens type and intense sharpness enhancement is performed under uniform conditions, optionally aberration correction may also be performed. To determine whether the film F is an LF, not only the aforementioned methods of identifying lens type but also various other means may be employed, as exemplified by lens type information, camera identifying codes recorded on the film and the like, and an APS SSU (snap shooting unit) indicator that is recorded during film manufacture.

The lens type identifying subsection 74 stores the information about lens characteristics corresponding to various lens types, as exemplified by the information about the distortion and chromatic aberration of magnification of the lens and the deterioration of marginal lumination. If the intensity of sharpness enhancement is varied with the distance from the image center, the necessary information about the characteristics of image blurring (e.g., defocusing characteristics, or PSF characteristics) is stored in the lens type identifying subsection 74. If uniform correction is performed on an LF as described above, the lens type identifying subsection 74 may include the information about the average lens characteristics of the LF.

If the lens type identifying subsection 74 concludes that the image to be processed was shot with a specified lens type and needs intense sharpness enhancement and aberration correction, the information about the lens characteristics corresponding to the identified lens type is read out of a memory and supplied to the aberration correcting portion 72.

The lens characteristics are not particularly limited but, generally speaking, the characteristics of lens distortion or characteristics such as those of chromatic aberration of magnification, deterioration of marginal lumination and, optionally, image blurring can be approximated to some extent by a cubic function using as a parameter the distance from the optical axis of the lens, or the center of the image recorded on the film F (typically represented by x-y coordinates); hence, for each of the lens types that need be corrected for distortion, chromatic aberration of magnification, deterioration of marginal lumination, image blurring and so forth, a function that expresses the characteristics of the distortion and a function that expresses the characteristics of the chromatic aberration of magnification, as well as a function that expresses the characteristics of the deterioration of marginal lumination and a function that expresses the characteristics of the image blurring suffice to be stored as lens characteristics in the lens type identifying subsection 74.

If the aberration correction of a certain image is found necessary by the lens type identifying subsection 74, the aberration correcting portion 72 corrects it for distortion, magnification chromatic aberration and marginal lumination deterioration together with electronic scaling using both the lens characteristics of the film F supplied from the lens type identifying subsection 74 and the position information about the image data (pixels), such as the positions of the coordinates from the center of the image (how many pixels are from the center pixel). The coordinates may be x-y or polar coordinates and various kinds of position information may be used as long as the relative position of the image (pixels) can be detected.

If the lens type identifying subsection 74 finds that there is no need to perform intense sharpening on a certain image, the aberration correcting portion 72 concludes that the image has suffered no deterioration in quality due to the taking lens and performs only electronic scaling. Even if it is found that the image need be subjected to intense sharpening, the aberration correcting portion 72 performs only electronic scaling if no lens characteristics have been stored in the lens type identifying subsection 74.

If the correction of chromatic aberration of magnification and that of distortion are performed independently of each other using the lens characteristics and the position information about the image (which is hereunder referred to as the "pixel position"), much time is taken by calculations and, in addition, the need to perform more than one arithmetic operation for interpolation causes the problem of image deterioration.

To deal with this difficulty, it is recommended that a certain color which serves as a reference for three primary colors R, G and B is selected (typically, G is used as the reference) and the magnifications for R and B images are transformed to match them with the G image, thereby the chromatic aberration of magnification is corrected; thereafter, the distortion of the G image is corrected to complete the correction of the chromatic aberration of magnification and distortion of the overall image. On the basis of this correction, the appropriate positions of the individual pixels are calculated and used to compute their image data by interpolation, whereupon image data is obtained that has been corrected for the chromatic aberration of magnification and distortion of the image initially recorded on the film.

Since the correction of distortion requires only the calculations for the G image, the volume of arithmetic operations including those for interpolation can be reduced and yet the correction of chromatic aberration of magnification and distortion can be accomplished in a more efficient manner.

In most image processing apparatus, electronic scaling, or image enlargement or reduction by image data processing, is usually performed so that the image (image data) is adjusted to the size appropriate for the output image before it is finally output. The step of electronic scaling is commonly performed on the image data by arithmetic operations for interpolation.

In fact, however, arithmetic operations for interpolation are also required in the aforementioned correction of chromatic aberration of magnification and distortion and, eventually, two interpolations are performed, causing occasional deterioration in the image quality.

A more recommended practice for dealing with this difficulty is as follows: using the aforementioned lens characteristics and pixel positions of the image data, the appropriate position for each pixel is calculated from the offsets in the R and B pixel positions with respect to the reference color (G) that are caused by chromatic aberration of magnification and from the offset in the G pixel position that is caused by distortion and, using the information about the thus calculated pixel position of each pixel, the image data for each pixel is interpolated to perform electronic scaling of the image. In other words, the offsets in the pixel positions due to the chromatic aberration of magnification and distortion are calculated for the purpose of detecting the position where each pixel should inherently be located and, in accordance with the detected appropriate pixel position, the image data is subjected to calculations for interpolation so as to perform electronic scaling.

In this way, only one procedure of calculations for interpolation suffices for correcting distortion and chromatic aberration of magnification while performing electronic scaling.

Figure 4:
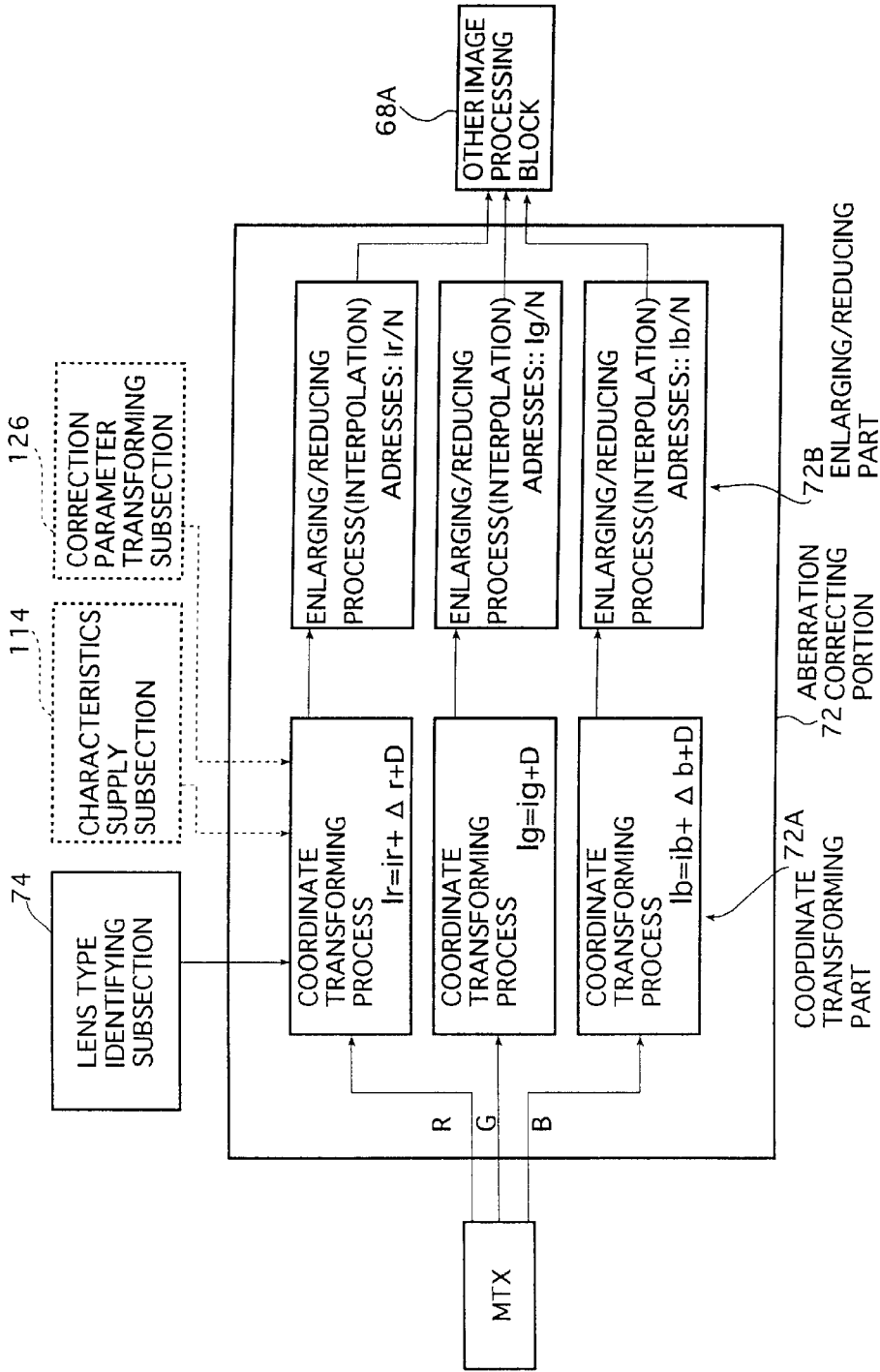
FIG. 4 is a block diagram for an example of the aberration correcting portion of the image processing apparatus shown in FIG. 3.

The illustrated aberration correcting portion 72 is a site for implementing the above-described method and, as shown in conceptual form in FIG. 4, it has a coordinate transforming part 72A and an enlarging/reducing part 72B.

Further referring to FIG. 4, ir, ig and ib each represent the pixel position (address) of the image data (input image data) supplied from the MTX; Ir, Ig and Ib each represent the pixel position of the image data that has been corrected for chromatic aberration of magnification and distortion; $\Delta r$ and $\Delta b$ represent the offsets (or the amounts to be corrected) in the R and B pixel positions, respectively, with respect to the G pixel position that are caused by chromatic aberration of magnification; and D represents the offset in the G pixel position due to distortion.

When the aberration correcting portion 72 is supplied with the image data from the MTX, the coordinate transforming part 72A calculates the following parameters using the lens characteristics supplied from the lens type identifying subsection 74: $\Delta r$ and $\Delta b$, which represent the offsets in the R and B pixel positions ir and ib due to chromatic aberration of magnification with respect to the G pixel position ig, and D which represents the offset in the G pixel position ig due to distortion.

Subsequently, ir or each pixel position of the input image data for R is added with $\Delta r$ and D to calculate Ir, or the pixel position of the R image data that has been corrected for chromatic aberration of magnification and distortion; similarly, ib or each pixel position of the input image data for B is added with $\Delta b$ and D to calculate Ib, or the pixel position of the B image data that has been corrected for chromatic aberration of magnification and distortion; then, ig or each pixel position of the input image data for G is added with D to calculate Ig, or the pixel position of the G image data that has been corrected for chromatic aberration of magnification and distortion.

Thus, in these calculations, R and B images are corrected for chromatic aberration of magnification with reference to the G image so that the overall image is aligned with the G image and, then, the overall distortion is corrected using the offset D of the G image due to distortion, thereby calculating pixel positions that have been corrected for the chromatic aberration of magnification and distortion of the R, G and B images.

The process then goes into the enlarging/reducing part 72B which, using the pixel positions Ir, Ig and Ib which have been corrected for the chromatic aberration of magnification and distortion, performs interpolation of the image data (N-times interpolation) in accordance with the enlargement/reduction ratio, whereby image scaling is effected to produce image data that has been corrected for chromatic aberration of magnification and distortion and which has been subjected to electronic scaling; the image data is thereafter output to the block 68A. The method of electronic scaling is not limited to any particular type and various known methods may be employed, as exemplified by the use of bilinear interpolation and the use of spline interpolation.

It should be noted that the correction of distortion sometimes results in the loss of an image from the area of reproduction (a phenomenon generally called "vignetting"); to avoid this problem, the correction of distortion is preferably accompanied by electronic scaling (interpolation) at a ratio about 0.1–5% higher than in the case where no such correction is effected.

The ratio of the electronic scaling to be done may be set at various values depending on the lens type used. The amount of distortion often varies between vertical and horizontal directions of the image, so the ratio of electronic scaling may accordingly be varied between the two directions.

In the illustrated apparatus, both distortion and chromatic aberration of magnification are corrected since this is a preferred embodiment. It should, however, be noted that only one of the two aberrations may be corrected. In this alternative case, too, the aberration correction should preferably not be performed independently from electronic scaling; as in the aforementioned method, it is recommended that appropriate positions corrected for the offsets due to the aberration should first be calculated and the information about them is used to perform N-times interpolation of the image data for effecting electronic scaling.

If desired, not only the distortion and chromatic aberration of magnification but also the characteristics of the lens-caused deterioration of marginal lumination and defocusing (PSF) may be stored so that in addition to, or in place of, said aberration correction, correction is made for defocusing and deterioration of marginal lumination.

The image data processed in the MTX in the image processing subsection 64 and in the aberration correcting portion 72 are then processed in the blocks 64A and 68A.

These blocks are the sites where various image processing schemes other than those mentioned previously, as exemplified by dodging (compressing the dynamic range of an image that maintains intermediate tones) and synthesis of characters and images, are performed in addition to sharpening. It should be noted that block 64A may be absent from the prescanned data processing section 58 and that sharpening may not be performed in the block 64A. The following description assumes that sharpening is performed only in the block 68A.

As already mentioned, the processing apparatus 14 of the invention is such that in response to a command issued by the lens type identifying subsection 74, the image taken with a specified lens type is subjected to sharpening in the block 68A (and optionally further in the block 64A) by a greater extent than in the usual case.

Figure 5:
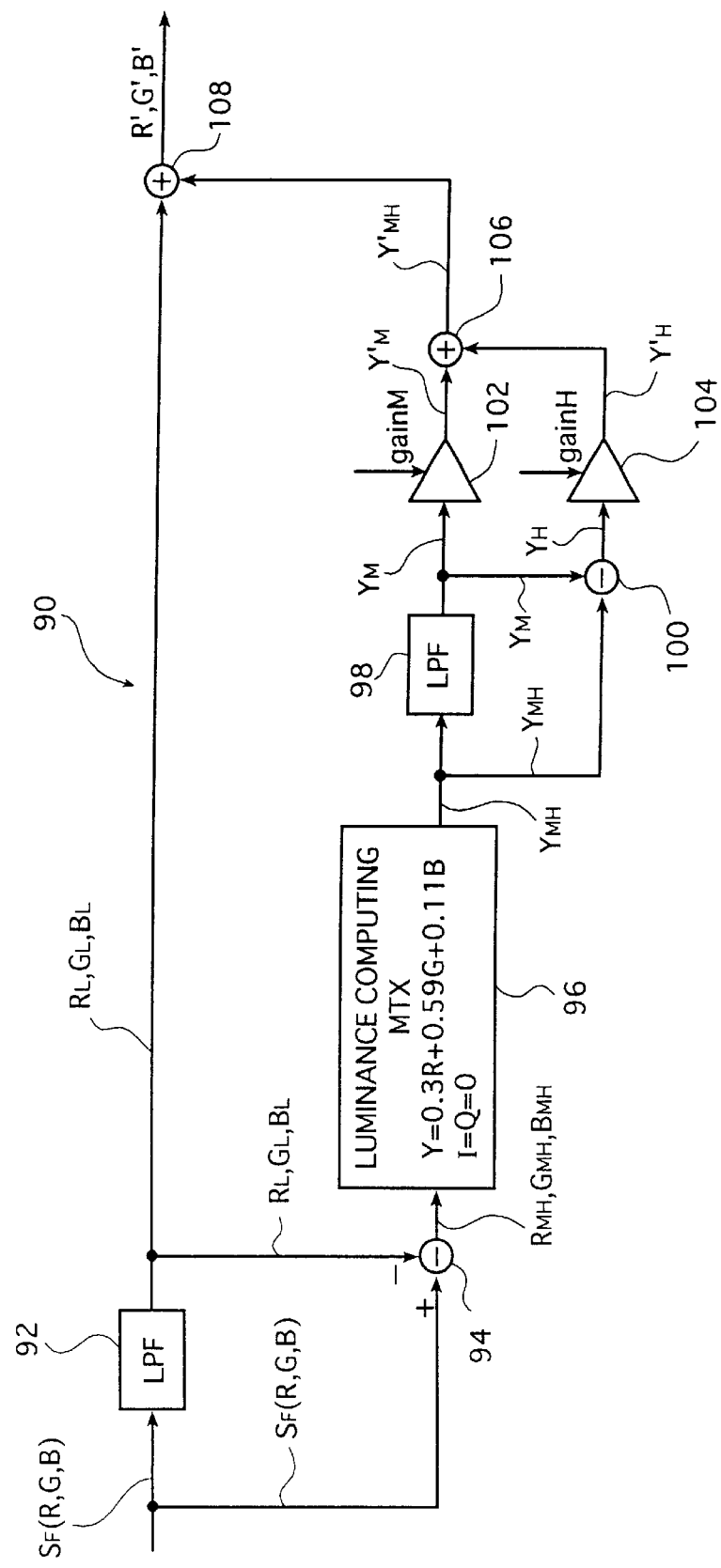
FIG. 5 is a block diagram for the processing means that performs sharpening in the image processing apparatus shown in FIG. 3.

FIG. 5 is a block diagram of an exemplary processing means for sharpening the image in the block 68A. As shown, the processing means generally indicated by 90 comprises a first low-pass filter (hereunder abbreviated as LPF) 92, a first subtracter 94, a luminance computing means 96, a second LPF 98, a second subtracter 100, a first Amp 102, a second Amp 104, a first adder 106 and a second adder 108.

In the processing means 90, $S_F(R,G,B)$ or the image data that have been input after the end of predetermined processing schemes (which data is hereunder referred to as the "feed signals") are processed with the first LPF 92 to extract their low-frequency components $R_L$, $G_L$ and $B_L$ of the feed signals SF(R,G,B). The first LPF 92 may typically be a 9×9 LPF.

The first subtracter 94 subtracts these low-frequency components $R_L$, $G_L$ and $B_L$ from the feed signals $S_F$ to extract medium and high frequency components $R_{MH}$, $G_{MH}$ and $B_{MH}$.

The remaining low-frequency components $R_L$, $G_L$ and $B_L$ are free from the edges and fine texture of the optically recorded color image and any coarseness due to the graininess of the film. On the other hand, the medium-frequency components $R_M$, $G_M$ and $B_M$ involve coarseness due to the graininess of the film, whereas the high-frequency components $R_H$, $G_H$ and $B_H$ involve the edges and fine texture of the color image.

Subsequently, the medium and high frequency components $R_{MH}$, $G_{MH}$ and $B_{MH}$ obtained in the first subtracter 94 are sent to the luminance computing means 96 to extract the luminance component $Y_{MH}$ which represents the luminance (at medium and high frequencies) as obtained by transforming $R_{MH}$, $G_{MH}$ and $B_{MH}$ into the YIQ standards; $Y_{MH}$ may typically be computed by the following equations:

$$Y_{MH}=0.3R+0.59G+0.11B$$

$$I_{MH}=Q_{MH}=0$$

It is empirically known that the color components $I_{MH}$ and $Q_{MH}$ are substantially absent from images that record ordinary subjects. Therefore, by equating the components $I_{MH}$ and $Q_{MH}$ to zero (assuming that they represent the color coarseness due to the graininess of the film), a satisfactory reproduced image can be obtained that is suppressed in coarseness.

Then, the luminance component $Y_{MH}$ is filtered by the second LPF 98 to obtain its medium-frequency component $Y_M$. The second LPF 98 may typically be a 5×5 LPF.

In the second subtracter 100, the medium-frequency component $Y_M$ is subtracted from the luminance component $Y_{MH}$ to obtain its high-frequency component $Y_H$.

The medium-frequency component $Y_M$ obtained in the second LPF 98 is sent to the first Amp 102 where it is multiplied with a corresponding sharpness gain M to produce a processed component $Y'_M$; on the other hand, the high-frequency component $Y_H$ obtained by subtraction is sent to the second Amp 104 where it is multiplied with a corresponding sharpness gain H to produce a processed component $Y'_H$ In the processing means 90, sharpening is preferably performed in such a way as to enhance the edges and fine texture of the image while ensuring that the coarseness due to the graininess of the film is not very noticeable. To suppress the graininess, gain M is preferably set in such a way that the medium-frequency components $R_M$, $G_M$ and $B_M$ (luminance component $Y_M$) which involve the coarseness due to the graininess of the film are not unduly enhanced; on the other hand, gain H is preferably set in such a way that the high-frequency components $R_H$, $G_H$ and $B_H$ (luminance component $Y_H$) which involve the edges and fine texture of the image are enhanced. In this way, sharpening can be accomplished by the processing means 90 while suppressing graininess.

The processed component $Y'_M$ obtained by the first Amp 102 and the processed component $Y'_H$ obtained by the second Amp 104 are combined in the first adder 106 to produce a processed luminance component $Y'_{MH}$.

In the second adder 108, the processed luminance component $Y'_{MH}$ is further combined with the aforementioned low-frequency components $R_L$, $G_L$ and $B_L$ of the feed signals $S_F$ to produce sharpened image data R', G' and B'.

Since the aforementioned components $I_{MH}$ and $Q_{MH}$ are equated to zero, RGB data obtained by inverse transformation of the processed luminance component $Y'_{MH}$ are completely identical to $Y'_{MH}$. In other words, simpler processing can be done by omitting the inverse transformation and by combining the as-processed luminance component $Y'_{MH}$ with $R_L$, $G_L$ and $B_L$.

As already mentioned, one major feature of the present invention is that the image taken with a specified lens type that has been identified by the lens type identifying subsection 74 is subjected to more intense sharpening than the ordinary step of sharpness enhancement, preferably one that achieves suppressed graininess. In the illustrated case, this need is accomplished by more emphasizing the high-frequency components, or multiplying $Y_H$ in the second Amp 104 with gain H having a greater value than the ordinary setting. In the case under consideration, the intensity of sharpness enhancement is increased as the gain H for the high-frequency components increases and, hence, it is the gain H for the high-frequency components that determines the intensity of sharpness enhancement.

In the processing means 90, appropriate values of gains M and H which depend on film type, print size and other parameters are set as defaults. Consider, for the example, the case of reproducing prints of 2L size from a film shot with a camera such as a single-lens reflex camera that has a lens outside the range of specified lens types. Exemplary default settings are a digital value of 10 for gain M (this value may correspond to a gain of 1.25) and a digital value of 28 for gain H (this value may correspond to a gain of 2.50). Normally, the processing means 90 uses these values of sharpness gain to perform sharpening.

In the case of an image such as one that was taken with a specified lens type, for example, an image taken with an LF and for which the lens type identifying subsection 74 gave an instruction for intense sharpening, the processing means 90 performs sharpening at an increased intensity using a greater value of gain H than the default, for example, a digital value of 32 for gain H (which may correspond to a gain of 3.50) in the example described above.

In the present invention, the aforementioned method is not the only way to perform more intense sharpening than in the ordinary case and various other methods may be employed as appropriate for the specific sharpening method used.

When performing intense sharpening, the sharpening conditions such as gain H and gain M which provide the intensity of sharpening may be identical for all lens types;

alternatively, optimal conditions may be set for the lens characteristics of each lens type.

In the above-described case of sharpening at high intensity, if the intensity of sharpness enhancement, or gain H for the high-frequency components, is changed uniformly for the whole image of one frame. This is not the sole case of the invention and, if desired, the image of one frame may be divided into a plurality of regions and gain H may be changed for each of the images in the individual regions. The way to divide the image of one frame into a plurality of regions is not particularly limited and it may be divided in any ways; the size and shape of the regions into which the image is divided are not particularly limited, either, and it may be divided into regions of any size and shape. For instance, the image of one frame may be divided into a plurality of rectangles, specifically, 20×20 rectangles, or it may be divided into concentric circles about its center so that it consists of the center circle and a plurality of surrounding rings in flat form; alternatively, the image may be divided pixel by pixel or it may be divided into one or more regions containing the principal subject in the image and several regions not containing the principal subject or it may be divided into the principal subject region and other regions. Needless to say, gain M for the medium-frequency components which is one of the remaining conditions for sharpness enhancement may be changed for each of the image in the divided regions.

In the case just described above, the intensity (gain H) and another condition (gain M) of sharpness enhancement differ from one divided region to another, so in order to provide smooth continuity across the boundary between regions, the intensity of sharpening (gain H) and another condition (gain M) for every adjacent region are preferably set to vary smoothly.

In this case, defocusing due to poor lens characteristics and, hence, the blurring (PSF) of the recorded image tends to increase with the increasing distance from the image center as in the case of aberrations such as distortion and chromatic aberration of magnification or image deterioration as exemplified by deterioration of marginal lumination. An effective way to deal with this problem is as follows: in addition to the information about the characteristics of aberrations such as distortion and chromatic aberration of magnification and about the characteristics of brightness at the edge of image field, the blurring characteristics of the image under consideration are stored in the lens type identifying subsection 74 as the information about the lens characteristics as appropriate for each lens type and, when the processing means 90 performs sharpness enhancement in accordance with the present invention, the information about the blurring characteristics of the image as appropriate for the identified lens type are read out of the memory so that the intensity (gain H) and another condition (gain M) of sharpening for each of the divided regions are determined from the position of each divided region and the extent of the blur.

The advantage of this approach is that even if PSF correction is not performed in the aberration correcting portion 72, the blurred image due to the lens can be corrected as appropriate for the extent of the blur, thus a high-quality image that is totally or virtually free of blurs can be reproduced.

In this case, the image of one frame is preferably divided into a plurality of rectangles, say, 20×20 rectangular regions, or into concentric circles about the image center to produce a combination of the central circle and a plurality of rings in flat form. If the image of one frame is divided into a plurality of rectangular regions, their symmetry may be used and the intensity (gain H) and another condition (gain M) of sharpening are determined for the respective unit rectangular regions in a quarter of the one-frame whole image; to give an example, if the image of one frame is divided into 20×20 unit rectangular regions, only 10×10 unit rectangular regions need be taken into account.

In the above-mentioned case of sharpening at high intensity, the intensity of sharpening (gain H) is changed uniformly for the image data of three primary colors, say, RGB image data. However, this is not the sole case of the invention and gain H may be changed for R, G and B image data independently of one another. Needless to say, another condition for sharpening (gain M) may also be changed for R, G and B image data independently of one another.

If the intensity (gain H) and another condition (gain M) of sharpening are changed for R, G and B image independently of one another, the sharpening circuit 90 shown in FIG. 5 may be provided for R, G and B and gains HR, HG and HB instead of gain H and gains MR, MG and MB instead of gain M may be independently set in the first and second Amps (corresponding to Amps 102 and 104) in the sharpening circuit separately provided for R, G and B.

Rather than obtaining the luminance component $Y_{MH}$ from the medium and high frequency components $R_{MH}$, $G_{MH}$ and $B_{MH}$, the latter may individually be subjected to filtering with the second LPF 98 to obtain medium-frequency components $R_M$, $G_M$ and $B_M$, which are then subtracted from $R_{MH}$, $G_{MH}$ and $B_{MH}$, respectively, to obtain high-frequency components $R_H$, $G_H$ and $B_H$. Thereafter, the obtained medium-frequency components $R_M$, $G_M$ and $B_M$ are multiplied by gains MR, MG and MB to produce processed medium-frequency components $R_M'$, $G_M'$ and $B_M'$, respectively, whereas the obtained high-frequency components $R_H$, $G_H$ and $B_M$ are multiplied by gains HR, HG and HB to produce processed high-frequency components $R_H'$, $G_H'$ and $B_H'$, respectively.

As described above, the obtained processed medium-frequency components $R_M'$, $G_M'$ and $B_M'$ are added to the obtained processed high-frequency components $R_H'$, $G_H'$ and $B_H'$, respectively, to produce not the processed luminance component $Y'_{MH}$, but the medium and high frequency components $R_{MH}'$, $G_{MH}'$ and $B_{MH}'$, which are respectively combined with the low-frequency components $R_L$, $G_L$ and $B_L$ to produce sharpened image data R', G' and B'.

If the intensity of sharpening (gain H) and another condition (gain M) are changed for R, G and B image data independently of one another, the independency may be unconditional. From a practical viewpoint, however, that takes into account various factors including the lens characteristics relative to the three primary colors R, G and B and the luminosity characteristics of the human eye, either one of the following two methods is preferably adopted.

In the first method, a default intensity is set for G and higher intensities are set for R and B (G<R=B). It is because, normally, R and B are less focused and less sharp than G. In the second method, a default intensity is set for G and B and a higher intensity is set for R (G=B<R) only. It is because the human eye has such luminosity characteristics that are G>R>B, R and B are less focused and less sharp than G and B is less noticeable to the human eye.

By using either one of these methods, the volume of the overall processing can be reduced.

In the above-described case, in order to change the intensity of sharpening, the gain for the high-frequency components and the gain for the medium-frequency components are changed for the R, G and B image data either uniformly or independently of one another. The present invention is by no means limited to these cases and any other methods may be employed. In one example, neither gain is changed but the threshold frequency band in which the feed signals are separated into high-, medium- and low-frequency components may be changed. Alternatively, the sharpness enhancing method itself may be changed or its intensity may be changed. For example, in the case of sharpness enhancement by unsharp masking (USM), coefficients of enhancement may be changed.

In the above-described case, the intensity of sharpness enhancement is changed as appropriate for a particular lens type. If the film shot with a camera having a lens of the particular type has high sensitivity, an increase in the intensity of sharpening results in the enhancement of the graininess of the film and the coarseness of the reproduced image may potentially become noticeable. To deal with this situation, the intensity of sharpening may be changed not only in accordance with the lens type but also as appropriate for the film type. For example, in case of a high-sensitivity film, the percentage of increase in the intensity of sharpening (gain H) is preferably lowered or so controlled as not to exceed a certain limit and, optionally, gain M for the grainy medium-frequency components is adjusted to be lower than the default value, thereby assuring more positive suppression of graininess.

In this way, even images that have been recorded on high-sensitivity films with a specified lens such as one in a compact camera or an LF can be adequately processed to produce high-quality prints that reproduce high-quality images with smaller amounts of grainy roughness and image blur.

If there is one-to-one correspondence between the lens and film types just like LF, the film type may be identified from the lens type. Generally speaking, the film type can be identified by reading the information optically recorded on the film, such as a DX code and an expanded DX code, or magnetically recorded information (in the case of an APS film), and such information may effectively be used to identify the film type.

In the illustrated case, sharpening is performed after aberration correction is done. This is not the sole case of the invention and sharpening may be followed by aberration correction. It should, however, be noted that from an image quality viewpoint, sharpening is advantageously performed after aberration correction as illustrated in figure.

Remember that in the present invention, aberration correction is not absolutely necessary and the image taken with a specified lens type may only be subjected to intense sharpening.

The image data processed in the image processing subsections 64 and 68 are sent to the data converting subsections 66 and 70.

The data converting subsection 66 in the prescanned data processing section 58 is a site where the image data processed in the image processing subsection 64 is converted with a 3D (three-dimensional) LUT or the like into a form suitable for representation by the display 20. Depending on the need, electronic scaling may be done in the data converting subsection 66.

On the other hand, the data converting subsection 70 in the fine scanned data processing section 60 is a site where the image data processed in the image processing subsection 68 is likewise converted with a 3D-LUT into a form suitable for image recording with the printer 16 and the resulting image data is supplied to the printer 16.

The conditions for the various kinds of processing to be done in the prescanned data processing section 58 and the fine scanned data processing section 60 are set by the condition setting section 62.

The condition setting section 62 comprises a setup subsection 76, a key correcting subsection 78 and a parameter coordinating subsection 80.

The setup subsection 76 uses the prescanned data to set the reading conditions for fine scan; at the same time, it selects what image processing steps to be performed, sets the conditions for the image processing steps to be performed in the image processing subsections 64 and 68, as well as the data converting subsections 66 and 70, and supplies those conditions to the parameter coordinating subsection 80.

Specifically, the setup subsection 76 uses the prescanned data to perform various operations including the construction of density histograms and calculation of various image characteristic quantities such as average density, highlights (minimum density) and shadows (maximum density), which may be combined with commands optionally entered by the operator to set the reading conditions for fine scan. In addition, the setup subsection 76 determines the image processing conditions such as construction of LUTs for the aforementioned gray (or color) balance adjustment and matrix operational formulae for chroma adjustment.

The key correcting subsection 78 responds to commands from the keyboard 18a and the like for correction of brightness, color, gradation and chroma, calculates the amounts of image correction, and supplies them to the parameter coordinating subsection 80.

After receiving the image processing conditions set by the setup subsection 76, the parameter coordinating subsection 80 sets them in the image processing subsection 64 of the prescanned data processing section 58 and in the image processing subsection 68 of the fine scanned data processing section 60. Further, in accordance with the amounts of image correction computed in the key correcting subsection 78, the parameter coordinating subsection 80 constructs LUTs and the like for performing the correction and sets them at specified sites; in addition, the subsection 80 corrects the image processing conditions set at various sites.

The foregoing description concerns the basic features of the image processing method according to the first embodiment of the invention and the image processing apparatus for implementing the method. Needless to say, in the present invention, the above-described method and apparatus may be combined with one or more of the image processing methods according to below mentioned second, third, fourth and fifth embodiments of the invention, as well as the image processing apparatus for implementing those methods.

On the following pages, the operation of the digital photoprinter 10, particularly those of the scanner 12 and the image processing apparatus 14 of the present invention will be described by referring to FIGS. 1–5.

The operator loads the scanner 12 with a carrier 30 that is adapted to the film F, sets the film F (or its cartridge to be more exact) in a specified position on the carrier 30, enters the necessary information such as the size of the prints to be prepared, and thereafter instructs to start print preparation.

In response to the instruction of starting print preparation, the stop-down value of the variable diaphragm 24 in the scanner 12 and the storage time of the image sensor (line CCD sensor) 34 are set in accordance with the reading conditions for prescan; thereafter, the carrier 30 transports the film F in the auxiliary direction at a suitable speed to start prescan; as already mentioned, the film F is subjected to slit scan in the specified reading position and the projected light is focused on the image sensor 34 so that the image recorded on the film F is captured photoelectrically as R, G and B separations.

During the transport of the film F, the magnetic heads 42 on the carrier 30 read the information recorded magnetically on the film F and the sensor 44 reads a DX code or other kinds of information, so that the necessary information is sent to a specified site as in the processing apparatus 14, whereupon the lens type identifying subsection 74 in the processing apparatus 14 acquires pertinent identifying information. As already mentioned, the identifying information may be provided by various methods including operator input.

In the present invention, both prescan and fine scan may be performed frame by frame. Alternatively, all frames may successively be subjected to prescan and fine scan. If desired, prescan and fine scan may continuously be performed on frame groups each consisting of a given number of frames. On the pages that follow, the case of reading the image in one frame is described for the sake of simplicity.

The output signals produced from the image sensor 34 by prescan are amplified by Amp 36 and sent to the A/D converter 38, where they are converted to digital form. The digital signals are sent to the processing apparatus 14, where they are subjected to specified data processing steps in the data processing section 50 and converted to prescanned data (digital image data) in the log converter 52, with the prescanned data being then stored in the prescan memory 54.

The prescanned data stored in the prescan memory 54 is read out of it by means of the setup subsection 76 of the condition setting section 62, which then constructs density histograms, calculates image characteristic quantities such as highlights and shadows and performs any other necessary operations to set the reading conditions for fine scan, which are then supplied to the scanner 12. The setup subsection 76 also sets the conditions for various image processing steps including tonal adjustment, and supplies them to the parameter coordinating subsection 80.

Upon receiving the image processing conditions, the parameter coordinating subsection 76 sets them at a specified site (hardware) in the prescanned data processing section 58 and the fine scanned data processing section 60.

If verification is performed, the prescanned data is read from the prescan memory 54 by the prescanned data processing section 58, image processed in the image processing subsection 64 under the preset conditions, converted to a suitable form in the data converting subsection 66, and represented as a simulated image on the display 20.

Looking at the representation on the display 20, the operator checks (verifies) the image, or the result of the processing, and, if necessary, manipulates the adjustment keys set on the keyboard 18a and so forth to correct the color, density, gradation and other features.

The inputs for this adjustment are sent to the key correcting subsection 78 which, in response to the entered inputs for correction, calculates the amounts of correction and sends them to the parameter coordinating subsection 80. In response to the supplied amounts of correction, the parameter coordinating subsection 80 sets the correcting conditions for implementing them; other operations performed by the parameter coordinating subsection 80 include the correction of the previously set image processing conditions. Hence, the image being represented on the display 20 also varies in response to this correction, or the inputs for adjustment entered by the operator.

If the operator concludes that the image in the frame of interest being represented on the display is appropriate (verification OK), he or she manipulates the keyboard 18a and so forth to give a instruction for print start, whereupon the image processing conditions are finalized and set in the scanner 12 in accordance with the reading conditions for fine scan including the stop-down value of the variable diaphragm 24 and, at the same time, carrier 30 transports the film F at a suitable speed, whereby fine scan gets started.

If no image verification is performed, the image processing conditions are finalized at the point of time when the parameter coordinating subsection 80 ends setting of the image processing conditions in the image processing subsection 68 of the fine scanned data processing section 60, and fine scan gets started. Whether image verification should be performed or not is preferably selectable between modes.

Fine scan is performed in essentially the same manner as prescan except that the reading conditions are those for fine scan including the stop-down value of the variable diaphragm 24; the output signals from the image sensor 34 are amplified with Amp 36, converted to digital form in the A/D converter 38, processed by the data processing section 50 in the processing apparatus 14, converted to fine scanned data in the log converter 52 and sent to the fine scan memory 56.

The fine scanned data being sent to the fine scan memory 54 is read by means of the fine scanned data processing section 60 and subjected to tonal and chroma adjustments in the LUT and MTX in the image processing subsection 68; the thus processed data is then sent to the aberration correcting portion 72.

In a separate step, the lens type identifying subsection 74 identifies the lens type from the acquired identifying information and determines whether the image to be processed is one that was taken with a specified lens type and which need be subjected to intense sharpening and aberration correction. If both treatments are found necessary, the lens type identifying subsection 74 sends a command for them to the block 68A and the aberration correcting portion 72; in addition, it reads the lens characteristics of the identified lens type and sends them to the aberration correcting portion 72.

On the basis of the lens characteristics and the pixel positions of the image data, the aberration correcting portion 72 computes the chromatic aberration of magnification and distortion corrected pixel positions Ir, Ig and Ib in the coordinate transforming part 72A in the manner already described above, and sends the computed pixel positions to the enlarging/reducing part 72B. In the enlarging/reducing part 72B, the pixel positions Ir, Ig and Ib are used to perform N-times interpolation of the image data so that electronic scaling of the image is performed. As a result, the image data that has been subjected to aberration correction and electronic scaling is output to the block 68A.

If the lens type identifying subsection 74 concludes that the input image need not be subjected to intense sharpening, no treatment is performed in the coordinate transforming part 72A and only electronic scaling is performed in the enlarging/reducing part 72B.

The image data supplied to the block 68A is subjected to any necessary image processing steps including sharpening and dodging before it is sent to the data converting subsection 70.

Regarding to the image for which an instruction for intense sharpening has been issued from the lens type identifying subsection 74, it is processed by the sharpening means 90 in the block 68A in the intense manner already described, i.e., gain H which is a sharpness gain with which the high-frequency components are to be multiplied is adjusted to a higher value (e.g. a digital value of 32) than the default (e.g. a digital value of 28).

The image data supplied to the image data converting subsection 70 is converted to a form suitable for image recording with the printer 16 and thereafter sent to the printer 16.

The printer 16 records a latent image on a light-sensitive material (photographic paper) by exposing it in accordance with the supplied image data and performs development and other necessary steps for the light-sensitive material, which is then output as a (finished) print. To give one example of the printer's operation, the light-sensitive material is cut to a specified length in accordance with the size of the print to be prepared; thereafter, the printer records a back print and three light beams for exposure to red (R), green (G) and blue (B) in accordance with the spectral sensitivity characteristics of the light-sensitive material are modulated in accordance with the image data (or the image to be recorded); the three modulated light beams are deflected in the main scanning direction as the light-sensitive material is transported in the auxiliary scanning direction (perpendicular to the main scanning direction) to record a latent image; the latent image bearing light-sensitive material is then subjected to a wet development process comprising color development, bleach-fixing and rinsing; the thus processed light-sensitive material is dried to produce a print; a plurality of prints thus produced are sorted and stacked.

As described in detail on the foregoing pages, the first embodiment of the invention enables the reproduction of high-quality image in output prints even if the input image was taken with a film with lens, an inexpensive compact camera and so forth.

Described above are the basic features of the image processing method according to the first embodiment of the invention, as well as the basic construction of the image processing apparatus for implementing the method.

Figure 8:
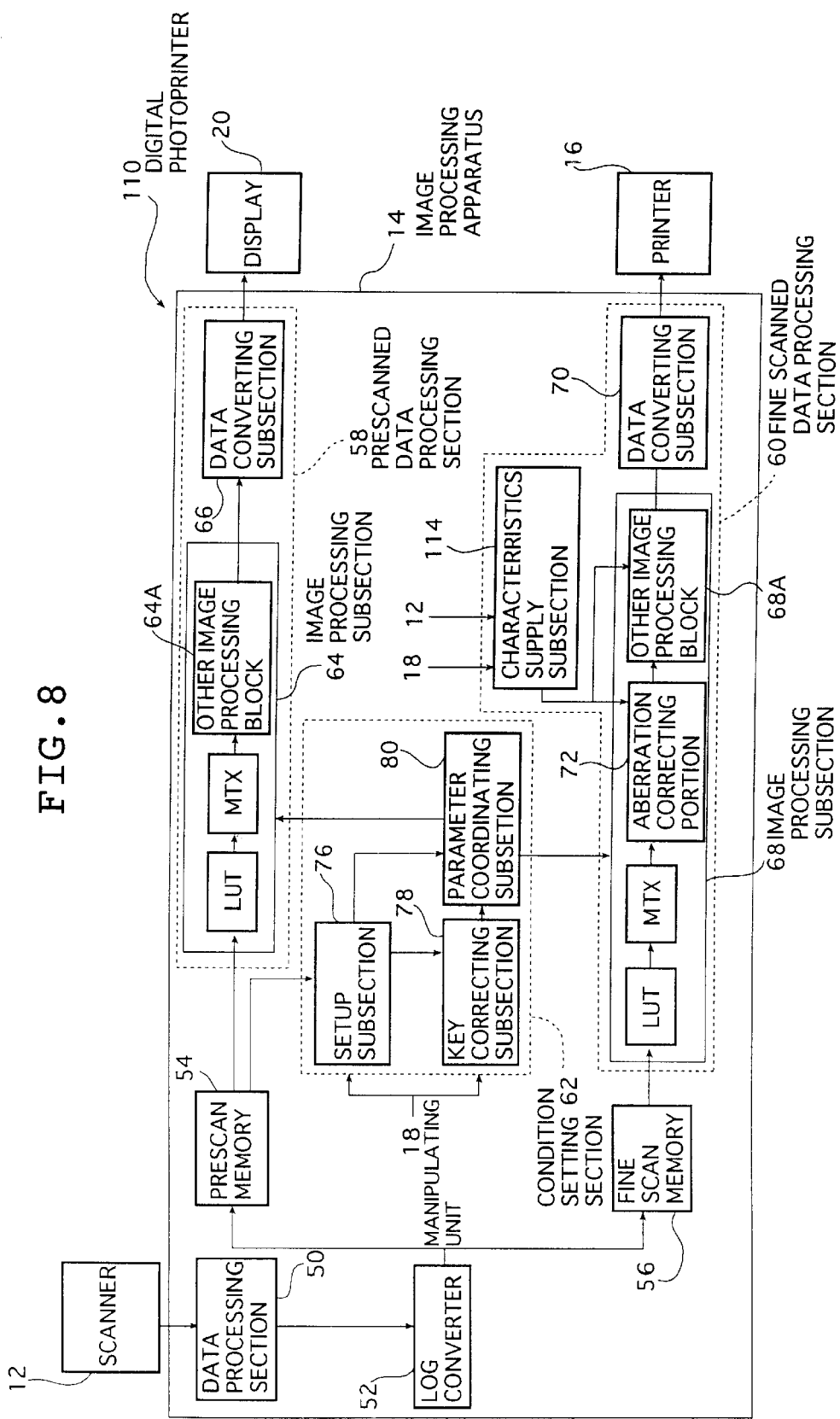
FIG. 8 is a block diagram for another example of the image processing apparatus of the invention which is applied to the digital photoprinter shown in FIG. 1.

We now describe in detail the image processing method and apparatus according to the second embodiment of the invention with reference to FIG. 8.

The digital photoprinter 110 and image processing apparatus 112 shown in FIG. 8 are the same as the digital photoprinter 10 and image processing apparatus 14 shown in FIG. 3 except that a characteristics supply subsection 114 is substituted for the lens type identifying subsection 74 and that the block 68A does not perform sharpening at variable intensity by means of the sharpness enhancing circuit 90; hence, the same constituent elements are identified by the same numerals and will not be described in detail.

Like the image processing apparatus 14 shown in FIG. 3, the image processing apparatus 112 shown in FIG. 8 also comprises a data processing section 50, a log converter 52, a prescan memory 54, a fine scan memory 56, a prescanned data processing section 58, a fine scanned data processing section 60, and a condition setting section 62. The prescanned data processing section 58 has an image processing subsection 64 and a data converting subsection 66 whereas the fine scanned data processing section 60 has an image processing subsection 68, a data converting subsection 70 and a characteristics supply subsection 114.

While the following description is directed to the image processing subsection 68 of the fine scanned data processing section 60 as a typical case, it should be noted that in the second embodiment of the invention, an aberration correcting portion may also be provided in the image processing subsection 64 of the prescanned data processing section 58 so that the aberration correction described below may be optionally performed on the prescanned image.

In the image processing subsection 68 of the fine scanned data processing section 60, an aberration correcting portion 72 that not only corrects the distortion and chromatic aberration of magnification due to poor lens characteristics but also performs electronic scaling is provided between an MTX and a block 68A and the characteristics supply subsection 114 is connected to the aberration correcting portion 72.

The characteristics supply subsection 114 acquires the identifying information to identify the type of the lens used to record the image onto the film F; it also acquires the information about the focal length effective at the time of shooting the frame of interest (or taking its image) and supplies the aberration correcting portion 72 with the characteristics of the identified lens at the focal length effective at the time of taking that image.

The second embodiment under consideration is not limited to the case of performing aberration correction on all images and there is no need to perform aberration correction on the image that was taken with a camera such as a single-lens reflex camera that uses high-performance lenses and which has little or no lens aberrations. Whether aberration correction should be performed or not may be determined depending upon the type of the lens (or the model of the camera) used to take the image, as typically done by the lens type identifying subsection 74 in the image processing apparatus 14 shown in FIG. 3; alternatively, determination may be made depending upon whether the characteristics supply subsection 114 stores the characteristics of the lens type used to take the image. If desired, the operator may look at the film magazine, cartridge, package, the surface of a film with lens and so forth and then enter the pertinent information from the keyboard 18a and so forth.

The identifying information for identifying the type of the lens used to take the image on the film F and the means of acquiring said information are not limited in any particular way and various methods can be employed. Briefly, all kinds of the lens information described above that are used to identify the lens type in the lens type identifying subsection 74 in the first embodiment can be employed.

The focal length (zoom ratio) effective at the time of taking the image can also be acquired by the same methods.

Some models of APS camera have a capability of magnetically recording the focal length effective at the time of image recording and this capability may be utilized to acquire the zoom ratio. In another method, when an order for image processing is placed at a photo shop, the customer tells the object distance and this information together with the model of the camera used to take the image may be used to detect the focal length. In yet another method, the focal length may be optically printed on the film F during image taking and likewise read with the sensor 44.

If the camera used to take the image is a fixed focal length type which has no zooming capability, the focal length may be acquired from the information for identifying the lens type (or the camera model).

The focal length need not be indicated in numerals but may be distinguished as WIDE (wide-angle), MID (middle-distance) and TELE (telephoto).

While the information about focal length need be acquired for each frame (or image), the information about lens type may be acquired for the volume of a single order for print preparation, for example, a roll of film F or all frames asked by one customer to be processed at a time for print preparation.

A word must be said here. Some APS cameras have a mid-replacement capability (MRC) and the cartridge of film F, before shooting of all frames ends, may be replaced in a different camera for continued shooting. To take advantage of this capability, if image is recorded on a roll of APS film with a plurality of camera models, it is preferred that the information for identifying the lens type (or camera model) may be recorded magnetically to acquire the information about focal length for each frame or at each camera change.

The characteristics supply subsection 114 stores in it the information about the lens characteristics for various lens types which, in the illustrated case, stores the information about the distortion and magnification chromatic aberration characteristics of lens. On the basis of the identified lens type and the acquired information about focal length, the characteristics supply subsection 114 computes the lens characteristics for the focal length effective at the time of taking the image in the frame of interest and supplies them to the aberration correcting portion 72.

Most of the compact cameras commercially available today are capable of zooming up to a ratio of 2 or 3 but their characteristics of lens aberrations vary with the focal length (image magnification). Therefore, in the accordance with the second embodiment of the invention which utilizes the lens characteristics of the focal length effective at the time of taking the image, the image aberrations due to the poor lens performance (i.e., image deterioration due to lens aberrations) can be effectively corrected in accordance with the focal length effective at the time of image taking so that aberration-free, high-quality images can be output in a consistent manner.

The zooming capability of cameras is usually such that the zoom ratio does not take discrete values but varies continuously to enable the photographer to take pictures at any ratio he likes.

Therefore, if lens characteristics are stored for a plurality of lens types at all possible values of focal length, the volume of data increases to an impracticable huge level.

To deal with this difficulty, in the second embodiment, as a preferred case setting, the focal length at a plurality of basic points, say, two points, one being a minimum and the other a maximum, or three points consisting of a minimum, a mid-point and a maximum, the lens characteristics at these multiple points are stored.

Two typical methods of correcting aberrations are as follows: first, in accordance with the identified lens type and the acquired focal length effective at the time of image taking, the lens characteristics of the corresponding lens type at a plurality of basic points are calculated in terms of the focal length effective at the time of image taking by, for example, spline interpolation to calculate the lens characteristics at the focal length effective at the time of taking the image in the frame of interest, which are then supplied to the aberration correcting portion 72; in the second method, correction coefficients and the like for correcting the basic lens characteristics to be the lens characteristics effective at the time of image taking are calculated and then supplied to the aberration correcting portion 72 together with the basic lens characteristics.

In one of these methods, a comparatively small volume of data is used and yet efficient aberration correction can be achieved in relation to a multiple of lens types and a desired value of imaging magnification (focal length).

As in the first embodiment, the lens characteristics are not particularly limited but, generally speaking, the characteristics of lens aberrations such as distortion, chromatic aberration of magnification, deterioration of marginal lumination and defocusing (PSF) can be approximated to some extent by cubic functions using as a parameter the distance from the optical axis of the lens, or the center of the image recorded on the film F (typically represented by x-y coordinates); hence, as in the first embodiment, for those lens types which need be corrected for aberrations such as distortion and chromatic aberration of magnification, a function that expresses the characteristics of the distortion, a function that expresses the characteristics of the chromatic aberration of magnification, and functions that express the characteristics of any other aberrations suffice to be stored as lens characteristics in the characteristics supply subsection 114.

The aberration correcting portion 72 not only corrects aberrations such as distortion and chromatic aberration of magnification but also performs electronic scaling using the lens characteristics calculated in terms of the focal length effective at the time of image taking as supplied from the characteristics supply subsection 114 and the position information about the image data (pixels), such as the positions of the coordinates from the center of the image (how many pixels are counted from the center pixel). An image that need not be corrected for aberrations is only subjected to electronic scaling in the aberration correcting portion 72.

Note that the processing to be done in the aberration correcting portion 72 in the second embodiment is the same as the processing which is performed in the aberration correcting portion 72 of the image processing apparatus 14 according to the first embodiment which is shown in FIG. 3, except that the lens characteristics to be supplied are those which have been calculated in terms of the focal length effective at the time of image taking.

As already mentioned, if chromatic aberration of magnification and distortion are corrected independently of each other using the lens characteristics and the position information about the image (which is hereunder referred to as the "pixel position"), much time is taken by calculations and, in addition, the need to perform more than one arithmetic operation for interpolation causes the problem of image deterioration.

To deal with difficulty, it is also recommended in the second embodiment that a certain color which serves as a reference for three primary colors R, G and B is selected (typically, G is used as the reference) and the magnifications for R and B images are transformed to match them with the G image, thereby correcting the chromatic aberration of magnification; thereafter, the distortion of the G image is corrected to complete the correction of the chromatic aberration of magnification and distortion of the overall image.

Briefly, on the basis of the offsets in the R and B pixel positions relative to the reference color (G) that originates from chromatic aberration of magnification and the offsets in the pixel positions of the reference color that originates from distortion, the appropriate positions of the individual pixels are computed. With the aid of the thus calculated appropriate positions of the individual pixels, their image data are computed by interpolation, whereupon image data is obtained that has been corrected for the chromatic aberration of magnification and the distortion of the image initially recorded on the film.

Since the correction of distortion requires only the calculations for the G image, the volume of arithmetic operations including those for interpolation can be reduced and yet the correction of chromatic aberration of magnification and distortion can be accomplished in a more efficient manner.

In most image processing apparatus, electronic scaling, or image enlargement or reduction by image data processing, is usually performed so that the image (image data) is adjusted to the size appropriate for the output image before it is finally output. The step of electronic scaling is commonly performed on the image data by arithmetic operations for interpolation.

In fact, however, arithmetic operations for interpolation are also required in the aforementioned correction of chromatic aberration of magnification and distortion and, eventually, two times of interpolations are performed, causing occasional deterioration in the image quality.

To deal with this problem, a more preferable method that is recommended in the embodiment under consideration is to perform electronic image scaling simultaneously with the aberration correction by performing N-times interpolation of the image data in accordance with the scaling ratio using the information about the appropriate positions of the individual pixels that have been computed in the manner described above.

In other words, the offsets in the pixel positions due to the chromatic aberration of magnification and distortion are calculated for the purpose of detecting the position where each pixel should inherently be located and, in accordance with the detected appropriate pixel position, the image data is subjected to calculations for N-times interpolation so as to perform electronic scaling.

In this way, only one procedure of calculations for interpolation suffices for correcting distortion and chromatic aberration of magnification while performing electronic scaling.

The illustrated aberration correcting portion 72 is a site for implementing the above-described method and, as shown in conceptual form in FIG. 4, it has a coordinate transforming part 72A and an enlarging/reducing part 72B. In the embodiment under consideration, lens characteristics calculated in terms of shooting focal length are supplied not from the lens type identifying subsection 74 indicted by a solid line in FIG. 4 but from the characteristics supply subsection 114 indicated by a dashed line. Except of these above two points, the coordinate transforming part 72A and the enlarging/reducing part 72B that are shown in FIG. 4 perform the same processing as in the first embodiment.

Again, as in the first embodiment, not only the characteristics of distortion and chromatic aberration of magnification but also the characteristics of other aberrations such as defocusing (PSF) due to lens and deterioration of marginal rumination may be stored so that in addition to, or in place of, said aberration correction, correction may be made for defocusing and deterioration of marginal rumination. Note here that the characteristics of deterioration of marginal lumination are also affected significantly by the diaphragm used in shooting. Therefore, if images are taken with a camera having a variable diaphragm and if correction is made for the deterioration of marginal lumination, the information about the diaphragm used in shooting is preferably acquired in addition to the aberration characteristics so that the deterioration of marginal lumination is corrected in accordance with the stop-down value.

The information about the diaphragm may be acquired in the same manner as the aforementioned information about the focal length.

The characteristics of the diaphragm-related deterioration of marginal lumination may preferably be treated in the sane manner as the aforementioned distortion and chromatic aberration of magnification: it is preferable that only a plurality of basic points is stored and used to perform calculations for interpolation so as to provide the characteristics of brightness at the edge of image field effective during shooting.

The image data processed in the MTX in the image processing subsection 64 and in the aberration correcting portion 72 are then processed in the blocks 64A and 68A. These blocks are the sites where various image processing schemes other than those mentioned previously, as exemplified by sharpening, dodging (compressing the dynamic range of an image maintaining intermediate tones) and synthesis of characters and images are performed. The sharpening to be performed in the embodiment under consideration may be the same as what is performed in the first embodiment or it may be the sharpness enhancement performed by known procedures. Note that the various processing schemes described above may be performed in the block 68A alone.

The image data processed in the image processing subsections 64 and 68 are sent to the data converting subsections 66 and 70 to produce two kinds of image data, one for display and the other for image recording, which are respectively supplied to the display 20 and the printer 16.

On the following pages, we describe the operation of the digital photoprinter 110, particularly those of the scanner 12 and the image processing apparatus 112 according to the second embodiment. The operations of the digital photoprinter 110, scanner 12 and image processing apparatus 112 according to the second embodiment are identical to those in the first embodiment except for a part of the actions to be performed by the image processing apparatus 112 and, therefore, the following description mainly concerns the differences between the two embodiments and is made with reference to FIG. 8.

The operator sets the film F (or its cartridge) in a specified position on the compatible carrier 30, enters the necessary information such as the size of the prints to be prepared, and thereafter instructs for starting print preparation.

In response to the instruction for starting print preparation, scanner 12 starts prescan and the image recorded on the film F is captured photoelectrically as R, G and B separations by the image sensor 34.

In the meantime, the magnetic heads 42 on the carrier 30 read the information recorded magnetically on the film F and the sensor 44 reads a DX code or other kinds of information, so that the necessary information is sent to a specified site as in the processing apparatus 112. By this exemplary method or by inputting with the operator or the like, the characteristics supply subsection 114 in the processing apparatus 112 acquires the lens information, related identifying information and the information about the focal length effective at the time of taking the image in the frame of interest.

The prescanned data acquired by prescan is sent from the scanner 12 to the processing apparatus 112 and stored in the prescan memory as digital image data. The condition setting section 62 reads the stored image data out of the prescan memory 54, sets the reading conditions for fine scan and supplies them to the scanner 12. The condition setting section 62 also sets the conditions for various image processing schemes and supplies them to specified sites (hardware) in the prescanned data processing section 58 and the fine scanned data processing section 60 via the parameter coordinating subsection 80.

After verification by the operator, fine scan is started (if no verification is performed, fine scan is started after the scanner 12 is set in accordance with the reading conditions for fine scan). The fine scanned data read by fine scan is sent from the scanner 12 to the processing apparatus 112 and stored in the fine scan memory 56 as digital image data.

The fine scanned data stored in the fine scan memory 56 is read by means of the fine scanned data processing section 60 and subjected to tonal and chroma adjustments in the LUT and MTX in the image processing subsection 68; the thus processed data is then sent to the aberration correcting portion 72.

In a separate step, the characteristics supply subsection 114 identifies the lens type from the acquired identifying information and reads out the corresponding lens characteristics. In addition, using the acquired information about the focal length effective at the time of taking the image of interest, the characteristics supply subsection 114 typically interpolates the lens characteristics at a plurality of basic points in accordance with the focal length, calculates the lens characteristics at the focal length effective at the time of taking the image in the frame of interest, and sends them to the aberration correcting portion 72.

On the basis of the supplied lens characteristics and the pixel positions of the image data, the aberration correcting portion 72 computes the chromatic aberration of magnification and distortion corrected pixel positions Ir, Ig and Ib in the coordinate transforming part 72A in the manner already described above, and sends the computed pixel positions to the enlarging/reducing part 72B. In the enlarging/reducing part 72B, the pixel positions Ir, Ig and Ib are used to perform N-times interpolation of the image data so that electronic scaling of the image is effected. As a result, the image data that has been subjected to aberration correction and electronic scaling is output to the block 68A.

If the input image need not be corrected for aberrations, no treatment is done in the coordinate transforming part 72A and only electronic scaling is effected in the enlarging/reducing part 72B.

The image data supplied to the block 68A is subjected to any necessary image processing steps including sharpening and dodging before it is sent to the data converting subsection 70. In the data converting subsection 70, the image data is converted to output image data suitable for image recording with the printer 16. The image data is then sent to the printer 16, where a light-sensitive material is exposed, developed and otherwise treated in accordance with the output image data and thence outputs as a finished print.

As described above in detail, in accordance with the second embodiment of the invention, even images that were taken with inexpensive compact cameras having a zooming capability can be effectively corrected for aberrations such as distortion and chromatic aberration of magnification in accordance with the taking magnification, or focal length, and prints reproducing high-quality images can be output consistently.

Described above are the basic features of the image processing method according to the second embodiment of the invention, as well as the basic construction of the image processing apparatus for implementing the method.

Figure 9:
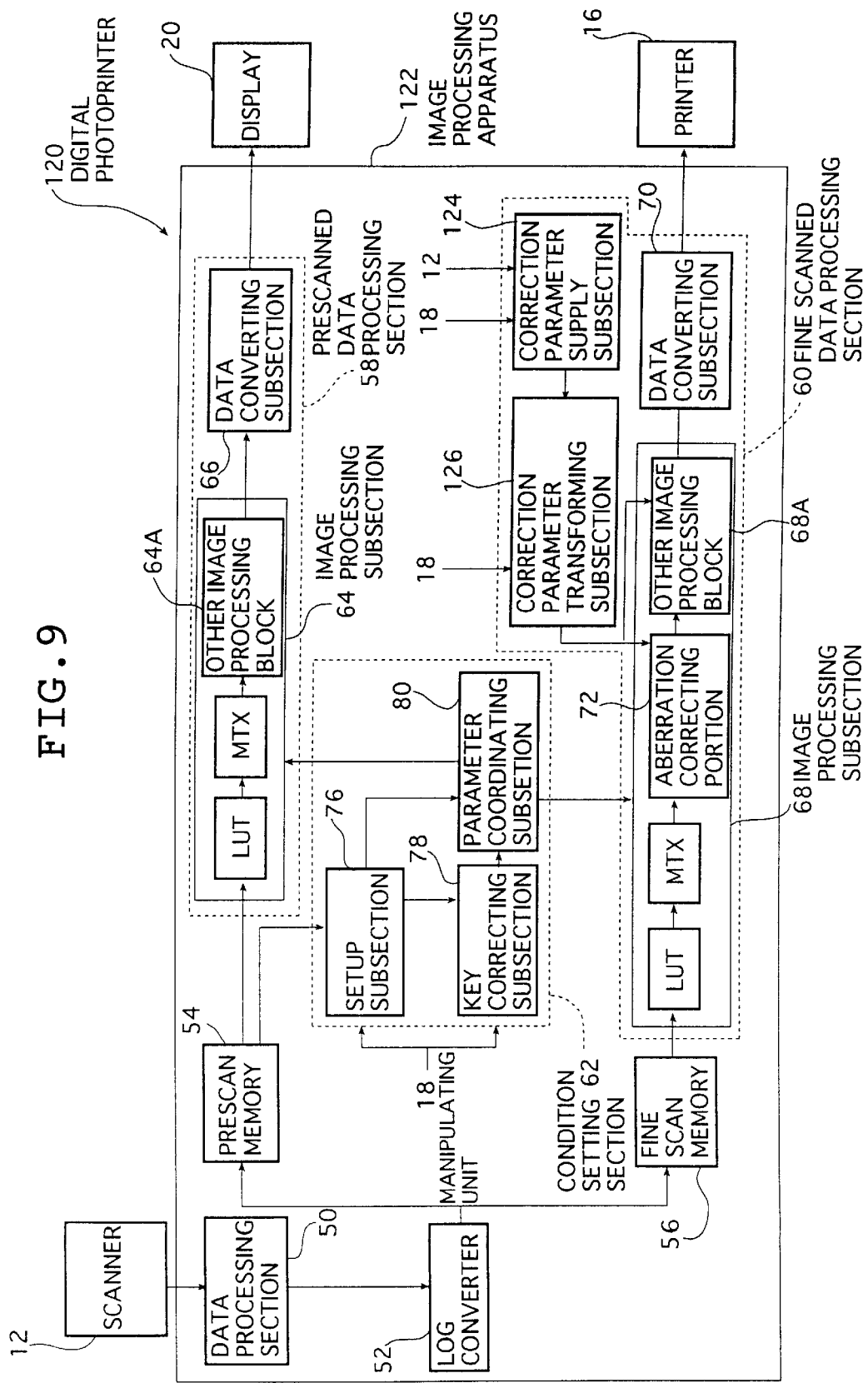
FIG. 9 is a block diagram for yet another example of the image processing apparatus of the invention which is applied to the digital photoprinter shown in FIG. 1.

We now describe in detail the image processing method and apparatus according to the third embodiment of the invention with reference to FIG. 9.

The digital photoprinter 120 and the image processing apparatus 122 shown in FIG. 9 are the same as the digital photoprinter 110 and the image processing apparatus 112 shown in FIG. 8, except that a correction parameter supply subsection 124 and a correction parameter transforming subsection 126 are substituted for the characteristics supply subsection 114. Hence, the same constituent elements are identified by the same numerals and will not be described in detail.

Like the image processing apparatus 112 shown in FIG. 8, the image processing apparatus 122 shown in FIG. 9 comprises a data processing section 50, a log converter 52, a prescan memory 54, a fine scan memory 56, a prescanned data processing section 58, a fine scanned data processing section 60, and a condition setting section 62. Here, the prescanned data processing section 58 has an image processing subsection 64 and a data converting subsection 66 whereas the fine scanned data processing section 60 has an image processing subsection 68, a data converting subsection 70, a correction parameter supply subsection 124 and a correction parameter transforming subsection 126.

In the image processing subsection 68 of the fine scanned data processing section 60, an aberration correcting portion 72 that not only corrects the distortion and chromatic aberration of magnification due to the lens characteristics of the camera used to take the image of interest but also effects electronic scaling is provided between an MTX and a block 68A and the correction parameter supply subsection 124 and the correction parameter transforming subsection 126 are connected to the aberration correcting portion 72.

In the correction parameter supply subsection 124, the aberration correcting parameters for correcting the image deterioration due to the aberration characteristics of lens (i.e., for correcting the image aberrations in the imaging plane, namely, in the film plane or the light-receiving plane of an image sensor such as a digital camera) are stored in relation to various lens types that may be used to take images. In the illustrated case, aberration correcting parameters for correcting chromatic aberration of magnification and those for correcting distortion are stored in relation to various lens types.

Like the characteristics supply subsection 114 in the second embodiment, the correction parameter supply subsection 124 acquires lens type identifying information, identifies the type of the lens used to take the image recorded on the film F or the like, searches through the stored aberration correcting parameters, selects the aberration correcting parameters for the identified lens, and supplies them to the correction parameter transforming subsection 126.

The third embodiment under consideration is not limited to the case of performing aberration correction on all images and whether aberration correction should be performed or not may be determined depending upon the type of the lens (or the model of the camera) used to take the image. Alternatively, determination may be made depending upon whether the correction parameter supply subsection 124 stores the lens characteristics of the lens type used to take the image.

The identifying information for identifying the type of the lens used to take the image on the film F or the like and the means of acquiring said information are not limited in any particular way and various methods can be employed, as in the second embodiment.

As already mentioned, the correction parameter supply subsection 124 selects aberration correcting parameters related to the type of the lens used to take the image of interest and supplies them to the correction parameter transforming subsection 126.

The aberration correcting parameters stored in the correction parameter supply subsection 124 are related to the correction of the aberrations in the imaging plane of the camera used to take the image of interest; typically, they are parameters in millimeters that correspond to positions on the imaging plane.

In the correction parameter transforming subsection 126, the parameters for correcting aberrations on the imaging plane are subjected to scaling with at least one of the four factors, the ratio at which the image is scaled electronically, the number of input pixels (i.e., the number of pixels before electronic scaling or the number of pixels captured with the image processing apparatus 122), the size of the film F read with the scanner (the input image size) and the output image size (the number of output pixels), so that they are transformed to aberration correcting parameters in terms of the pixels in the output image, which are then supplied to the aberration correcting portion 72.

When the image optically recorded on films and the like are reproduced on prints, the lens-related image aberrations are different corresponding to the input/output conditions such as the size of the prints to be output (i.e., the number of output pixels). Hence, in order to achieve the appropriate aberration correction, the correction parameters have to be changed in accordance with the print size and other input/output conditions. However, in order to provide correction parameters for a multiple of lens types and in relation to all kinds of conditions including the sizes of the prints that may be output, a memory of large capacity is required but this is disadvantageous from the viewpoint of efficiency and cost.

In the third embodiment, aberration correcting parameters for correcting the aberrations in the imaging plane are stored in relation to various lens types and scaled with at least one of the electronic scaling ratio, input pixel number, film reading size and output image size so that they are transformed to aberration correcting parameters in terms of the pixels in the output image. Thus, the above-described disadvantage that accompanies the image processing for correcting the lens-related image aberrations is eliminated to be able to provide an efficient image processing apparatus.

Which of the four factors (i.e., electronic scaling ratio, input pixel number, film reading size and output image size) should be used to perform scaling may be determined as appropriate for the system configuration of the photoprinter 120.

If the film reading size and the area of output from the image sensor (i.e., input image size) are fixed but the output image size is variable, scaling may be performed only with the electronic scaling ratio and the input pixel number. There is no need to use the output image size which is determined by the electronic scaling ratio and the input pixel number.

In the case of a photoprinter in which both the input image size and the output image size are variable, scaling is performed with the electronic scaling ratio, input pixel number and film reading size.

In order to obtain more advantageous image information, many models of the scanner which performs photoelectric reading of the image on the film F are adapted to change the film reading size depending on the size of the print to be output, such as panoramic and L sizes (in the case of a 135 film) or C, H and P types (in the case of the APS film).

With ordinary lenses, aberrations are different corresponding to the position on the film plane and, hence, the aberration characteristics differ according to the reading size of the film F. Therefore, in order to be compatible with the scanner of the type just mentioned above, scaling is performed not only with the electronic scaling ratio and input pixel number but also with the film reading size. In the case of a digital camera, the output area of the image sensor should be used as a scaling factor in addition to the electronic scaling ratio and the input pixel number.

In the case of a system having a fixed number of input pixels, scaling can be performed with either the electronic scaling ratio or the output image size. However, if the input image size (e.g. shape) is variable despite the fixed number of input pixels, the input image size must be added as a scaling factor as described above.

In the case of a system having a fixed output image size, scaling can be performed with either the input pixel number or the electronic scaling ratio, optionally in combination with the input image size.

The method scaling is not limited in any particular way and the aberration correcting parameters related to positions on the imaging plane may be transformed (scaled) to aberration correcting parameters related to the pixels in the output image, with reference being made to the electronic scaling ratio, input pixel number or some other factor according to the aberration correcting parameters to be transformed.

The electronic scaling ratio, input pixel number, input image size and output image size may be acquired from various kinds of information such as the operator's instructions entered for the output print size, film size (film type) and so forth, the magnetic record on the before mentioned APS film, the optical record on the film and the record on the header of the image data. The film size may also be acquired by means of the carrier 30 loaded in the scanner 12.

If desired, the focal length effective at the time of image taking may be acquired from the magnetic, optical or otherwise recorded information on the film F (as in the second embodiment) and the aberration correcting parameters are corrected in accordance with the thus acquired focal length.

The aberration correcting parameters are not limited to any particular kinds and they may include correction functions and coefficients for performing aberration corrections, as well as coefficients and functions with which the correction functions used to perform aberration corrections in the aberration correcting portion 72 are multiplied or modified.

Generally speaking, the characteristics of lens aberrations such as distortion and chromatic aberration of magnification can be approximated to some extent by cubic functions using as a parameter the distance from the optical axis of the lens, or the center of the image recorded on the film F (typically represented by x-y coordinates); hence, such cubic functions themselves may be used as the aberration correcting parameters or, alternatively, coefficients and functions for multiplying or modifying such cubic functions may be used as the aberration correcting parameters.

The aberration correcting portion 72 corrects the distortion and chromatic aberration of magnification of the image using the aberration correcting parameters supplied from the correction parameter transforming subsection 126. In a preferred embodiment of the illustrated case, both the supplied aberration correcting parameters and the information about the image data position (pixel position), such as the positions of the coordinates from the center pixel (how many pixels are counted from the center pixel which corresponds to the center of the optical axis of the taking lens) are used to correct the distortion and chromatic aberration of magnification while performing electronic scaling. If the image of interest need not be corrected for aberrations, only electronic scaling is performed in the aberration correcting portion 72.

It should be noted that the treatments to be performed by the aberration correcting portion 72 in the third embodiment are essentially the same as the treatments performed by the aberration correcting portion 72 of the image processing apparatus 112 shown in FIG. 8 according to the second embodiment, except that the aberration correcting parameters supplied from the correction parameter transforming subsection 126 are used in the third embodiment.

It should also be noted that if the center of the image cut with a mask or the like substantially coincides with the center of the optical axis of the taking lens, various kinds of aberrations including distortion, chromatic aberration of magnification, deterioration of marginal lumination and blurred image (PSE) may be corrected assuming that the pixel at the center of the cut image is equivalent to the center of the optical axis of the lens.

As already mentioned, if the correction of chromatic aberration of magnification and that of distortion are performed independently of each other, much time is taken by calculations and, in addition, the need to perform more than one arithmetic operation for interpolation causes the problem of image deterioration.

To deal with this difficulty, the following method using the aberration correcting parameters and the pixel positions is recommended: a certain color which serves as a reference for three primary colors R, G and B is selected (typically, G is used as the reference) and the magnifications of R and B images are transformed to match them with the G image, thereby correcting the chromatic aberration of magnification and, thereafter, the distortion of the G image is corrected to complete the correction of the chromatic aberration of magnification and the distortion of the overall image.

In this method, the correction of distortion requires only the calculations for the G image and, hence, the volume of arithmetic operations including those for interpolation can be reduced and yet the intended correction can be accomplished in a more efficient manner.

In most image processing apparatus, electronic scaling, or image enlargement or reduction by image data processing, is usually performed so that the image (image data) is adjusted to the size appropriate for the output image before it is finally output. The step of electronic scaling (which has a certain impact on the aforementioned scaling of the aberration correcting parameters related to positions on the imaging plane) is commonly performed on the image data by arithmetic operations for interpolation. In fact, however, arithmetic operations for interpolation are also required in the aforementioned correction of chromatic aberration of magnification and distortion and, eventually, two times of interpolations are performed, causing occasional deterioration in the image quality.

A more recommended practice for dealing with this difficulty comprises calculating the offsets in the pixel positions due to the chromatic aberration of magnification and distortion to detect the position where each pixel should inherently be located and then performing electronic scaling by making calculations for N-times interpolation of the image in accordance with the detected appropriate pixel positions. In this way, only one procedure of calculations for interpolation suffices for correcting distortion and chromatic aberration of magnification while performing electronic scaling.

The illustrated aberration correcting portion 72 is a site for implementing the above-described method and, as shown in conceptual form in FIG. 4, it has a coordinate transforming part 72A and an enlarging/reducing part 72B. In the third embodiment under consideration, the aberration correcting parameters are supplied not from the lens type identifying subsection 74 and the characteristics supply subsection 114 which are indicated by a solid line and a dashed line, respectively, in FIG. 4 but from the correction parameter transforming subsection 126 also indicated by a dashed line in FIG. 4, and the image is corrected for distortion and chromatic aberration of magnification using the supplied aberration correcting parameters. Excepting this point, the coordinate transforming part 72A and the enlarging/reducing part 72B shown in FIG. 4 perform essentially the same treatments as in the second embodiment.

Briefly, when the aberration correcting portion 72 is supplied with the image data from the MTX, the coordinate transforming part 72A calculates Δr and Δb (the offsets in the R and B pixel positions ir and ib due to chromatic aberration of magnification with respect to the G pixel position ig) using the magnification chromatic aberration correcting parameters supplied from the correction parameter transforming subsection 126; the coordinate transforming part 72A also calculates D (the offset in the G pixel position ig due to distortion) using the distortion correcting parameters also supplied from the correction parameter transforming subsection 126. The subsequent steps are identical to those performed in the second embodiment and need not be described.

If desired, not only the aberration correcting parameters related to positions in the imaging plane for correcting distortion and chromatic aberration of magnification but also those aberration correcting parameters for correcting other aberrations such as the lens-caused defocusing (PSF) and deterioration of marginal lumination may be stored and scaled in the manner already described above to be transformed into aberration correcting parameters related to pixels in the output image so that in addition to, or in place of, the correction of distortion, correction may also made for defocusing and deterioration of marginal lumination.

The image data processed in the MTX in the image processing subsection 64 and in the aberration correcting portion 72 are then processed in the blocks 64A and 68A. The subsequent steps are also the same as in the second embodiment and need not be described.

On the following pages, we describe the operation of the digital photoprinter 120, particularly those of the scanner 12 and the image processing apparatus 122 according to the third embodiment. The operations of the digital photoprinter 120, scanner 12 and image processing apparatus 122 according to the third embodiment are identical to those in the second embodiment except for a part of the actions to be performed by the image processing apparatus 122 and, therefore, the following description mainly concerns the difference between the two embodiments and is made with reference to FIG. 9.

The operator loads the scanner 12 with the carrier 30 compatible with the film F, sets the film F (or its cartridge) in a specified position on the carrier 30, enters the necessary information such as the size of the prints to be prepared, and thereafter instructs for starting print preparation.

The print size and other necessary information are sent to the image processing apparatus 122. As a result, the image processing subsection 68 and the correction parameter transforming subsection 126 acquire the information about the electronic scaling ratio, input pixel number, film reading size, output image size and so forth.

In response to the print start instruction, scanner 12 starts prescan and the image recorded on the film F is captured photoelectrically as R, G and B separations.

In the meantime, the magnetic heads 42 on the carrier 30 read the information recorded magnetically on the film F and the sensor 44 reads a DX code and other kinds of optically recorded information or the operator enters pertinent data, so that the necessary information is sent to a specified site as in the processing apparatus 122. In this way, the correction parameter subsection 124 in the processing apparatus 122 typically acquires the lens type identifying information.

The prescanned data acquired by prescan is sent from the scanner 12 to the processing apparatus 122 and stored in the prescan memory 54 as digital image data. The condition setting section 62 reads the stored image data out of the prescan memory 54, sets the reading conditions for fine scan and supplies them to the scanner 12. The condition setting section 62 also sets the conditions for various image processing schemes and supplies them to specified sites (hardware) in the prescanned data processing section 58 and the fine scanned data processing section 60 via the parameter coordinating subsection 80.

After verification by the operator, fine scan is started (if no verification is performed, fine scan is started after the scanner 12 is set in accordance with the reading conditions for fine scan). The fine scanned data read by fine scan is sent from the scanner 12 to the processing apparatus 122 and stored in the fine scan memory 56 as digital image data.

The fine scanned data being sent to the fine scan memory 56 is read by means of the fine scanned data processing section 60 and subjected to tonal and chroma adjustments in the LUT and MTX in the image processing subsection 68; the thus processed data is then sent to the aberration correcting portion 72.

In a separate step, the correction parameter supply subsection 124 identifies the lens type from the acquired identifying information, reads out the corresponding lens type aberration correcting parameters related to positions in the imaging plane and sends them to the correction parameter transforming subsection 126.

In the correction parameter transforming subsection 126, the supplied aberration correcting parameters related to positions in the imaging plane are scaled with a suitable factor detected from the information about the input print size and so forth, as exemplified by electronic scaling ratio, input pixel number, film reading size (input image size) and output image size, whereby those parameters are transformed to aberration correcting parameters related to individual pixels in the output image data, which are then sent to the aberration correcting portion 72.

On the basis of the supplied aberration correcting parameters and the pixel positions of the image data, the aberration correcting portion 72 computes the chromatic aberration of magnification and distortion corrected pixel positions Ir, Ig and Ib in the coordinate transforming part 72A in the manner already described above, and sends the computed pixel positions to the enlarging/reducing part 72B. In the enlarging/reducing part 72B, the pixel positions Ir, Ig and Ib are used to perform N-times interpolation of the image data so that electronic scaling of the image is effected. As a result, the image data that has been subjected to aberration correction and electronic scaling is output to the block 68A.

If the input image need not be corrected for aberrations, no treatment is done in the coordinate transforming part 72A and only electronic scaling is effected in the enlarging/reducing part 72B.

The image data supplied to the block 68A is subjected to any necessary image processing steps including sharpening and dodging before it is sent to the data converting subsection 70. In the data converting subsection 70, the image data is converted to output image data suitable for image recording with the printer 16. The image data is then sent to the printer 16, where a light-sensitive material is exposed, developed and otherwise treated in accordance with the output image data and thence output as a finished print.

As described above in detail, in accordance with the third embodiment of the invention, even images that were taken with inexpensive compact cameras having a zooming capability can be effectively corrected for aberrations such as distortion and chromatic aberration of magnification and prints can be output that reproduce high-quality images.

Described above are the basic features of the image processing method according to the third embodiment of the invention, as well as the basic construction of the image processing apparatus for implementing the method.

We now describe in detail the image processing method and apparatus according to the fourth embodiment of the invention with reference to FIGS. 10–13.

Figure 10:
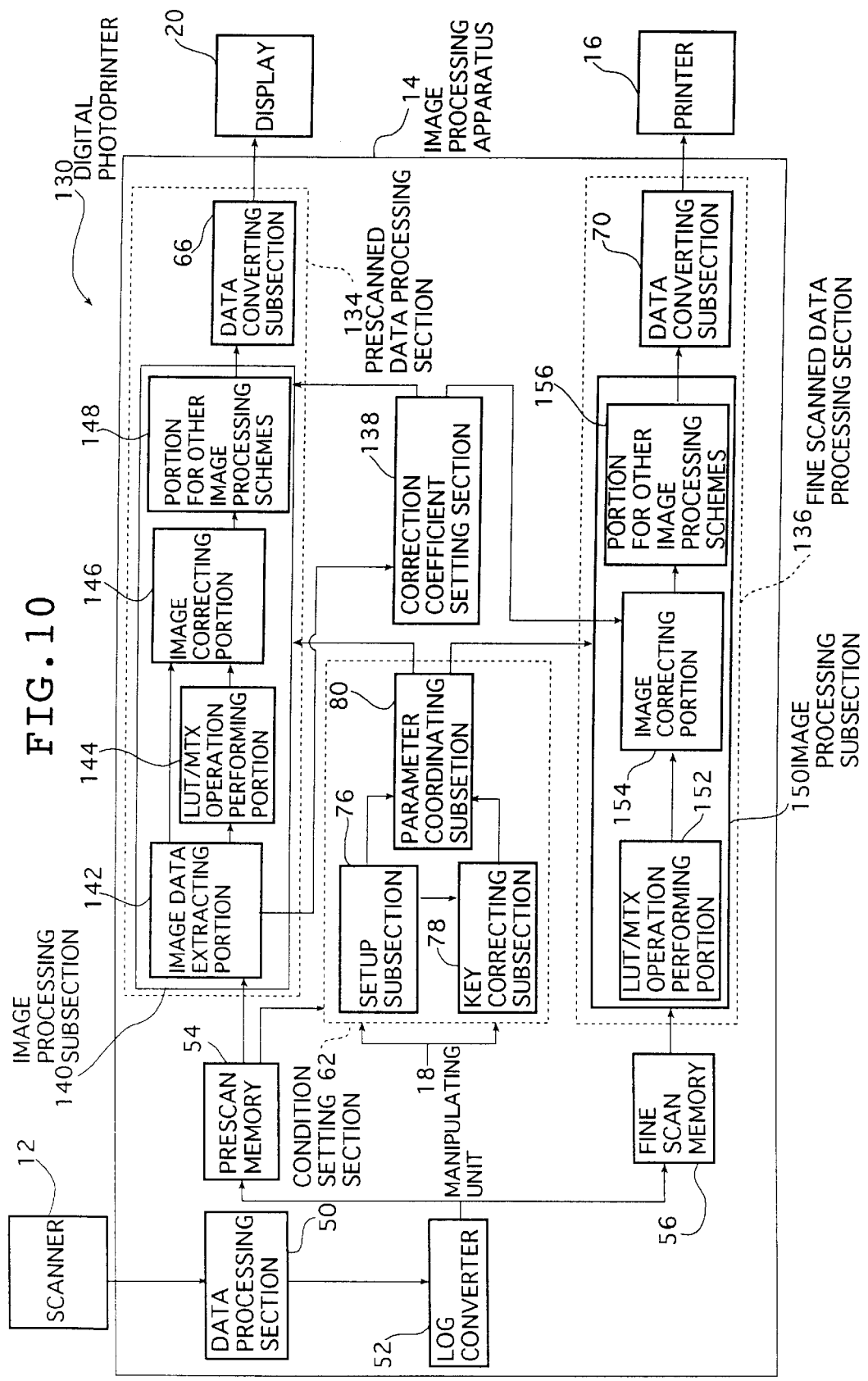
FIG. 10 is a block diagram for a further example of the image processing apparatus of the invention which is applied to the digital photoprinter shown in FIG. 1.

The digital photoprinter 130 and the image processing apparatus 132 shown in FIG. 10 are the same as the digital photoprinter 110 and the image processing apparatus 112 shown in FIG. 8, except that a prescanned data processing section 134, a fine scanned data processing section 136 and a correction coefficient setting section 138 in the image processing apparatus 132 have different constructions from the prescanned data processing section 58, fine scanned processing section 60 and characteristics supply subsection 114 in the image processing apparatus 112. Hence, the same constituent elements are identified by the same numerals and will not be described in detail.

Like the image processing apparatus 112 shown in FIG. 8, the image processing apparatus 132 shown in FIG. 10 performs specified image processing schemes on the digitized input image data from the scanner 12 and outputs the processed image data to the printer 16. The image processing apparatus 132 comprises a data processing section 50, a log converter 52, a prescan memory 54, a fine scan memory 56, a prescanned data processing section 134, a fine scanned data processing section 136, a condition setting section 62 and a correction coefficient setting section 138.

The prescanned data processing section 134 comprises an image processing subsection 140 and an image data transforming subsection 66, and the image processing subsection 140 consists of an image data extracting portion 142, a LUT/MTX operation performing portion 144, an image correcting portion 146 and a portion 148 for performing other image processing schemes. The image data extracting portion 142 is subdivided into a lens type recognizing part 142A and a center position computing part 142B (see FIG. 11).

Figure 11:
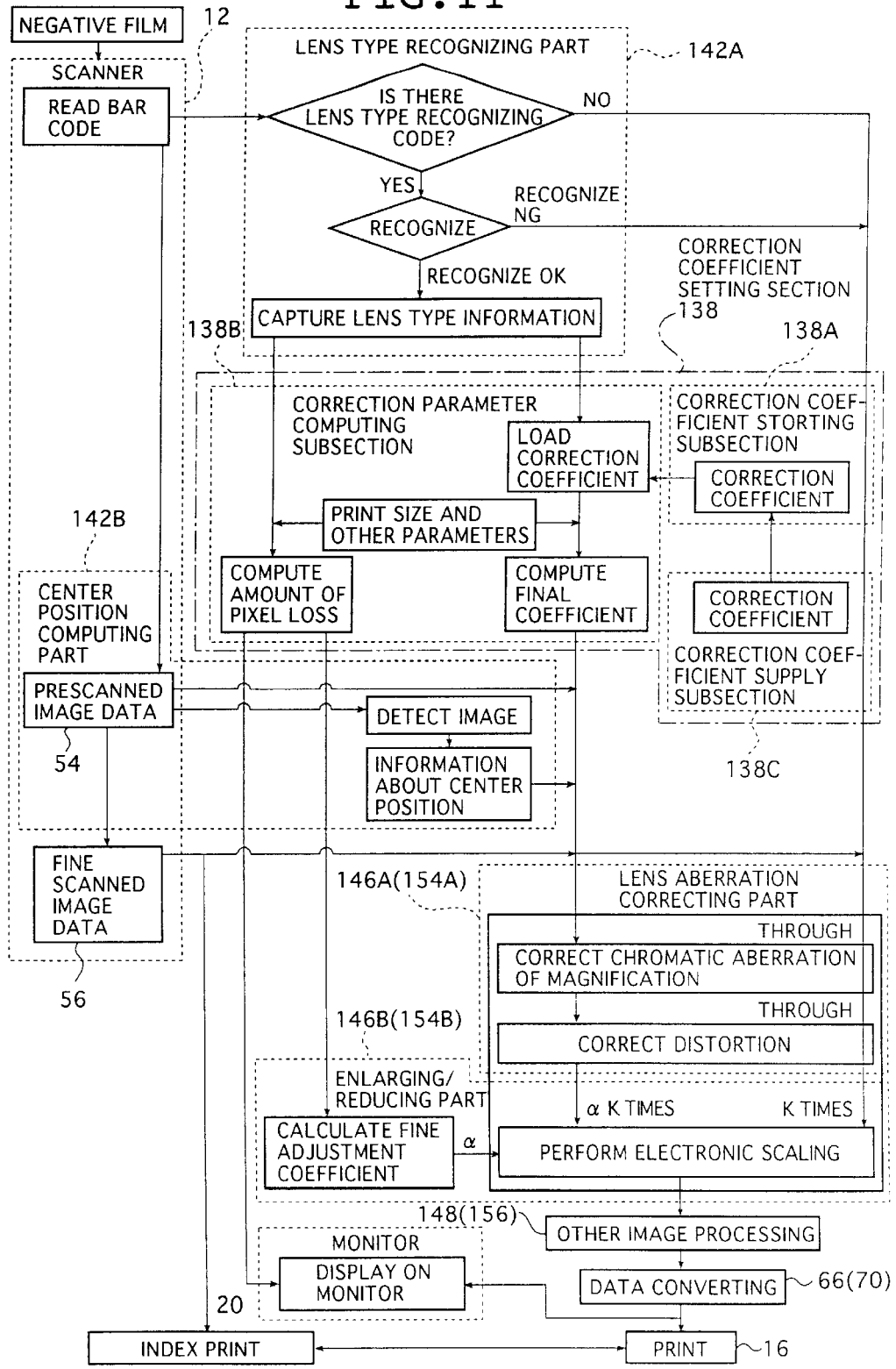
FIG. 11 is a flowchart for an example of the image processing method of the invention.

The following description should be read with reference to FIG. 11 in addition to FIG. 10.

As FIG. 11 shows, the lens type recognizing part 142A of the image data extracting portion 142 extracts the taking lens type recognizing code in the lot code information out of the data that was captured by prescan simultaneously with the image; the extracted code is recognized and sent to the correction coefficient setting section 138. The lot code is represented in eight decimal digits and the taking lens type recognizing code consists of the lower three and four digits in the lot code and is one of code numbers from zero to 99. To give an example, a taking lens type recognizing code of 01 is recognized as lens type 1 and one of 02 is recognized as lens type 2.

Further referring to FIG. 11, the center position computing part 142B detects the recorded image from the prescanned image data for a roll of film, cuts it and computes its center position. The center position of the image is computed since the correction formulae to be described below for correcting chromatic aberration of magnification and distortion are represented as functions of the distance from the center position of the image. The computed center position of the prescanned image data is correlated in a reasonable precision to the fine scanned image data and this relationship can be used to determine the center position of the image represented by the fine scanned image data.

In the illustrated case, the lens type recognizing part 142A is provided in the prescanned data processing section 134 so that the taking lens type recognizing code in the lot code information optically printed on the film (in the film F shown in FIG. 7, the taking lens type recognizing code is recorded in region S1) can be read not only with the sensor 44 such as a bar code reader but also with the image sensor 34 simultaneously with the image (as in the image regions G1, G2 and G3 of the same film F). However, this is not the sole case of the invention and other configurations may be employed if, as in the first, second and third embodiments, the lens information is read with the magnetic heads 42 or the sensor 44 such as a bar code reader or acquired by operator input to recognize and identify the lens type; for example, the lens type recognizing part 142A may be provided within The correction coefficient setting section 138 as it is connected to the scanner 12 and the manipulating unit 18 or, alternatively, the lens type recognizing part 142A connected to the scanner 12 and the manipulating unit 18 may be provided ahead of the correction coefficient setting section 138. In these modifications, various kinds of lens information may be utilized as in the foregoing embodiments.

The LUT/MTX operation performing portion 144 shown in FIG. 10 corresponds to the sites indicated by reference symbols LUT and MTX in the image processing subsection 64 of the prescanned data processing section 58 shown in FIG. 8 and it performs image processing schemes such as color balance adjustment, contrast correction and brightness correction.

The image correcting portion 146 has a lens aberration correcting part 146A and an enlarging/reducing part 146B (see FIG. 11). The lens aberration correcting part 146A corrects not only aberrations such as chromatic aberration of magnification and distortion but also the color divergence in the scanner using correction formulae based on the characteristics of the imaging lens that have been determined by the correction coefficient setting section 138 to be described below more specifically. The enlarging/reducing part 146B enlarges or reduces the image by electronic scaling. The image correcting portion 146 performs a characterizing part of the image processing method according to the fourth embodiment of the invention; briefly, the corrections of chromatic aberration of magnification and distortion and electronic scaling are performed in each of two crossed directions of the image, preferably independently of each other, with the first direction being perpendicular to the second direction.

The portion 148 for performing other image processing schemes corresponds to the block 64A shown in FIG. 8 and, in response to an operator's instruction, the image data that has been subjected to aberration corrections and electronic scaling is given other treatments in the portion 148, as exemplified by sharpening and dodging. In the image data transforming subsection 66, the image data that has been given image processing in the image processing subsection 140 is transformed with a 3D (three-dimensional) LUT or the like so that it is processed into a form suitable for representation on the display (monitor) 20.

The fine scanned data processing section 136 consists of an image processing subsection 150 and an image data processing transforming subsection 70. The image processing subsection 150 is subdivided into an LUT/MTX operation performing portion 152, an image correcting portion 154 and a portion 156 for performing other image processing schemes.

The LUT/MTX operation performing portion 152 corresponds to the sites indicated by reference symbols LUT and MTX in the image processing subsection 68 of the fine scanned data processing section 60 shown in FIG. 8 and, on the basis of the image processing conditions determined by using the prescanned image data, the fine scanned image data is subjected not only to color balance adjustment, contrast correction (toning), brightness correction and so forth by processing with LUT but also to chroma correction and so forth by MTX operations; both LUT processing and MTX operations are performed by known methods.

The image correcting portion 154 corresponds to the aberration correcting portion indicated by reference numeral 72 in FIG. 8. As shown in FIG. 11, it has a lens aberration correcting part 154A and an enlarging/reducing part 154B.

The lens aberration correcting part 154A corresponds to the coordinate transforming part indicated by reference numeral 72A in FIG. 4 and corrects aberrations such as chromatic aberration of magnification and distortion and, optionally, the color divergence in the scanner by using correction formulae based on the characteristics of the imaging lens that have been determined by the correction coefficient setting section 138 to be described below more specifically. The enlarging/reducing part 154B corresponds to the enlarging/reducing part indicated by 72B in FIG. 4 and enlarges or reduces the image by electronic scaling.

The portion 156 in FIG. 10 which performs other image processing schemes corresponds to the block 68A shown in FIG. 8 and, in response to an operator's instruction, the portion 156 performs image processing schemes such as sharpening and dodging. In the image data transforming subsection 70, the image data that has been given various image processing treatments in the image processing subsection 150 is transformed with a 3D (three-dimensional) LUT or the like so that it is processed into a form suitable for outputting of prints from the printer 16.

As in the foregoing embodiments, the condition setting section 62 is used to read the prescanned image data from the prescan memory 54 and determine the image processing conditions.

As is clear from FIG. 11, the correction coefficient setting section 138 has a correction coefficient storing subsection 138A and a correction parameter computing subsection 138B. The correction coefficient storing subsection 138A stores the chromatic aberration of magnification and distortion correcting coefficients for each taking lens type recognizing code. The correction parameter computing subsection 138B detects, analyzes and recognizes the taking lens type recognizing code that has been read by the scanner together with the image; it is then loaded from the correction coefficient storing subsection 138A with the formulae for correcting the characteristics of the chromatic aberration of magnification and distortion of the lens corresponding to the recognized code and calculates the correction formulae of the image for one pixel to another that are determined from the number of pixels input by the scanner 12, the print output size, the number of pixels to be output on a print, and the electronic scaling ratio. If distortion is corrected, loss of pixels occur in the peripheral areas of a rectangular image, so in order to ensure that the image is enlarged at an electronic scaling ratio greater than a preset value and yet the image is contained within a desired print size, fine adjustment is made to provide a minimum electronic scaling ratio that will not cause undue enlargement; the correction parameter computing subsection 138B also computes the amount of anticipated loss of pixels for calculating the coefficient of this fine adjustment.

The correction coefficient setting section 138 may optionally have a correction coefficient supply subsection 138C for updating the correction coefficients in correction formulae that are stored for each lens type recognizing code in the correction coefficient storing subsection 138A for correcting aberrations such as chromatic aberration of magnification and distortion; in this case, correction coefficients for new lens types can be updated from the correction coefficient supply subsection 138C into the correction coefficient storing subsection 138A by means of various storage media such as an FD (floppy disk), an MO (magneto-optical disk) and Zip. Another way to update the correction coefficients may be by using telephone lines in addition to networks such as the Internet.

In the correction parameter computing subsection 138B, correction coefficients on a pixel basis that are specified by the input/output conditions are computed from the accessed correction coefficients in millimeters so as to determine the correction formulae. If desired, correction coefficients that are determined by such conditions as the print size, input pixel number, output pixel number, document size and electronic scaling ratio may preliminarily be calculated and stored in look-up tables, from which the correction coefficients that comply with given conditions are directly accessed to determine the correction formulae.

We next describe the actions of the image processing apparatus 14 shown in FIG. 10 with reference to the flowchart in FIG. 11 which shows an example of the image processing method of the invention.

As shown in FIG. 10, the prescanned data stored in the prescan memory 54 is accessed by the image processing condition setting subsection 76 and the conditions for the various image processing schemes that need be performed are determined as in the aforementioned embodiments. The determined image processing conditions are adjusted in the key adjusting subsection 78 to set the required image processing conditions again. All pertinent conditions are coordinated in the parameter coordinating subsection 80 and thereafter sent to the image processing subsections 140 and 150.

In a separate step, the data for a roll of film that has been read by the scanner 12 is sent to the image data extracting portion 142 and the taking lens recognizing code in the lot code recorded in region S1 of the film F is recognized in the taking lens type recognizing part 142A. If there is no taking lens type recognizing code, or if no taking lens type recognizing codes are recognized in the taking lens type recognizing part 142A, or if the prescanned data for monitor display is not subjected to the aberration corrections to be described later, color balance adjustment, contrast correction (toning), brightness correction and other operations are performed in the LUT/MTX operation performing portion 144 under the conditions input by the operator; thereafter, the steps to be described below of correcting chromatic aberration of magnification and distortion are skipped and the image data just passes through the lens aberration correcting part 146A; electronic scaling is performed in the enlarging/reducing part 146B at a ratio suitable for the size of the prints to be output; sharpening, dodging and other treatments are performed in the portion 148; subsequently, the image data is sent to the image data transforming subsection 66, where it is transformed to a form suitable for monitor display and then it is represented on the monitor 20.

If the taking lens type recognizing code is recognized, it is thereafter sent to the correction coefficient setting section 138.

The image data accessed from the prescan memory 54 is equivalent to the data for a roll of film, so in the center position computing part 142B of the image data extracting portion 142, image data corresponding to a frame of image is detected from the accessed data and sent to the LUT/MTX operation performing portion 144 (see FIG. 10) while, at the same time, the center position of the image data is calculated. The center position of the image data is computed since the correction formulae for correcting chromatic aberration of magnification and distortion are represented as functions of the distance from the center position of the image data. In addition, the calculated center position of the prescanned image data is correlated in a reasonable precision to the fine scanned image data and this relationship can be used to determine the center position of the fine scanned image data.

The computed center position is sent to the lens aberration correcting part 146A so that it is used in correction formulae for correcting chromatic aberration of magnification and distortion.

The correction parameter computing subsection 138B of the correction coefficient setting section 138 is loaded from the correction coefficient storing subsection 138A with the coefficients for the correction of chromatic aberration of magnification and distortion that are related to the supplied taking lens type recognizing code. The accessed correction coefficients correspond to the function coefficients in specified correction formulae of the image and are expressed in millimeters. Hence, the correction parameter computing subsection 138B computes the final coefficients in correction formulae of the image on a pixel basis that are determined from the number of pixels input by the scanner 12, the size of the display on the monitor, the size of the print to be output, the number of pixels to be displayed on the monitor, the number of pixels in the print to be output, and the electronic scaling ratio. If distortion is corrected, loss of pixels occur in the peripheral areas of a rectangular image, so in order to ensure that the image is enlarged at an electronic scaling ratio greater than a preset value and yet the image is contained within a desired size of the image to be displayed or the print to be output, fine adjustment is made to provide a minimum electronic scaling ratio that will not cause undue enlargement; the correction parameter computing subsection 138B also computes the amount of anticipated loss of pixels for calculating the coefficient of this fine adjustment. The computed final coefficients in the formulae for correcting chromatic aberration of magnification and distortion are sent to the lens aberration correcting part 146A of the image correcting portion 146 whereas the computed amount of pixel loss is sent to the monitor 20 which displays the prescanned image for verification by the operator. This is in order to display, together with the prescanned image, the rectangular frame surrounding the areas of pixel loss that is determined from the amount of pixel loss. The prescanned data is also sent to the enlarging/reducing part 146B for calculating the coefficient $\alpha$ for fine adjustment of the electronic scaling ratio K. The product of $\alpha$ and K provides a finely adjusted electronic scaling ratio, which is used to effect electronic scaling when a print is output.

In the fourth embodiment under consideration, the prescanned data is corrected for chromatic aberration of magnification and distortion and the rectangular frame surrounding the areas of pixel loss is displayed. For rapid processing, the correction of chromatic aberration of magnification and distortion may be omitted and the prescanned image that has been subjected to only electronic scaling may be displayed on the monitor 20 together with the frame surrounding the areas of pixel loss.

After being subjected to specified processing schemes in the LUT/MTX operation processing portion 144 (see FIG. 10), the prescanned image data is corrected for chromatic aberration of magnification and distortion in the lens aberration correcting part 146A by using the correction formulae having the final coefficients sent from the correction coefficient setting section 138, the center position of the image data sent from the center position computing part 142B and the information about the positions of the pixels in the image to be corrected; if necessary, the data may be corrected for the color divergence caused by the scanner 12.

In the next step, electronic scaling is effected in the enlarging/reducing part 146B of the image correcting portion 146. Electronic scaling is effected after the correction of chromatic aberration of magnification, distortion and scanner's color divergence because the image must be enlarged or reduced with reference to the appropriate position information. In the enlarging/reducing part 146B, the electronic scaling ratio K at which the image data corrected in the lens aberration correcting part 146A is enlarged or reduced in accordance with the size of the display on the monitor and the number of pixels in the monitor display. Using the thus calculated K, the enlarging/reducing part 146A performs electronic scaling.

If there is no lens type recognizing code or if no lens type recognizing code has been recognized, neither chromatic aberration of magnification nor distortion is corrected in the lens aberration correcting part 146A but electronic scaling is directly performed in the enlarging/reducing part 146B. In this case, the coefficients for the correction of distortion and chromatic aberration of magnification are set to zero.

Figure 12:
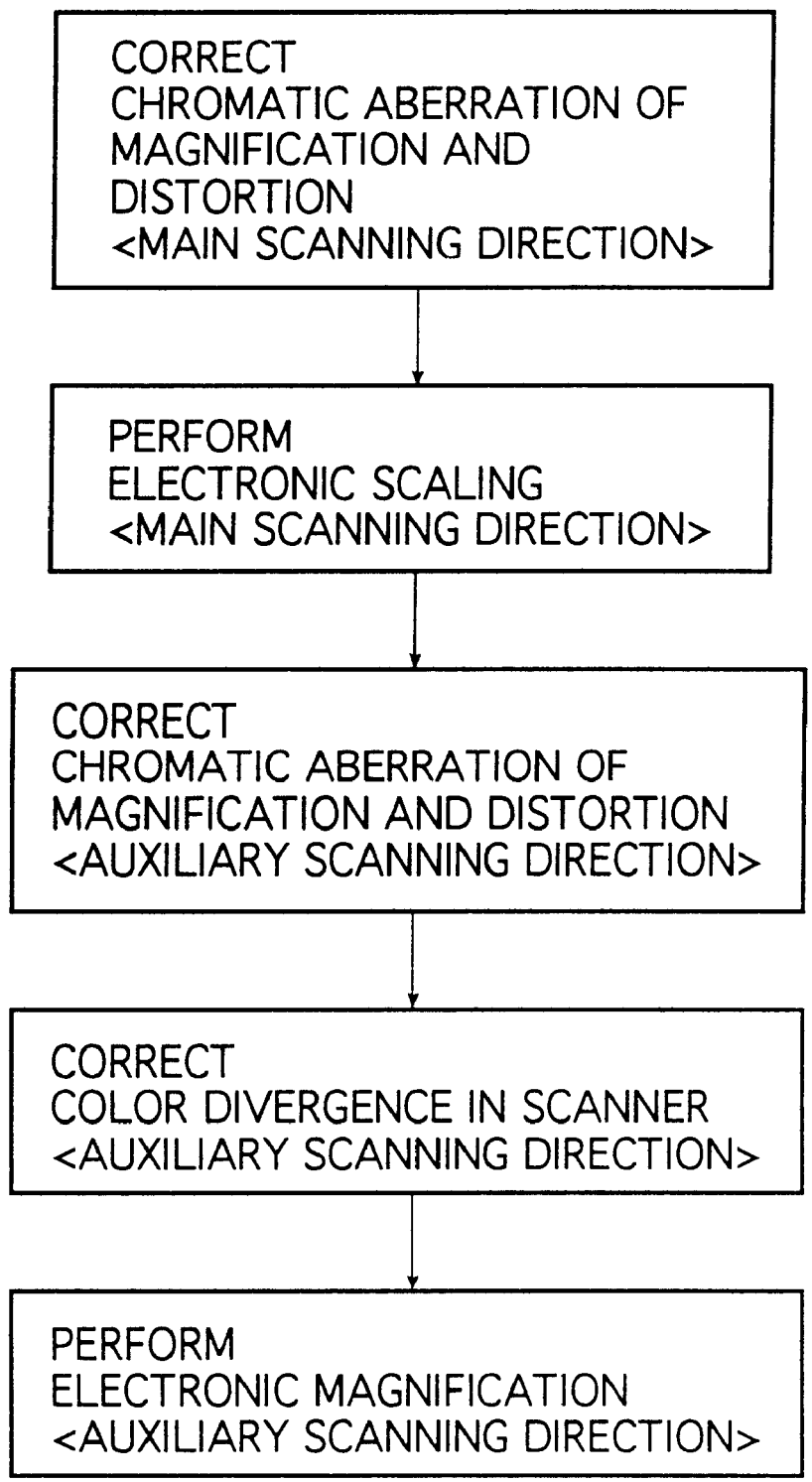
FIG. 12 is a flowchart for an example of the characterizing portion of the image processing method of the invention.

Speaking further of the lens aberration correcting part 146A and the enlarging/reducing part 146B, they constitute the characterizing feature of the image processing means in the image processing method and apparatus according to the fourth embodiment of the invention, namely, they are the sites where the corrections of chromatic aberration of magnification and distortion and electronic scaling are performed in each of two crossed directions of the recorded image independently of each other, with the first direction being perpendicular to the second direction. FIG. 11 is a flowchart for an example of the image processing method according to the fourth embodiment of the invention and it shows briefly the flows of the corrections of chromatic aberration of magnification and distortion, as well as electronic scaling without distinguishing between the first and second directions. In FIG. 12, an example of the characterizing flow in the image processing method according to the fourth embodiment of the invention is shown with distinction being made not only between the corrections of chromatic aberration of magnification and distortion and electronic scaling but also between the first and second directions. The flow assumes producing an input image by photoelectric reading with a line sensor in two directions, the first being the main scanning direction and the second being the auxiliary scanning direction. In the first direction (main scanning direction), chromatic aberration of magnification and distortion are corrected and then electronic scaling is effected; thereafter and in the second direction (auxiliary scanning direction), chromatic aberration of magnification and distortion are corrected, then the color divergence in the scanner is corrected and finally electronic scaling is effected.

Figure 13:
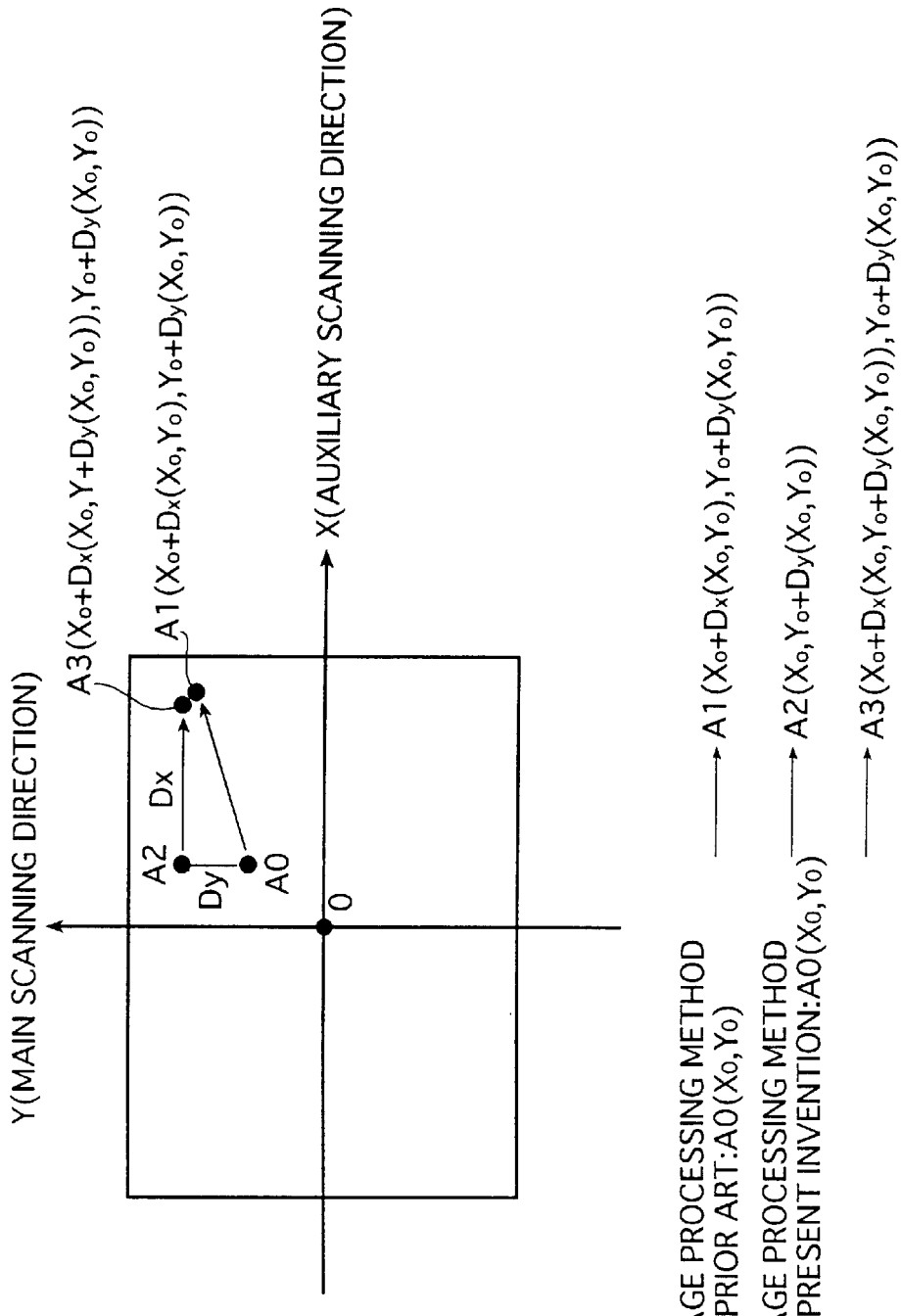
FIG. 13 shows in conceptual form the difference between the image processing method of the invention and a prior art method.

The reason for performing image processing in the first and second directions independently of each other is described below with reference to FIG. 13 which shows conceptually how the position of one pixel in an image moves by the image processing if it is image processed in the first and second directions independently of each other according to the fourth embodiment of the invention.

Conventionally, to perform image processing which contains at least one step selected from the group consisting of the corrections of chromatic aberration of magnification and distortion and electronic scaling and which may additionally involve the correction of scanner's color divergence, the input image data is transformed at a time so that as-corrected output image data is produced. Consider that one point A0 in a certain subject within the input image whose pixel position before correction is represented by the coordinates (x0, y0) is corrected by image processing in which the correction of distortion, the correction of chromatic aberration of magnification and the increase or decrease of the electronic scaling ratio at a time. If the pixel position A0 is corrected by Dx and Dy as the result of image processing, the respective amounts of correction Dx and Dy are expressed as functions of x and y since they vary with the pixel position A0 (x0, y0). In other words, Dx should correctly be expressed as Dx(x0, y0) and Dy as Dy(x0, y0). After image processing, the pixel position A0 (x0, y0) shifts to the position A1 (x0+Dx(x0, y0), y0+Dy(x0, y0)). In the image processing under consideration, the amounts of correction Dx and Dy are determined by using the pixel position A0 (x0, y0) before image processing, so in order to process the overall image, a memory for two screens is required that is capable of storing not only the position information for the overall image before image processing but also the position information after image processing.

This is in sharp contrast with the image processing method according to the fourth embodiment of the invention. As in the conventional case, assume one point in a certain subject within the input image whose pixel position is represented as A0 (x0, y0). Also assume that the y-direction is taken as the first direction or the main scanning direction whereas the x-direction is taken as the second direction or the auxiliary scanning direction. In the first step, consider no movement in the x-direction but make a movement in the y-direction (main scanning direction) and determine the amount of correction Dy(x0, y0). As a result, the pixel position A0(x0, y0) before processing shifts to A2(x0, y0+Dy(x0, y0)) after processing. Then, using the thus processed information, consider a movement in the x-direction (auxiliary scanning direction) and determine the amount of correction Dx. Since this involves the processing of the pixel position A2(x0, y0+Dy(x0, y0)), the amount of correction in the x-direction (auxiliary scanning direction) is expressed as Dx(x0, y0+Dy(x0, y0)) and eventually the pixel position A0(x0, y0) shifts to A3(x0+Dx(x0, y0+Dy(x0, y0)), y0+Dy(x0, y0)) after image processing.

The new position A3(x0+Dx(x0, y0+Dy(x0, y0)), y0+Dy(x0, y0)) attained by the invention method is not in complete agreement with the pixel position A1(x0, Dx(x0, y0), y0+Dy(x0, y0)) which is attained by correct image processing in the above-described prior art method. However, considering an output image, the difference is small enough to be tolerable from all practical viewpoints. In addition, the processing performed in the invention is one-dimensional in that no movement is first considered in the x-direction but a movement is made in the y-direction to determine the amount of correction Dy in the y-direction and then using the data after movement in the y-direction, a movement is made in the x-direction to determine the amount of correction Dx; hence, a one-dimensional line memory suffices to store the position information for the entire image so that the required memory volume is lower than in the prior art. What is more, the time required by the corrective processing is sufficiently shortened to increase the processing speed. As a further advantage, since the amounts of correction Dx and Dy are calculated separately, one only need change the correction coefficients which are the parameters in the correction formulae and, in terms of hardware, the same circuit can be used to achieve a substantial cost reduction.

Described above is the most characterizing part of the processing means in the image processing method and apparatus according to the fourth embodiment of the invention. In the foregoing description, processing is first performed in the main scanning direction, then in the auxiliary scanning direction. The order may be reversed so that processing is first performed in the auxiliary scanning direction, then in the main scanning direction.

Generally speaking, the aberration characteristics of lenses are uniform in a plane perpendicular to the optical axis. However, if the film curves in form of concave as seen from the taking lens in a direction (main scanning direction) that is a right angle to the length of the film, the distortion and magnification chromatic aberration developing in that direction are smaller than in the longitudinal direction (auxiliary scanning direction); as a result, the input image data need be corrected for distortion and chromatic aberration is smaller amounts in the main scanning direction than in the auxiliary scanning direction. In this case, if correction is first made in the direction for the smaller amount of correction, less distortion and chromatic aberration of magnification develop than in the case where correction is first made in the direction for the greater amount of correction and the extent of image deterioration can be reduced. Therefore, if aberrations need be corrected in differing amounts between the main and auxiliary scanning directions, processing in the direction for the smaller amount of correction (which is either the main scanning direction or the auxiliary scanning direction) preferably precedes processing in the other direction.

In the example shown in FIG. 12, considering that the film with lens curves in form of concave as seen from the taking lens in a direction (main scanning direction) perpendicular to the length of the film, the corrections of chromatic aberration of magnification and distortion and electronic scaling are first performed in the main scanning direction and then the same corrections and electronic scaling are performed in the auxiliary scanning direction.

Note that in the processing in the auxiliary scanning direction, the correction of scanner's color divergence is performed between the correction of chromatic aberration of magnification or distortion and image enlargement or reduction by electronic scaling. As already mentioned, when reading the image data with the scanner 12, the line CCD sensors 34R, 34G and 34B are respectively used to read R, G and B images; in practice, however, these line sensors each extending in the main scanning direction are arranged by fixed spacing in the auxiliary scanning direction so that the individual images may sometimes be offset from one another as they are read with a preset reading method. To deal with this situation, the offsets between R, G and B images, namely, the color divergence in the scanner, is corrected before image enlargement or reduction is performed by electronic scaling.

Thus, different processing schemes are performed in the main and auxiliary scanning directions. However, in the fourth embodiment of the invention, one processing circuit is provided that is capable of performing four operations, the correction of chromatic aberration of magnification, the correction of distortion, the correction of scanner's color divergence and electronic scaling, and when correction is effected in the main scanning direction, parameters are set such that the image data simply passes unprocessed through the step of correction of the scanner's color divergence and when correction is effected in the auxiliary scanning direction, all corrective steps are performed. In this way, one and the same circuit can process the image data without regard to the direction of processing.

The aforementioned method of image processing which performs corrections in the first and second directions independently of each other is not limited to the correction of chromatic aberration of magnification and distortion and it may be applied to correct other lens-dependent aberrations such as deterioration of marginal rumination and defocusing.

After the necessary corrective steps are taken in the image correcting portion 146, the data is sent to the portion 148 for performing other image processing schemes such as sharpening and dodging; the data is then sent to the image data transforming subsection 66, where it is transformed to a form suitable for monitor display and thereafter displayed on the monitor 20. Looking at the display on the monitor 20, the operator checks if the image processing has been accomplished appropriately. If not, the operator adjusts the processing conditions.

If the operator adjusts the processing conditions for all of the prescanned images, fine scan starts. During fine scan, the image data is read with the scanner 12 at a higher resolution than in the prescan and image processing is performed under the conditions already determined by the prescanned image and image data suitable for outputting prints is produced.

When prescan has ended, the film F has been withdrawn from the film cartridge FC (see FIG. 7) to the frame of the last image and as the film F is rewound, fine scan is performed to read the successive image frames. In this process, the center position of each image frame on the film is calculated from the center position of the prescanned image data and, hence, the information about the center position is used to fine scan image frame by frame.

The output R, G and B signals from the scanner 12 are subjected to various corrections (e.g. DC offset correction, dark correction and shading correction) and log conversion to produce fine scanned image data as digital density data, which is then stored in the fine scan memory 56.

The fine scanned image data stored in the fine scan memory 56 is transferred to the LUT/MTX operation performing portion 152 and, on the basis of the image processing conditions adjusted and determined for the prescanned image by the operator, the data is subjected to various image processing schemes by look-up tables (LUT) which perform gray balance adjustment and by matrix operations (MTX) which perform chroma adjustment. The data processed in the LUT/MTX operation performing portion 152 is thereafter sent to the image correcting portion 154.

As in the case of the prescanned image data, the image correcting portion 154 corrects chromatic aberration of magnification and distortion and, optionally, scanner's color divergence, in the lens aberration correcting part 154A and performs electronic scaling in the enlarging/reducing part 154B. The image correcting portion 154 performs these operations using the lens type information obtained during prescan. Since the fine scanned image data is output as an image suitable for output in print form, the correction coefficients vary with several factors such as the number of pixels to be output by the printer, the size of the output from the printer which is an output condition that was set at prescan and the number of pixels in the input image data and eventually become different from the final correction coefficients determined by the prescanned image data for display on the monitor 20. The final correction coefficients to be used by the fine scanned image data are computed at the point in time when the prescanned image is checked and verified by the operator. Also calculated are the amount of pixel loss that results from the correction of distortion and the coefficient α for fine adjustment of the electronic scaling factor K that assures the occurrence of no pixel loss.

The image correcting portion 154 corrects the image data by using the above-described final correction coefficients, electronic scaling ratio K and fine adjustment coefficient α. As in the case of the prescanned image data, the correction of chromatic aberration of magnification, the correction of distortion and electronic scaling are performed in each of the image's main and auxiliary scanning directions, independently of each other, that are determined when the fine scanned image data is obtained. Specifically, as in the case of the prescanned image data, as shown in FIG. 12, the correction of chromatic aberration of magnification and distortion and electronic scaling are first performed in the main scanning direction and then the correction of chromatic aberration of magnification and distortion and electronic scaling are performed in the auxiliary scanning direction, with the correction of scanner's color divergence being performed after the correction of chromatic aberration of magnification and distortion but before the electronic scaling. The correction of scanner's color divergence is performed in order to correct the color divergence that occurs to the R, G and B images in the auxiliary scanning direction due to the line sensors 34R, 34G and 34B which are arranged by fixed spacing in the auxiliary scanning direction of the scanner 12.

The corrective steps are taken earlier in the main scanning direction than in the auxiliary scanning direction for the same reason as set forth in connection with prescan. The film under fine scan occasionally curves in form of concave as seen from the taking lens in a direction (main scanning direction) perpendicular to the length of the film. Since less correction need be performed in that direction (main scanning direction), the overall image will deteriorate in a smaller amount if it is first corrected in the direction less correction needed.

If there is no lens type recognizing code or if no lens type recognizing code has been recognized, neither chromatic aberration of magnification nor distortion is corrected and only electronic scaling is performed as in the case of the prescanned image data.

After being subjected to the correction of chromatic aberration of magnification, distortion (and optionally scanner's color divergence), as well as to electronic scaling, the data is transferred from the image correcting portion 154 to the image processing portion 156 where sharpening, dodging and any other necessary treatments are performed. The processed data is then sent to the image data transforming subsection 70.

In the image data transforming subsection 70, the data is transformed to a form suitable for outputting by the printer and thereafter sent to the printer 16 as output image data. If desired, image data for several frames may be composited on the basis of the fine scanned image data to construct output image data for index prints.

Using one of these kinds of output image data, the printer 16 exposes the image on a light-sensitive material (photographic paper), develops and otherwise treats it to produce finished prints or index prints which are subsequently output.

As described above in detail, in accordance with the fourth embodiment of the invention, the correction of distortion, the correction of chromatic aberration of magnification, electronic scaling and, optionally, the correction of scanner's color divergence are performed in the main and auxiliary scanning directions independently of each other and, hence, one needs to change only the correction coefficients used as parameters in correction formulae and all processing steps can be accomplished with one and the same circuit without distinguishing between the main and auxiliary scanning directions; as a result, the cost and size of the image processing apparatus can be reduced and yet the processing speed is increased, thereby ensuring that high-quality images free from distortion and color divergence can be processed in practicably large volumes even if the input image is taken with inexpensive cameras such as films with lens.

Described above are the basic features of the image processing method according to the fourth embodiment of the invention, as well as the basic construction of the image processing apparatus for implementing the method.

We now describe in detail the image processing method and apparatus according to the fifth embodiment of the invention with reference to FIGS. 14–25.

Figure 14:
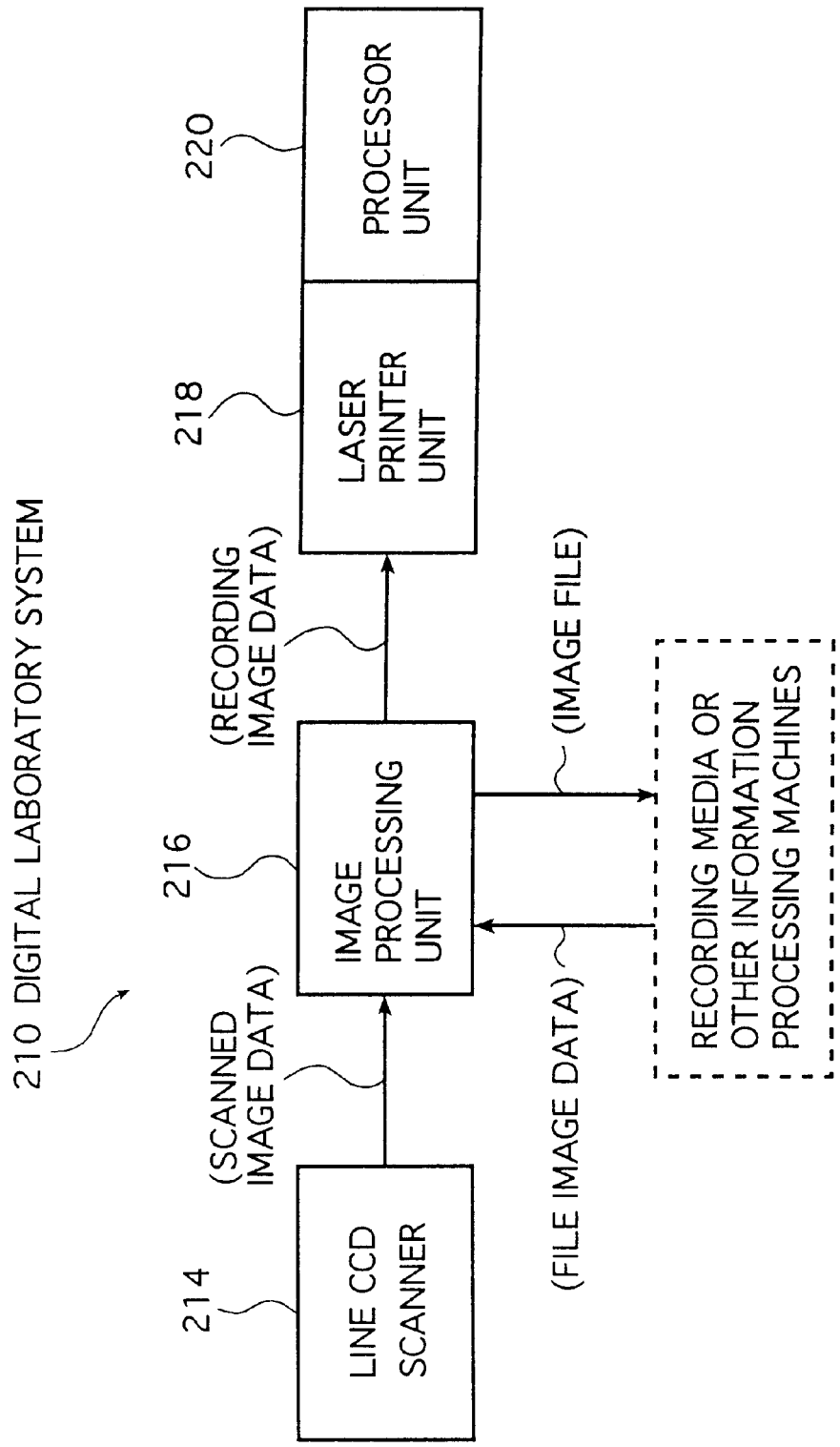
FIG. 14 is a block diagram showing an outline of an exemplary digital laboratory system using the image processing apparatus of the invention.
Figure 15:
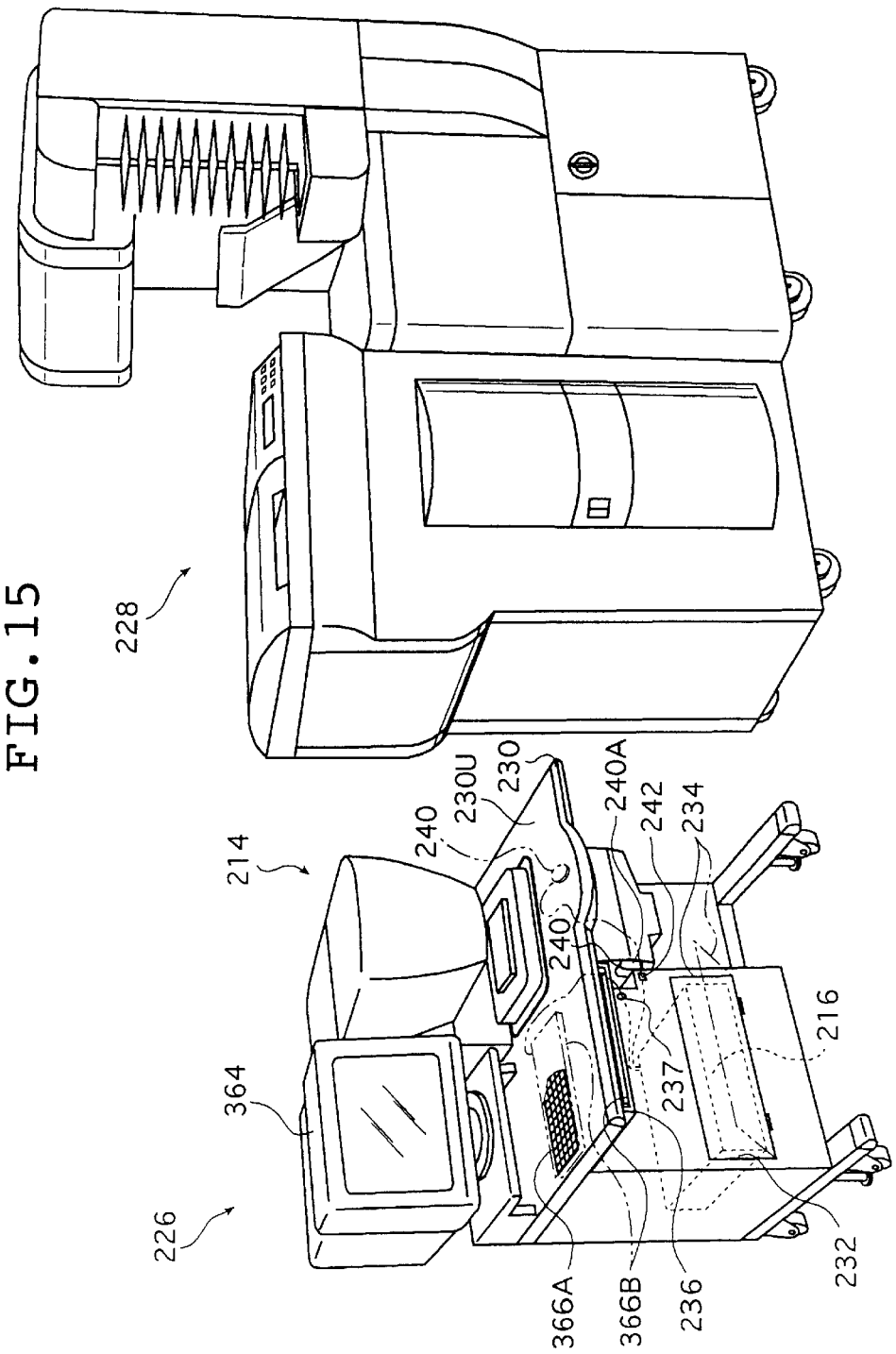
FIG. 15 is a perspective view showing the external appearance of the digital laboratory system of FIG. 14.

(Outline of the Overall System Configuration) FIG. 14 shows an outline of the overall configuration of the digital laboratory system 210 which applies the image processing apparatus that implements the image processing method according to the fifth embodiment of the invention. FIG. 15 shows the exterior view of the digital laboratory system 210. As shown in FIG. 14, the laboratory system 210 comprises a line CCD scanner 214, an image processing unit 216 as an example of the image processing apparatus according to the fifth embodiment, a laser printer unit 218 and a processor unit 220. The line CCD scanner (which is hereunder referred to simply as "scanner") 214 is made integral with the image processing unit 216 to form an input section 226 (see FIG. 15) whereas the laser printer unit 218 is made integral with the processor unit 220 to form an output section 228 (also see FIG. 15).

A photographic material such as a photographic film (e.g. a negative film or a reversal film; the photographic material is hereunder referred to simply as a "photographic film") has a recorded film image (i.e., a negative or positive image of an object that has been rendered visible by development after shooting). The scanner 214 is for reading this film image. Film images that can be read with the scanner 214 include those on a photographic film of 135 size, a photographic film of 110 size, as well as on a photographic film having a transparent magnetic layer formed thereon (i.e., a photographic film of 240 size, or so-called "APS film") and photographic films of 120 size and 220 size (i.e., Brownie size). The scanner 214 uses a 3-line color CCD sensor assembly to read the film image on one of these photographic films and outputs R,G,B image data.

As shown in FIG. 15, the scanner 214 is mounted on a work table 230. The image processing unit 216 is contained in a receptacle 232 formed under the work table 230 and a hinged door 234 is fitted into the opening of the receptacle 232. The receptacle 232 is normally closed to conceal its interior but if the door 234 pivots to open, the interior is exposed, making it possible to withdraw the image processing unit 216.

A display 364 is fitted on the work table 230 in a position away from the operator. In front of the display 364, two keyboards 366A and 366B are provided. The keyboard 366A is buried in the top surface of the work table 230. The other keyboard 366B, if it is not used, is contained in a drawer 236 slidable beneath the work table 230. When in use, the keyboard 366B is taken out of the drawer 236 and placed on top of the keyboard 366A. When the keyboard 366B is in use, a connector (not shown) provided at the tip of a cord (signal line) extending from the keyboard 366B is then fitted over a jack 237 on the work table 230, whereupon the keyboard 366B is electrically connected to the image processing unit 216 via the jack 237.

A mouse 240 is provided on the working surface 230U of the table 230. The cord (signal line) of the mouse 240 passes through a hole 242 in the work table 230 to reach into the receptacle 232 so that it is connected to the image processing unit 216. As long as it is not used, the mouse 240 is placed in a mouse holder 240A but if it need be used, the mouse 240 is taken out of the mouse holder 240A and replaced on the working surface 230U.

As already mentioned, the image processing unit 216 is supplied with the image data (scanned image data) output from the scanner 214. It is also designed to be such that other kinds of image data such as the one obtained by shooting with a digital camera, the one obtained by scanner reading of originals other than film images (as exemplified by reflection originals) and the one generated from a computer (these kinds of image data are hereunder collectively referred to as "file image data") can be supplied as input from external circuits (as by inputting via storage media such as memory cards or by inputting from other information processing machines over communication lines).

The image processing unit 216 performs image processing including various kinds of correction on the received image data and outputs it to the laser printer unit 218 as the recording image data. The image processing unit 216 is also designed to be capable of outputting the processed image data to an external circuit as an image file (as by outputting to information recording media such as memory cards or by outputting to other information processing machines over communication lines).

The laser printer unit 218 has three (R,G,B) laser light sources, from which laser light modulated in accordance with the recording image data supplied from the image processing unit 216 is applied to photographic paper, on which the original image is recorded by subsequent scan exposure. In the processor unit 220, the photographic paper on which the image has been recorded by scan exposure in the laser printer unit 218 is subjected to a photographic process consisting of color development, bleach-fixing, rinse and drying. This completes the process of image formation on the photographic paper.

(Configuration of the Image Processing Unit)

Figure 16:
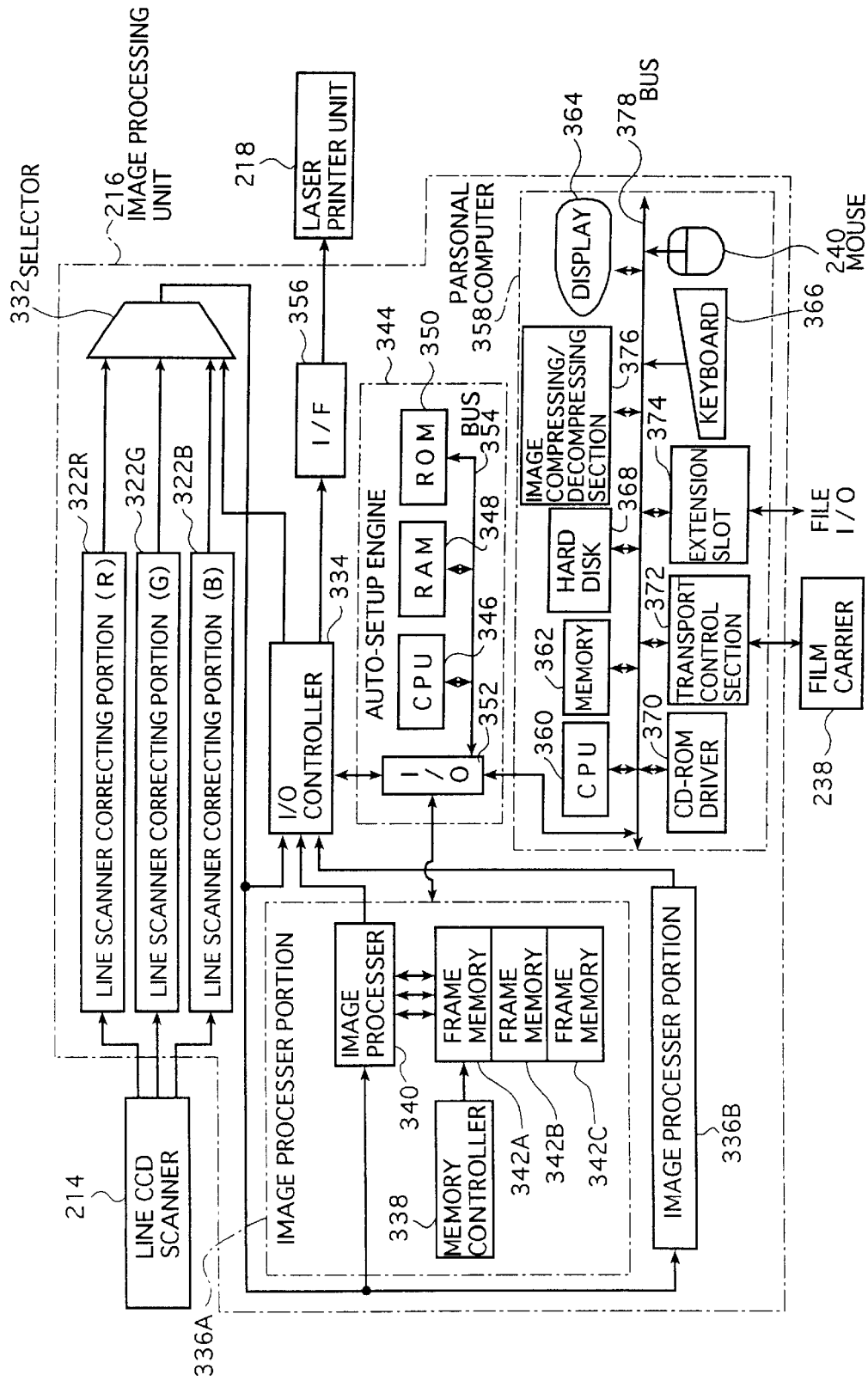
FIG. 16 is a block diagram showing an outline configuration of the image processing unit of the invention that is applied to the digital laboratory system of FIG. 14.

We now describe the configuration of the image processing unit 216 with reference to FIG. 16. As shown, the image processing unit 216 has line scanner correcting portions 322R, 322G and 322B in correspondence with R,G,B data supplied from the scanner 214. The line scanner correcting portions 322R, 322G and 322B have identical configurations and in the following description they are not distinguished from each other but are collectively referred to as "line scanner correcting portions 322".

Upon receiving the scanned image data from the scanner 214 when the line CCD sensors (which are hereunder referred to simply as line CCDs) have read the photographic film, the line scanner correcting portions 322 perform the following processing schemes in the order written: "dark correction" in which the dark output level of a corresponding cell is subtracted for each pixel from the received scanned image data; "density conversion" in which the dark corrected data is converted by logarithmic transformation to data representing the density of the photographic film; "shading correction" in which said density converted data is corrected pixel by pixel in accordance with the unevenness in the quantity of the light illuminating the photographic film; and "defective pixel correction" in which the data that has been subjected to said shading correction and that represents cells (so-called "defective pixels") that do not produce a signal in exact correspondence to the quantity of the incident light is generated by interpolation from the data representing the surrounding pixels.

The output terminals of the line scanner correcting portions 322 are connected to corresponding input terminals of a selector 332 such that the data that has been subjected to the above-mentioned processing schemes in the line scanner correcting portions 322 are input as scanned data to the selector 332. The selector 332 has one more input terminal that is connected to a data output terminal of an I/O controller 334 so that file image data input from an external circuit is transferred from the I/O controller 334 to the selector 332. The output terminal of the selector 332 is connected to the data input terminals of the I/O controller 334, and image processor portions 336A and 336B. The selector 332 is adapted such that the input image data can be selectively output to the I/O controller 334 or image processor portion 336A or 336B.

The image processor portion 336A has a memory controller 338, an image processor 340, and three frame memories 342A, 342B and 342C. Each of the frame memories 342A, 342B and 342C has a sufficient capacity to store the image data representing at least one frame of the film image. The image data input from the selector 332 is controlled by the memory controller 338 such that it is stored directly in either one of the three frame memories 342; alternatively, the input image data is stored after it is subjected to specified image processing in a one-dimensional image processing portion 254 (to be described below in detail) of the image processor 340.

The order in which image data is supplied from the scanner 214 to the image processing unit 216 agrees with the direction of reading of the photographic film with the scanner 214, or the direction of raster scan in which auxiliary scanning is performed in the direction of transport of the photographic film. When image data is input to the image processor portion 336 via the line scanner correcting portions 322 and the selector 332, the data representing individual pixels are input in the order that coincides with the direction of raster scan [stated more specifically, lines parallel to the main scanning direction which is perpendicular to the transport of the photographic film (and which corresponds to "the first direction" of the present invention; to be hereunder referred to as "y-direction") are assumed and the data representing the pixels composing the individual lines are input line by line, starting with the pixel located at the end where main scanning of each line starts].

The memory controller 338 controls the reading address such that when image data is read from either one of the frame memories 342A, 342B and 342C (the one that stores the image data to be processed and which is hereunder referred to simply as "frame memory 342"), the order of image data reading agrees with the direction coinciding with the aforementioned direction of raster scan or a direction coinciding with a scan direction 90° offset from the direction of raster scan [stated more specifically, lines parallel to the auxiliary scanning direction which coincides with the direction of transport of the photographic film (and which corresponds to the "second direction" of the present invention; to be hereunder referred to as "x-direction") are assumed and the data representing the pixels composing the individual lines are read out line by line, starting with the pixel located at the end of each line].

Figure 17:
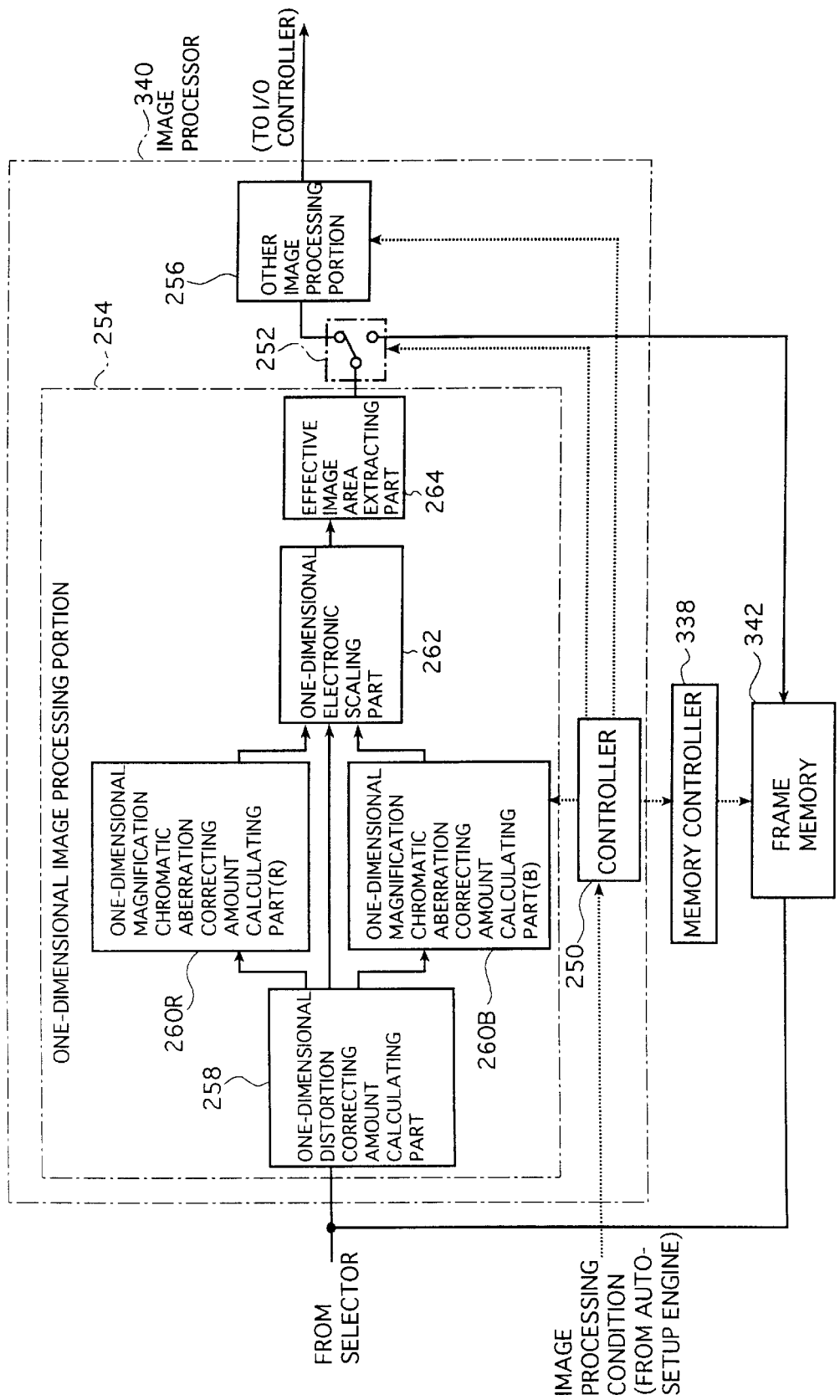
FIG. 17 is a block diagram showing an outline configuration of the image processor in the image processing apparatus of FIG. 16.

As shown in FIG. 17, the image processor 340 has a controller 250, a one-dimensional image processing portion 254, a switching portion 252 and a portion 256 for performing other image processing schemes. The one-dimensional image processing portion 254 is composed of a one-dimensional distortion correcting amount calculating part 258, a one-dimensional magnification chromatic aberration correcting amount calculating part 260R, a one-dimensional magnification chromatic aberration correcting amount calculating part 260B, a one-dimensional electronic scaling part 262 and an effective image area extracting part 264. Note that the one-dimensional distortion correcting amount calculating part 258, the one-dimensional magnification chromatic aberration correcting amount calculating parts 260R and 260B and the one-dimensional electronic scaling part 262 correspond to the "image processing means" of the present invention whereas the controller 250 corresponds to the "control means" of the present invention.

The image data input to the image processor 340 is first entered in the one-dimensional image processing portion 254. To this end, the controller 250 refers to the image processing conditions being notified from an auto-setup engine 344 (to be described later) and determines whether the image data input to the image processor 340 (and to be processed therein) is one that represents the film image recorded on a photographic film by means of a film with lens (which is hereunder referred to as "LF"); such image data is hereunder referred to as "LF image data").

If the image data to be processed is not LF image data, the controller 250 controls the one-dimensional image processing portion 254 such that the data is only subjected to one-dimensional electronic scaling in the one-dimensional electronic scaling portion 262. One-dimensional electronic scaling is the process of transforming the number of pixels in the image data (i.e., resolution) in order to ensure that the image represented by the image data can be recorded on a recording material in a specified size at a specified recording density; according to the electronic scaling ratio which is one of the image processing conditions being notified from the auto-setup engine 344, the number of pixels (resolution) is transformed in a single direction (x- or y-direction) corresponding to the order of input of the image data. In transformation of the number of pixels, each position of a pixel after transformation does not usually overlap each position before transformation, so the value of the density at the position of each pixel after transformation is also calculated by arithmetic interpolation.

If the image data to be processed is LF image data, the controller 250 controls the one-dimensional image processing portion 254 to perform not only the above-described one-dimensional electronic scaling but also the following processing schemes in the other parts of the one-dimensional image processing portion 254: one-dimensional distortion correction which is performed in the one-dimensional distortion correcting amount calculating part 258 such that any geometrical distortion in the image due to the distortion of the lens of the LF is corrected in a single direction corresponding to the order of image data input; one-dimensional magnification chromatic aberration correction which is performed in the one-dimensional magnification chromatic aberration correcting amount calculating parts 260R and 260B such that any color divergence in the image due to the chromatic aberration of magnification of the lens of the LF is corrected in a single direction corresponding to the order of image data input; and effective image area extraction which is performed in the effective image area extracting part 264 to extract an effective image area that is free from any loss of pixels that has occurred in end portions of the image along a single direction (x- or y-direction) corresponding to the order of image data input as the result of the above-mentioned one-dimensional distortion correction and one-dimensional magnification chromatic aberration correction.

The image data that has been subjected to the above-described processing schemes in the one-dimensional image processing portion 254 is then input to the switching portion 252. The switching portion 252 is composed of a switching element and so forth and controlled by the controller 250 to be able to select either the first state in which the input image data is output to the portion 256 for performing other image processing schemes or the second state in which the input image data is output to the frame memory 342 (i.e., stored in the frame memory 342 without being further processed in the portion 256).

This is how the image input from the selector 332 is processed in the one-dimensional image processing portion 254. The first image processing scheme to be done is in the y-direction corresponding to the order of image data input from the selector 332 to the image processor 340. The controller 250 controls the switching portion 252 such that the image data that has been subjected to the image processing in the y-direction is stored temporarily in the frame memory 342 via the switching portion 252. Thereafter, the controller 250 controls, via a memory controller 338, the order of reading said image data such that it is read from the frame memory 342 in an order different from the above-mentioned order of input by 90°. The thus read image data are sequentially input to the one-dimensional image processing portion 254, which then performs one-dimensional image processing in the x-direction corresponding to the above-mentioned order of image data reading. The controller 250 then controls the switching portion 252 such that the image data that has been subjected not only to the image processing in the y-direction but also to the image processing in the x-direction is input to the image processing portion 256 via the switching portion 252.

In the image processing portion 256, the input image data is subjected to various image processing schemes in accordance with the processing conditions that have been determined for each original film image with the auto-setup engine 344 and notified to the controller 250. The image processing schemes to be executed in the image processing portion 256 include, for example, gradation conversion, color transformation, hypertoning for compressing the gradation of an ultra-low frequency brightness component of the image and hyper-sharpening for enhancing the image sharpness while suppressing its graininess. In short, image processing schemes for improving the quality of the output image (which may be designated as "standard image processing schemes") are executed in the image processing portion 256.

The image processing portion 256 may be adapted to be capable of executing "non-standard" image processing schemes that should be executed selectively on the basis of individual images (or a group of images such as one of the images recorded on a single roll of photographic film). Examples of such "non-standard" image processing schemes include one that changes the tone of image intentionally (as by processing the output image to have a finish in monotone or like portrait or in sepia) and one that trims the image. The image taken with a LF may also be subjected to various LF aberration correcting schemes for correcting the deterioration in the quality of the output image that occurs from the characteristics of the lens of the LF; examples of such LF aberration correcting schemes include marginal lumination deterioration correction that corrects the decrease in the brightness at the edge of the image resulting from the marginal lumination deterioration of the lens of the LF and defocusing correction that corrects the decrease in the sharpness of the image resulting from the characteristics of the lens of the LF.

The image processor 340 is connected to the I/O controller 334 so that the processed image data is stored temporarily in the frame memory 342 before it is output to the I/O controller 334 at a specified timing. The image processor 336B has an identical configuration to the above-described image processor 336A and need not be described in detail.

In the embodiment under consideration, individual film images are read twice in the scanner 214 at different resolutions. In the first reading at a comparatively low resolution (which is hereunder referred to as "prescan"), the entire surface of the photographic film is read under the reading conditions (the quantities of the R, G and B components of the light to be incident on the photographic film and the charge accumulation times of the line CCDs) that have been so determined that the line CCDs will not be saturated with accumulated charges even if the density of the film image is very low (as in the case of an underexposed negative image on a negative film). The data obtained by prescan (which is hereunder referred to as "prescanned data") is output from the selector 332 to the I/O controller 334.

The auto-setup engine 344 is connected to the I/O controller 334. The auto-setup engine 344 has a CPU 346, a RAM 348 (such as DRAM), a ROM 350 (such as ROM of which storage content is rewritable) and an I/O port 352; these components are interconnected with a bus 354.

On the basis of the prescanned data input from the I/O controller 334, the auto-setup engine 344 determines the frame position of the film image and extracts the data (prescanned image data) corresponding to the region of the photographic film where the film image is recorded. On the basis of the prescanned image data, the auto-setup engine 344 determines the size of the film image and calculates image characteristic quantities such as density to determine the reading conditions under which the prescanned photographic film is subjected to a second reading with the scanner 214 which is performed at a comparatively high resolution (and which is hereunder referred to as "fine scan"). The thus determined frame position and reading conditions are output to the scanner 214.

The auto-setup engine 344 has another function. On the basis of the prescanned image data representing two or more frames of the film image, the auto-setup engine 344 automatically determines by arithmetic operations the conditions for the image processing to be performed on the image data (fine scanned image data) obtained by fine scan with the scanner 214; the auto-setup engine 344 then outputs the determined image processing conditions to the image processor 340 in the image processor portion 336. To determine the image processing conditions, a check is first made to see if similar scenes were shot in a plurality of film images (the check is based on the amount of exposure at the shooting, the type of the shooting light source and other characteristic features or quantities) and if the answer is yes, the conditions for processing those film images are determined such that they are identical or close to one another.

Optimal image processing conditions also depend on whether the processed image data is used in recording an image on photographic paper in the laser printer unit 218, or presentation on a suitable means such as a display or storage in an information recording medium. The image processing unit 216 has two image processor portions 336A and 336B, so if the image data is not only used in recording an image on photographic paper but also output to an external circuit, the auto-setup engine 344 performs arithmetic operations for setup for the respective uses, determines optimal processing conditions for each use and outputs them to the image processor portions 336A and 336B, in which the same fine scanned image data is subjected to image processing under different conditions.

The auto-setup engine 344 has the following additional function to perform; on the basis of the prescanned image data about the film image that has been input from the I/O controller 334, the auto-setup engine 344 calculates image recording parameters that define the gray balance and other requirements to be met for recording the image on photographic paper in the laser printer unit 218 and outputs them simultaneously with the recording image data (to be described later) to the laser printer unit 218. The auto-setup engine 344 also performs the arithmetic operations as described above to determine the conditions for the image processing of the file image data input from an external circuit.

In the ROM 350 in the auto-setup engine 344, the distortion correcting data and the magnification chromatic aberration correcting data to be used in the aforementioned corrections of distortion and chromatic aberration of magnification are preliminarily stored for each type of the lenses used in various kinds of LF.

Figure 18A:
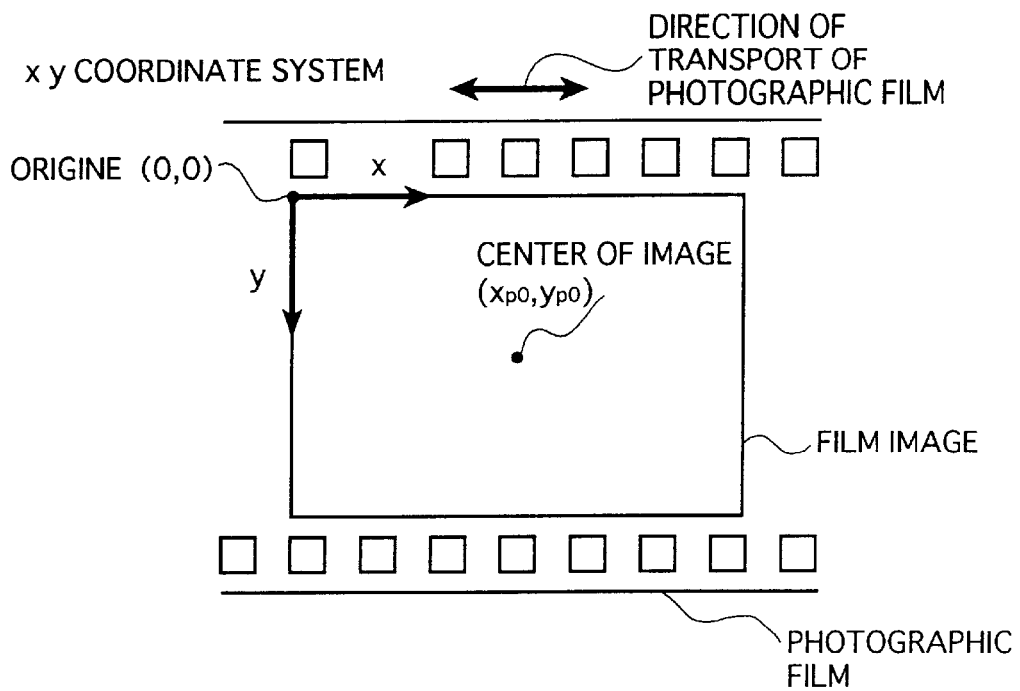
FIGS. 18A and 18B show in conceptual form the xy and $x_P y_P$ coordinate systems, respectively, that are set against a film image.
Figure 18B:
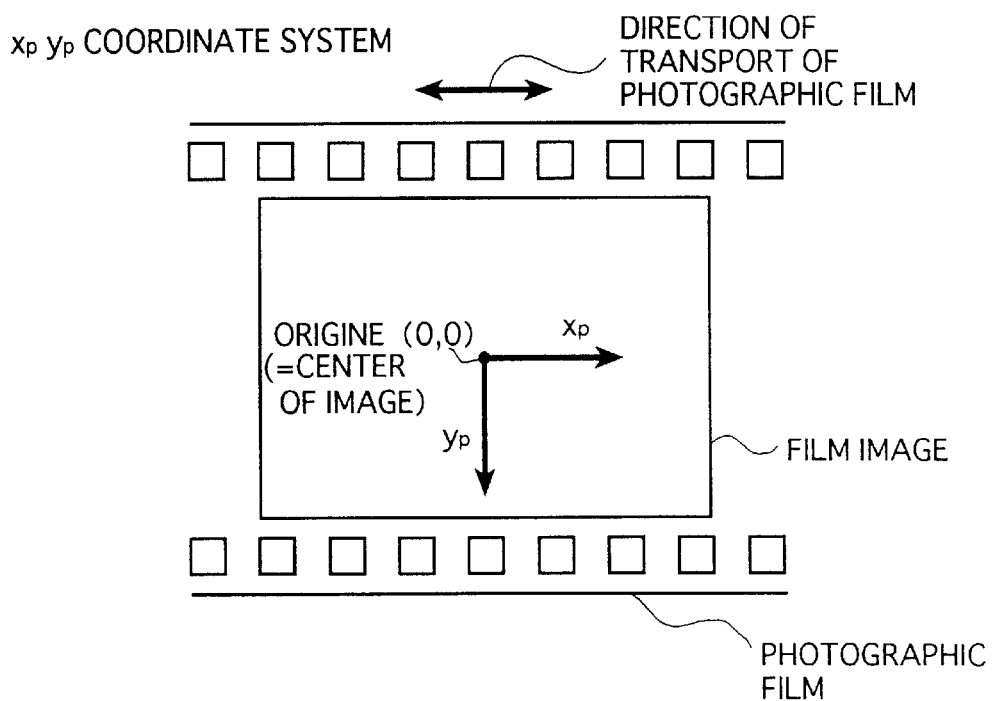

The distortion correcting data is used in distortion aberration correction, or the process of correcting the geometrical distortion of the image resulting from the lens distortion. This data is set for each lens type on the basis of the results of lens-by-lens measurements of the direction and amount of the change in pixel position at each position on the film image that results from the lens distortion. In the embodiment under consideration, G is selected as a reference color and the distortion correcting data is obtained by the following procedure: the result of measurement of the change in pixel position for G (i.e., the amount of distortion) in each position on the film image that occurs from the lens distortion is resolved in x- and y-directions, and the amount of distortion in each position on the image is represented with reference to an $x_p y_p$ coordinate system [as shown in FIG. 18B, a given pixel on the image is expressed by coordinate values $(x_p, y_p)$, with the center of the image $(x_{po}, y_{po})$ being the origin (=(0, 0))] such that the amount of distortion in x-direction is expressed as $Dx(x_p, y_p)$ and the amount of distortion in y-direction as $Dy(x_p, y_p)$.

The magnification chromatic aberration correcting data is used in the correction of chromatic aberration of magnification, or the process of correcting the color divergence of the image resulting from the chromatic aberration of magnification of the lens. This data is set for each lens type on the basis of the results of lens-by-lens measurements of the direction and amount of the change in pixel position for non-reference colors with respect to the pixel position of the reference color at each position on the film image that results from the chromatic aberration of magnification of the lens.

In the embodiment under consideration, R and B are selected as the non-reference colors and the magnification chromatic aberration correcting data for R is obtained by the following procedure: the result of measurement of the change in pixel position (i.e., the amount of chromatic aberration of magnification) for R with respect to G at each position on the film image that results from the chromatic aberration of magnification of the lens is resolved in x- and y-directions and the amount of chromatic aberration of magnification for R at each position on the image is represented with reference to the $x_p y_p$ coordinate system such that the amount of chromatic aberration of magnification for R in x-direction is expressed as $\Delta Rx(x_p, y_p)$ and the amount of chromatic aberration of magnification for R in y-direction as $\Delta Ry(x_p, y_p)$. The chromatic aberration of magnification data for B is obtained by the following similar procedure: the result of measurement of the change in pixel position (i.e., the amount of chromatic aberration of magnification) for B with respect to G at each position on the film image that results from the chromatic aberration of magnification of the lens is resolved in x- and y-directions and the amount of chromatic aberration of magnification for B at each position on the image is represented with reference to the $x_p y_p$ coordinate system such that the amount of chromatic aberration of magnification for B in x-direction is expressed as $\Delta Bx(x_p, y_p)$ and the amount of chromatic aberration of magnification for B in y-direction as $\Delta By(x_p, y_p)$.

The I/O controller 334 is connected to the laser printer unit 218 via an I/F circuit 356. If the processed image data is used in recording an image on photographic paper, the image data that has been subjected to image processing in the image processor portion 336 leaves the I/O controller 334 and passes through the I/F circuit 356 to be output as recording image data into the laser printer unit 218.

The auto-setup engine 344 is also connected to a personal computer 358. If the processed image data is output as an image file to an external circuit, the image data that has been subjected to image processing in the image processor portion 336 passes through the I/O controller 334 and the auto-setup engine 344 to be output to the personal computer 358.

The personal computer 358 has a CPU 360, a memory 362, a display 364, a keyboard 366 (corresponding to the keyboards 366A and 366B in FIG. 15), a mouse 240 (also see FIG. 15), a hard disk 368, a CD-ROM driver 370, a transport control section 372, an extension slot 374 and an image compressing/decompressing section 376. These components are interconnected via a bus 378.

The personal computer 358 incorporates the prescanned image data that has been extracted from the prescanned data by the auto-setup engine 344; it also incorporates the image processing conditions that have been determined with the auto-setup engine 344 and, on the basis of the incorporated image processing conditions, generates simulated image data from the prescanned image data by subjecting it to an image processing scheme that is equivalent to the image processing to be performed on the fine scanned image data in the image processor 340.

The personal computer 358 converts the generated simulated image data to a signal for image presentation on the display 364 and presents a simulated image on the display 364 on the basis of the signal. The operator verifies the image quality and other features of the simulated image on the display 364; when a command for modifying the processing conditions is input from the keyboard 366 as information on the result of the verification, the same command is output to the auto-setup engine 344, which then performs the necessary schemes such as another set of arithmetic operations to modify the image processing conditions.

The transport control section 372 of the personal computer 158 is connected to a film carrier 238 set in the scanner 214 and controls the transport of the photographic film by means of the film carrier 238. In the case where an APS film is set in the film carrier 238, the information that the film carrier 238 reads from the magnetic layer on the APS film (for example, the print size) is input to the transport control section 372.

A driver (not shown) for reading data from and writing data to an information storage medium such as a memory card and a communication control apparatus for establishing communication with other information processing machines are connected to the personal computer 358 via the extension slot 374. If the I/O controller 334 supplies the personal computer 358 with image data to be output to an external circuit, this image data passes through the extension slot 374 to be output as an image file to an external circuit (e.g. the aforementioned driver or communication control apparatus). If the file image data is input to the personal computer 358 from an external circuit via the extension slot 374, the input file image data is output to the I/O controller 334 via the auto-setup engine 344, which then outputs the received file image data to the selector 332.

(Operation)

We now describe the operation of the embodiment under consideration. The scanner 214 performs two readings (prescan and fine scan) on the film image recorded on a photographic film. When the entire surface of the photographic film to be processed (from which image information is to captured) is prescanned with the scanner 214 to have the prescanned data input to the image processing unit 216 from the scanner 214, dark correction, density conversion, shading correction and defective pixel correction are performed on the input prescanned data by means of the line scanner correcting portions 322.

Figure 19:
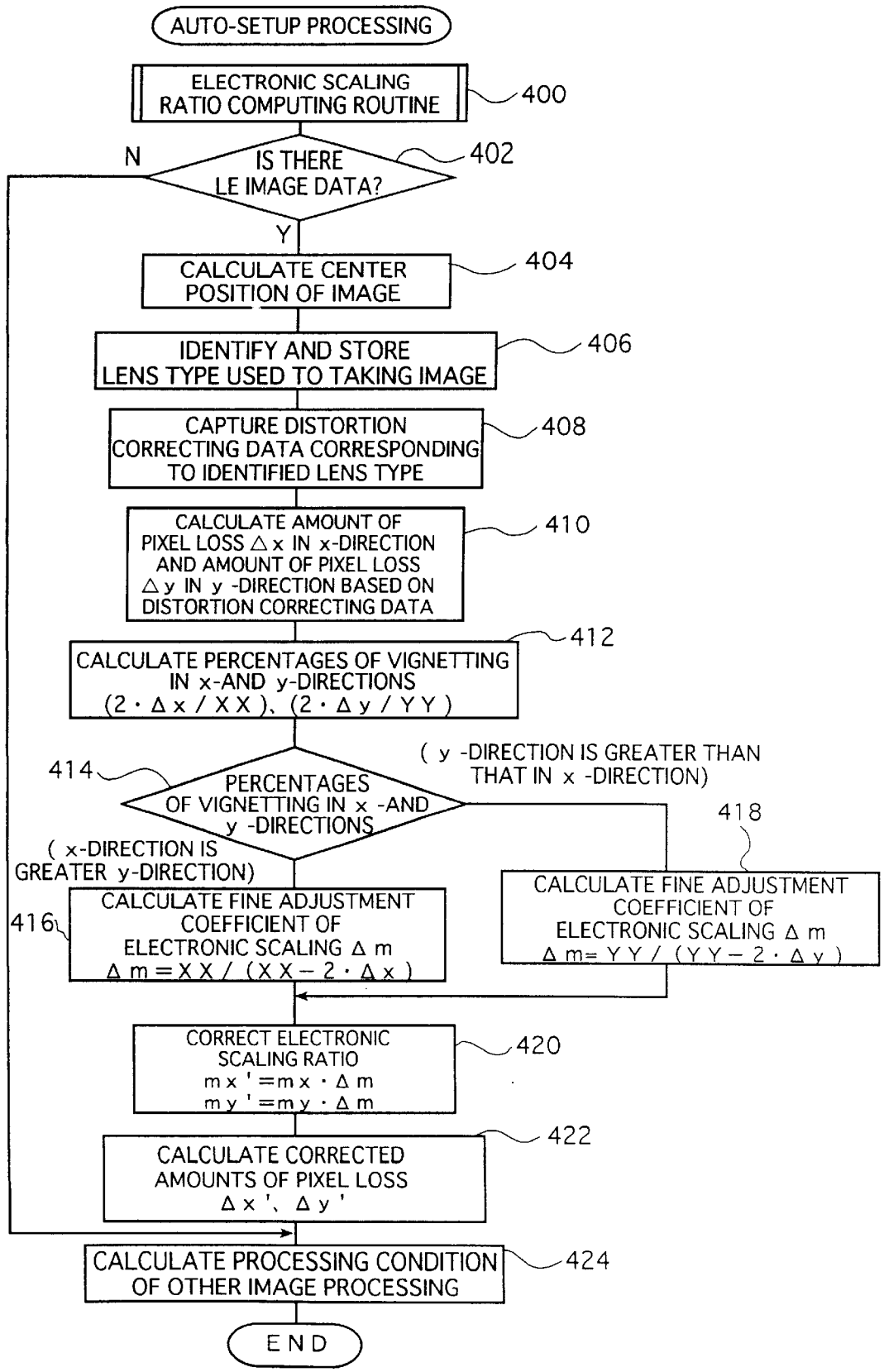
FIG. 19 is a flowchart showing the steps that may be followed in an auto-setup process that is executed by the auto-setup engine in the image processing apparatus of FIG. 16.

The prescanned data output from the line scanner correcting portions 322 are fed into the auto-setup engine 344 via the selector 332. In the auto-setup engine 344, processing schemes such as the determination of the frame position of the film image, extraction of the prescanned image data and determination of the reading conditions for fine scan are sequentially performed and, thereafter, an auto-setup process is performed for computing the conditions for the various image processing schemes to be executed in the image processor 340. On the following pages, the auto-setup process is described with reference to the flowchart in FIG. 19. Note that FIG. 19 shows the flow of the auto-setup process that is performed on a single film image and in practice the images recorded on the same photographic film are sequentially subjected to the process described below.

Figure 20:
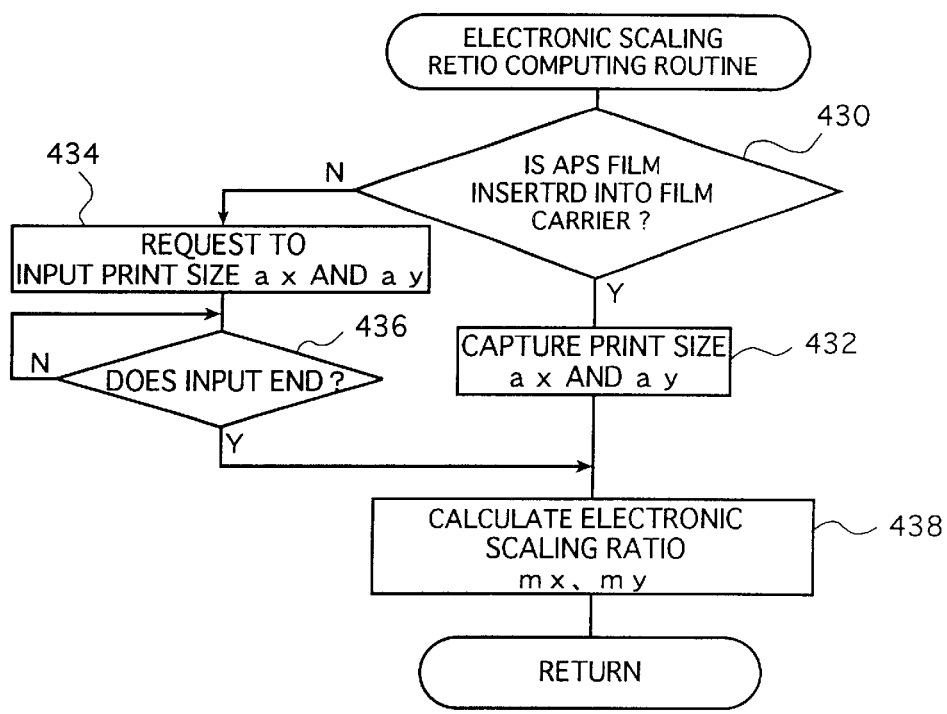
FIG. 20 is a flowchart showing an example of the electronic scaling ratio routine that is executed during the auto-setup process shown in FIG. 19.
Figure 23A:
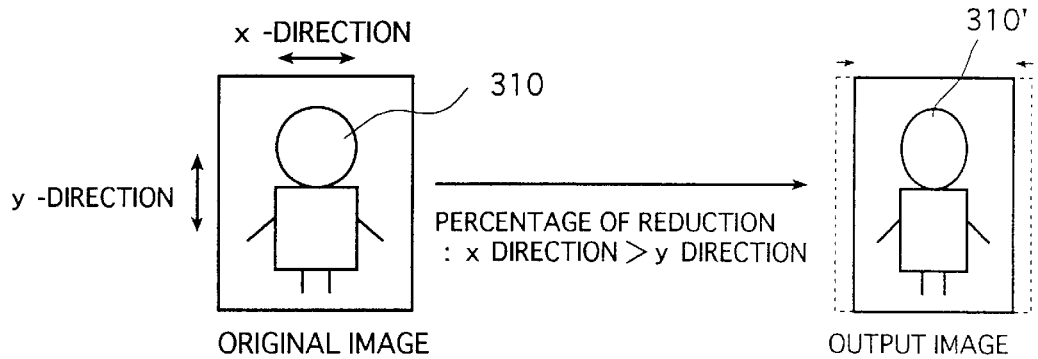
FIGS. 23A and 23B show graphically how a human subject in the original image comes out in a print if it is processed by the "finish to slender" technique and reduced or enlarged by electronic scaling in the image processing method of the invention.
Figure 23B:
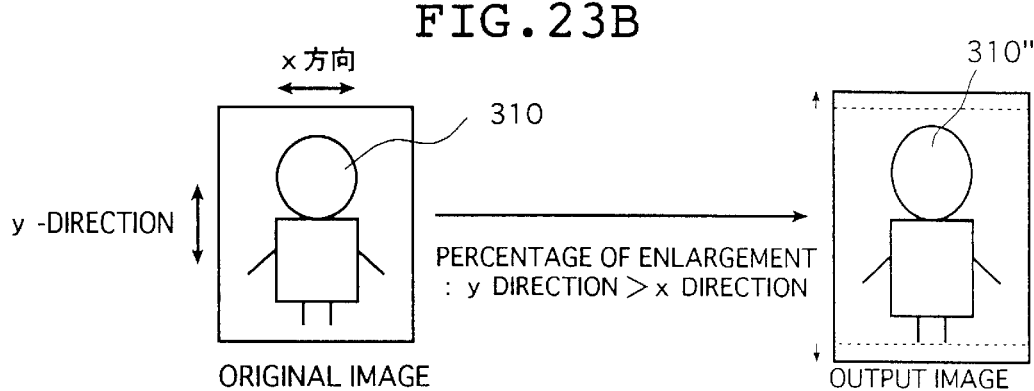

First, in step 400, the electronic scaling ratio computing routine shown in FIG. 20 is executed. In step 430 (see FIG. 20), determination is made as to whether the photographic film inserted into the film carrier 238 is an APS film or not. As already mentioned, in the case of APS film, the print size (the size of the image to be recorded on photographic paper) is recorded on the magnetic layer of an APS film. Therefore, if the photographic film is found to be an APS film in step 430, the process goes to step 432 and the print size ax in x-direction and the print size ay in y-direction are acquired from the magnetic layer of the APS film. Thereafter, the process goes to step 438.

If the photographic film is not found to be an APS film in step 430, the process goes to step 434 and the personal computer 358 requests the operator to input the print size by representing a message on the display 364 to the effect that the print sizes in x- and y-directions should be input. In subsequent step 436, the computer 358 waits for the operator to enter those print sizes.

If the display 364 shows the message requesting the input of the print sizes, the operator enters the desired print sizes ax and ay in x- and y-directions from the keyboard 366.

If the operator keys in the print sizes ax and ay (if the answer to the question asked in step 436 is affirmative), the process goes to step 438.

In step 438, on the basis of XX and YY which denote the desired numbers of pixels in x- and y-directions in the output image (either recorded on the photographic paper or represented on the display or represented by the image data stored in an information recording medium) that are determined on the thus acquired print sizes ax and ay, as well as X and Y which denote the numbers of pixels in x- and y-directions in the fine scanned image data obtained by fine scan, electronic scaling ratios mx and my in x- and y-directions that are employed in the electronic scaling of the fine scanned image data are calculated (mx=XX/X, my=YY/Y).

The reading resolution for fine scan may be varied with the type of the document to be read (e.g. whether it is a photographic film of 135 size, 110 size, 240 size (APS), 120 size or 220 size (brownie size)) and the pixel numbers X and Y in x- and y-directions of the fine scanned image data are determined in accordance with the reading resolution for fine scan and the size of the image to be read.

The electronic scaling ratios mx and my in x- and y-directions are usually set at equal values (i.e., X/Y=XX/YY) so that the aspect ratio of the image represented by the image data after electronic scaling will not vary from the original image. However, in other cases such as where the reading resolution for fine scan differs between x- and y-directions and where a special finishing technique (e.g. "finish to slender") for slightly reducing or enlarging the image in either x- or y-direction is to be adopted, different values are set for mx and my. The following description concerns the case of performing a "finish to slender" technique in which the proportion of the print size ay to the print size ax is preliminarily set to be slightly larger than the proportion of the size of the original image in y-direction to its size in x-direction.

When the calculation of the electronic scaling ratios ends, the process goes to step 402 (see FIG. 19), in which determination is made as to whether the image to be processed is LF image data which represents the film image recorded on the photographic film by taking with an LF (film with lens). Photographic films used as LF are brought into the image processing system as they are contained in the LF body. In view of this fact, one way to determine whether the image data to be processed is LF image data or not is by removing the photographic film from the LF body, identifying the type of the LF, providing the photographic film with a mark indicating which of the many types of LF currently on the market was used to take the image, and checking to see if such mark is present in the film to be processed. A different method may be employed if the photographic film has a magnetic layer with it; an identifying code showing information of the same nature as the above-mentioned mark is preliminarily recorded on the magnetic layer and check is made to see if such identifying code is recorded on the film to be processed. Alternatively, during the manufacture of LFs, the above-described mark may be attached to photographic films to be used as LFs or the identifying code may be recorded on the magnetic layer.

If the answer to the question asked in step 402 is negative, the process jumps to step 424, in which various image characteristic quantities are calculated on the basis of the prescanned image data and the conditions for the various image processing schemes to be performed in the image processing portion 256 in the image processor 340 are also calculated on the basis of the thus calculated image characteristics quantities, whereupon the auto-setup process ends. In this case, the calculated image processing conditions are subjected to a verification step and then notified to the image processor 340 (to its controller 250 to be more exact) together with the electronic scaling ratios mx and my (as computed in step 400) when the image processor 340 performs image processing on the image data.

If the image data to be processed is LF image data, the answer to the question asked in step 402 is affirmative and the process goes to step 404. In the example under consideration, the LF image data (more particularly, the fine scanned image data representing the film image recorded on the photographic film by taking with the LF) is corrected for distortion and chromatic aberration of magnification in the one-dimensional image processing portion 254 of the image processor 340. To this end, the center position of the image as the reference for the correction of distortion and chromatic aberration of magnification is calculated in step 404 on the basis of the prescanned image data.

The center position of the image can be calculated in the following manner: $X_P$ or the number of pixels in the prescanned image data in x-direction and $Y_P$ or the number of pixels in the same data in y-direction are calculated and with reference to the pixel corresponding to a corner of the film image [if an xy coordinate system having the origin at the upper left corner of the film image (see FIG. 18A) is assumed, said corner is the origin of this coordinate system], the pixel moved by ($X_P/2$) in x-direction and by ($Y_P/2$) in y-direction (the pixel has the coordinates ($x_{PO}$, $y_{PO}$) in the xy coordinate system shown in FIG. 18A; $x_{PO}=X_P/2$, $y_{PO}=Y_P/2$) is extracted as the pixel at the center position of the image.

In next step 406, the type of the lens used to take the film image represented by the prescanned image data is identified and the identified lens type is stored. This lens type identification can be accomplished by reading the aforementioned mark or identifying code to know what type of film with lens was used to take and record the image on the photographic film. In next step 408, the distortion correcting data corresponding to the thus identified lens type is captured.

Figure 25A:
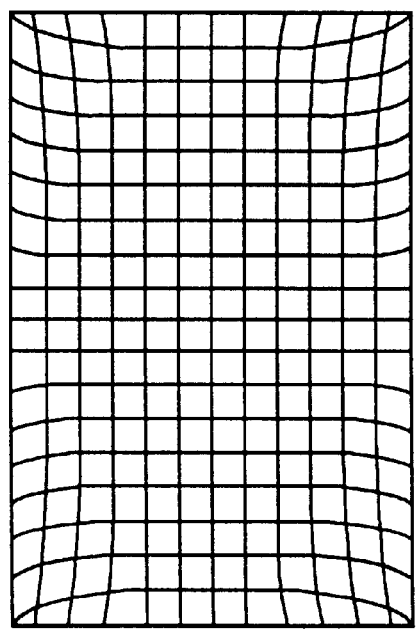
FIG. 25A shows graphically the geometric distortion of an image due to lens distortion.
Figure 25B:
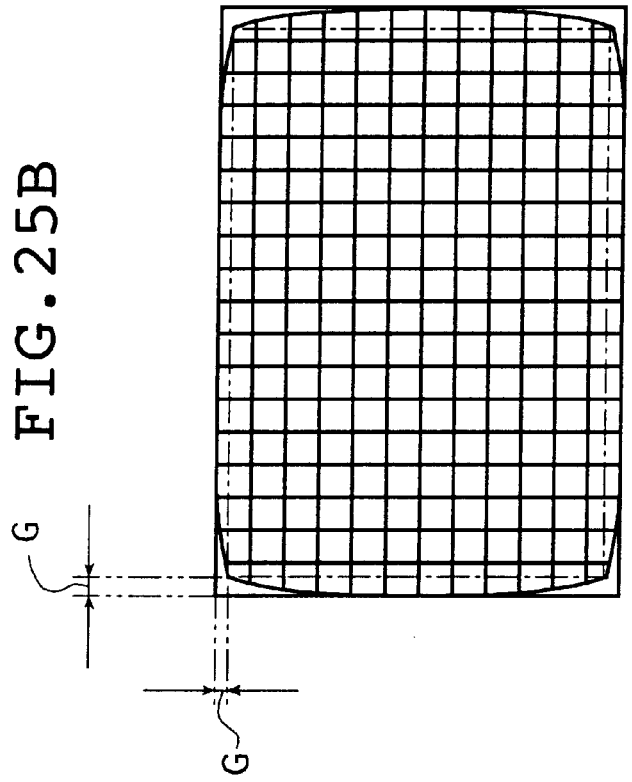
FIG. 25B shows graphically the outer edge of an image that is represented by image data after it has been corrected for the distortion.

When image data are corrected for distortion and chromatic aberration of magnification, pixel losses accompany the correction, as typically shown in FIG. 25B. To deal with this situation, in step 410 and onward, the one-dimensional electronic scaling portion 262 in the image processor 340 performs electronic scaling and the electronic scaling ratios are corrected in such a way that the number of pixels in the image data for the effective image area (the number of pixels in the output image) that will be extracted by the effective area extracting portion 264 to become free of any loss of pixels is equal to a predetermined value.

In the image processor 340 of the example under consideration, the correction of distortion and chromatic aberration is performed in y- and x-directions independently of each other. Assume here image data of the type shown in FIG. 21A that represents an original image having a rectangular contour and which has X pixels in x-direction and Y pixels in y-direction. Also assume that this image data is first corrected for distortion and chromatic aberration of magnification in y-direction and then subjected to electronic scaling in y-direction at the electronic scaling ratio my. As shown in FIG. 21B, the number of pixels in y-direction is equal to the desired number YY (=Y·my) but blanks or regions having indeterminate density values occur at the four corners of the image. If the region excluding such pixel losses (the region is delineated by a thick line in FIG. 21B) is regarded as the image area, the shape of its outer edge also changes only in y-direction. While the image area has four sides to define its outer edge, the change appears on the two sides parallel to the y-direction (they are curved).

Figure 21A:
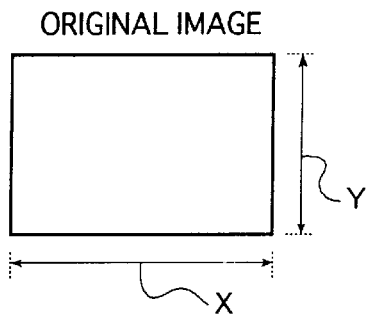
Figure 21B:
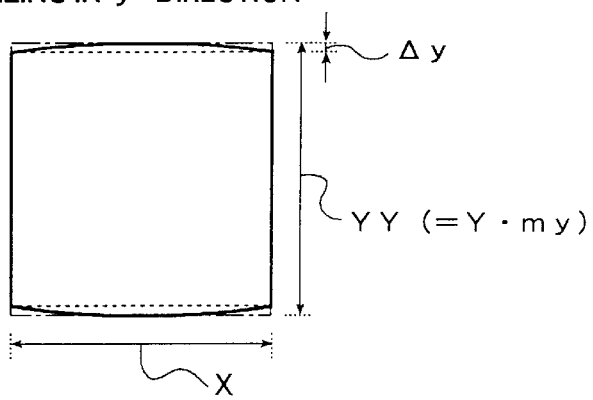
Figure 21C:
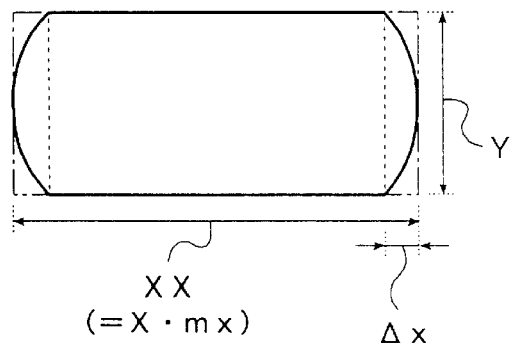

Assume a different case where the image data of the type shown in FIG. 21A is first corrected for distortion and chromatic aberration of magnification in x-direction and then subjected to electronic scaling in x-direction at the electronic scaling ratio mx. As shown in FIG. 21C, the number of pixels in x-direction is equal to the desired number XX (=X·mx) but blanks or regions having indeterminate density values occur at the four corners of the image. If the region excluding such pixel losses (the region is delineated by a thick line in FIG. 21C) is regarded as the image area, the shape of its outer edge also changes only in x-direction. While the image area has four sides to define its outer edge, the change appears on the two sides parallel to the x-direction (they are curved).

The above-described fact is used to perform the following operation in step 410. Namely, on the basis of the electronic scaling ratios mx and my calculated in step 400 and the distortion correcting data captured in step 408, Δy, or the amount of pixel loss that occurs when distortion and chromatic aberration of magnification are corrected in y-direction (more specifically, Δy denotes the amount by which the two sides parallel to y-direction are curved; see FIG. 21B) and Δx, or the amount of pixel loss that occurs when distortion and chromatic aberration of magnification are corrected in x-direction (more specifically, Δx denotes the amount by which the two sides parallel to x-direction are curved; see FIG. 21C) are each computed.

In next step 412, the percentage of vignetting in x-direction (=2*Δx/XX) that occurs when distortion and chromatic aberration of magnification are corrected in x-direction and then electronic scaling is effected in x-direction and the percentage of vignetting in y-direction (=2*Δy/YY) that occurs when distortion and chromatic aberration of magnification are corrected in y-direction and then electronic scaling is effected in y-direction are each computed. To understand the percentage of vignetting, first consider the image area represented by the image data that has been corrected for distortion and chromatic aberration of magnification and subjected to electronic scaling in a specified direction (y- or x-direction); if the largest rectangular region that is inscribed in this image area (which is delineated by a thick line in FIG. 21B or 21C) is assumed as the effective image area, the percentage of vignetting represents the ratio between the number of pixels, as counted in the specified direction, in those parts which are within said image area but outside the effective image area and the total number of pixels in said image area as counted in the specified direction.

In step 414, comparison is made between the percentages of vignetting in x- and y-directions as computed in step 412 and the next step will be taken depends on which percentage of vignetting is greater. If the percentage of vignetting in x-direction is greater than that in y-direction, the process goes to step 416 and Δm, or the coefficient for fine adjustment of the electronic scaling ratio, is computed in accordance with the following equation (1) before the process goes to step 420:

$$\Delta m = XX/(XX - 2*\Delta x) \quad (1)$$

If the percentage of vignetting in y-direction is greater than that in x-direction, the process goes to step 418 and Δm is computed in accordance with the following equation (2) before the process goes to step 420:

$$\Delta m = YY/(YY - 2*\Delta y) \quad (2)$$

If the percentage of vignetting in x-direction is equal to that in y-direction, either equation (1) or (2) may be used to compute Δm. In step 420, the electronic scaling ratios mx and my are corrected in accordance with the following equations by using Δm as computed in step 416 or 418:

$$mx' = mx \cdot \Delta m$$

$$my' = my \cdot \Delta m$$

In next step 422, the corrected amounts of pixel loss Δx' and Δy' are computed in accordance with the following equations by using mx' and my' as computed in step 420:

$$\Delta x' = (XX' - XX)/2 = (X \cdot mx' - XX)/$$

$$\Delta y' = (YY' - YY)/2 = (Y \cdot my' - YY)/2$$

Thus, in order to determine mx' and my', Δm is first calculated from the amount of pixel loss in whichever of the x- and y-directions that cause the higher percentage of vignetting and then mx and my in the x- and y-directions are corrected with the same coefficient Δm. Therefore, if electronic scaling is performed in x- and y-directions at the corrected ratios mx' and my', together with distortion and chromatic aberration of magnification are each corrected in x- and y-directions, the largest rectangular region that is inscribed in the image area represented by the processed image data is such that the numbers of pixels in x- and y-directions coincide with the desired pixel numbers XX and YY, respectively. The rectangular region of interest can be extracted by trimming the image area represented by said processed image data in the following manner: the parts corresponding to Δx' are excluded from the two sides parallel to the x-axis and the parts corresponding to Δy' are excluded from the two sides parallel to the y-axis.

In next step 424, the conditions for the various image processing schemes to be performed by the portion 256 of the image processor 340 are computed as already mentioned above, whereupon the auto-setup process ends. If the image data to be processed is LF image data, the thus computed image processing conditions are subjected to a verification step and, when the image processor 340 performs image processing on the image data, they are notified to said processor (or its controller 250 to be more exact) together with the center position of the image as computed in step 404, the data for correcting distortion and chromatic aberration of magnification that correspond to the lens type as identified in step 406, the corrected electronic scaling ratios mx' and my' as determined in step 420, and the corrected amounts of pixel loss Δx' and Δy' as determined in step 422.

When the prescan of the photographic film ends, the scanner 214 performs fine scan to read the same photographic film for each film image at a higher resolution than in the prescan. To effect fine scan, the reading conditions for individual film images are notified to the scanner 214 from the auto-setup engine 344 so that the scanner 214 reads the individual film images (performs fine scan) in accordance with the notified reading conditions.

As the result of the fine scan, the image data (fine scanned image data) is supplied from the scanner 214 into the image processing unit 216; the input image data passes through the line scanner correcting portions 322 and the selector 332 to be fed into the image processor 340, where image processing is performed in the one-dimensional image processing portion 254 in the y-direction which corresponds to the order of image data input. If the photographic film to be processed that is set on the scanner 214 has the image taken or recorded with cameras other than LF, the one-dimensional image processing portion 254 performs only electronic scaling in y-direction in the one-dimensional electronic scaling part 262 in accordance with the electronic scaling ratio my that has been calculated in step 400 of the previous auto-setup process.

If the photographic film to be processed has the image taken or recorded with an LF, the correction of distortion, the correction of chromatic aberration of magnification and electronic scaling are respectively performed in y-direction in the one-dimensional image processing portion 254. The individual functional parts of the one-dimensional image processing portion 254 perform their own operations. First, the one-dimensional distortion correcting amount calculating part 258 does the following: with reference being made to the center position of the image as calculated by the previous auto-setup process in step 404, the coordinates (x, y) of each pixel in the input image data are transformed to the coordinates ($x_P$, $y_P$) in an $x_P y_P$ coordinate system (see FIG. 18B), namely, they are normalized to $x_P = x - x_{PO}$ and $y_P = y - y_{PO}$; thereafter, for the pixel having the normalized coordinates $(x_P, y_P)$ and with the coordinates $(x_P, y_P)$ being used as a key, the corresponding amount of distortion in the y-direction $Dy(x_P, y_P)$ is searched from the distortion correcting data notified from the auto-setup engine 344; the coordinates of data $R(x_P, y_P)$, $G(x_P, y_P)$ and $B(x_P, y_P)$ which represent the density values of R, G and B colors in the pixel having the coordinates $(x_P, y_P)$ are transformed in accordance with the following formulae; and these steps are repeated for all pixels:

$R(x_P, y_{PR}') \leftarrow R(x_P, y_P)$ $G(x_P, y_{PG}') \leftarrow G(x_P, y_P)$ $B(x_P, y_{PB}') \leftarrow B(x_P, y_P)$ where $y_{PR}'=y_{PG}'=y_{PB}'+y_P+Dy(x_P, y_P)$ The one-dimensional magnification chromatic aberration correcting amount calculating part 260R does the following: for the R data of the pixel having the normalized coordinates $(x_P, y_P)$, namely, the pixel having the coordinates $(x_P, y_{PR}')$ after the correction of distortion in y-direction, and with the coordinates $(x_P, y_P)$ being used as a key, the corresponding amount of R's chromatic aberration of magnification in the y-direction $\Delta Ry(x_P, y_P)$ is searched from the R's magnification chromatic aberration correcting data notified from the auto-setup engine 344; the coordinates of data $R(x_P, y_{PR}')$ that represent the density value of R in the pixel having the coordinates value $(x_P, y_{PR}')$ after the correction of distortion in y-direction are transformed in accordance with the following formula; and these steps are repeated for all pixels:

$R(x_P, y_{PR}) \leftarrow R(x_P, y_{PR}')$ where $$y_{PR} = y'_{PR} + \Delta Ry(x_P, y_P)$$
$$= y_P + Dy(x_P, y_P) + \Delta Ry(x_P, y_P).$$

Further, the one-dimensional magnification chromatic aberration correcting amount calculating part 260B does the following: for the B data of the pixel having the normalized coordinates $(x_P, y_P)$, namely, the pixel having the coordinates $(x_P, y_{PB}')$ after the correction of distortion in y-direction, and with the coordinates $(x_P, y_P)$ being used as a key, the corresponding amount of B's chromatic aberration of magnification in the y-direction $\Delta By(x_P, y_P)$ is searched from the B's magnification chromatic aberration correcting data notified from the auto-setup engine 344; the coordinates of data $B(x_P, y_{PB}')$ that represent the density value of B in the pixel having the coordinates value $(x_P, y_{PB}')$ after the correction of distortion in y-direction are transformed in accordance with the following formula; and these steps are repeated for all pixels:

$B(x_P, y_{PB}) \leftarrow B(x_P, y_{PB}')$ where $$y_{PB} = y'_{PB} + \Delta By(x_P, y_P)$$
$$= y_P + Dy(x_P, y_P) + \Delta By(x_P, y_P).$$

By these procedures, the distortion is corrected in y-direction and the R and B chromatic aberration of magnifications are corrected in y-direction, whereupon the positions of the individual pixels represented by the image data are shifted in the y-direction for each of the R, G and B colors in an independent manner.

The one-dimensional electronic scaling part 262 does the following: it first determines the inherent position of each pixel in the original image in y-direction for the case where Y, or the number of pixels in the original image as counted in the y-direction, was changed to $YY'(=Y \cdot my')$ on the basis of the corrected electronic scaling ratio my' in y-direction as calculated in step 420 of the previous auto-setup process (said inherent position is hereunder expressed by the coordinates $(x_P, y_{PO})$).

Then, the density value of R at the position of the coordinates $(x_P, y_{PO})$ is determined by arithmetic operations for interpolation on the basis of data $R(x_P, y_{PR})$ that has been subjected to the correction of distortion and chromatic aberration of magnification and which is located in two adjacent positions interposed by the coordinates $(x_P, y_{PO})$ in y-direction. The density value of G at the position of the coordinates $(x_P, y_{PO})$ is determined by arithmetic operations for interpolation on the basis of data $G(x_P, y_{PG})$ that has been subjected to the correction of distortion and chromatic aberration of magnification and which is located in two adjacent positions interposed by the coordinates $(x_P, y_{PO})$ in y-direction. The density value of B at the position of the coordinates $(x_P, y_{PO})$ is determined by arithmetic operations for interpolation on the basis of data $B(x_P, y_{PB})$ that has been subjected to the correction of distortion and chromatic aberration of magnification and which is located in two adjacent positions interposed by the coordinates $(x_P, y_{PO})$ in y-direction. These procedures are repeated for all pixels to complete electronic scaling in the y-direction.

If the image data representing an image having X pixels in x-direction and Y pixels in y-direction (see FIG. 22A) is corrected for distortion and chromatic aberration of magnification and subjected to electronic scaling in y-direction according to the procedures described above, the image area excluding blanks or regions having indeterminate density values has an outer edge that is curved on two of the four edge-defining sides of the image area that are parallel to the y-direction and has a maximum of YY' pixels in the y-direction (see FIG. 22B).

The effective image area extracting part 264 does the following: in accordance with the corrected amount of pixel loss $\Delta y'$ as calculated in step 422 of the previous auto-setup process and with reference being made to the center position of the image, the region corresponding to $\Delta y'$ (pixel loss) is excluded from both sides of the image area parallel to the y-direction so that the effective image area is extracted. In this way, the effective image area extracting part 264 extracts image data that still has X pixels in x-direction but in which the number of pixels in y-direction has been brought into agreement with the desired number YY (see FIG. 22C).

When the image processing has been thusly performed in the y-direction, the controller 250 allows the image data output from the one-dimensional image processing portion 254 to be stored temporarily in the frame memory 342 via the switching portion 252. Therefore, the controller 250 controls, via the memory controller 338, the order of reading the image data such that it is read from the frame memory 342 in an order different from the raster scan direction by 90 degrees. The thus read image data are sequentially input to the one-dimensional image processing portion 254.

Then, the correction of distortion, the correction of chromatic aberration of magnification and electronic scaling are respectively performed in x-direction in the one-dimensional image processing portion 254. The individual functional parts of the one-dimensional image processing portion 254 perform their own operations. First, the one-dimensional distortion correcting amount calculating part 258 does the following: with reference being made to the center position of the image, for the pixel in the input image data that has the coordinates value $(x_P, y_{PO})$ and with the coordinates ($x_P$, $y_{PO}$) being used as a key, the corresponding amount of distortion in the x-direction $Dx(x_P, y_{PO})$ is searched from the distortion correcting data notified from the auto-setup engine 344 (if the amount of distortion at the coordinates ($x_P$, $y_{PO}$) is not stored as data, it is determined by arithmetic operations for interpolation on the basis of the amounts of distortion in surrounding positions of the coordinates described above); the coordinates of data $R(x_P, y_{PO})$, $G(x_P, y_{PO})$ and $B(x_P, y_{PO})$ which represent the density values of R, G and B colors in the pixel having the coordinates ($x_P$, $y_{PO}$) are transformed in accordance with the following formulae; and these steps are repeated for all pixels:

$R(x_{PR}', y_{PO}) \leftarrow R(x_P, y_{PO})$ $G(x_{PG}, y_{PO}) \leftarrow G(x_P, y_{PO})$ $B(x_{PB}', y_{PO}) \leftarrow B(x_P, y_{PO})$ where $x_{PR}' = x_{PG} = x_{PB}' = x_P + Dx(x_P, y_{PO})$ The one-dimensional magnification chromatic aberration correcting amount calculating part 260R does the following: for the R data of the pixel having the coordinates value ($x_P$, $y_{PO}$) before the correction of distortion in x-direction, namely, the pixel having the coordinates value ($x_{PR}'$, $y_{PO}$) after the correction of distortion in x-direction, and with the coordinates ($x_P$, $y_{PO}$) being used as a key, the corresponding amount of R's chromatic aberration of magnification in the x-direction $\Delta Rx(x_P, y_{PO})$ is searched from the R's magnification chromatic aberration correcting data notified from the auto-setup engine 344 (if the amount of chromatic aberration of magnification at the coordinates ($x_P$, $y_{PO}$) is not stored as data, it is calculated by arithmetic operations for interpolation as described above); the coordinates of data $R(x_{PR}', y_{PO})$ that represent the density value of R in the pixel having the coordinates value ($x_{PR}'$, $y_{PO}$) after the correction of distortion in x-direction are transformed in accordance with the following formula; and these steps are repeated for all pixels:

$R(x_{PR}', y_{PO}) \leftarrow R(x_{PR}', y_{PO})$ where $$x_{PR} = x_{PR}' + \Delta Rx(x_P, y_{PO})$$
$$= x_P + Dy(x_P, y_{PO}) + \Delta Rx(x_P, y_{PO}).$$

Further, the one-dimensional magnification chromatic aberration correcting amount calculating part 260B does the following: for the B data of the pixel having the coordinates ($x_P$, $y_{PO}$) before the correction of distortion in x-direction, namely, the pixel having the coordinates value ($x_{PR}'$, $y_{PO}$) after the correction of distortion in x-direction, and with the coordinates ($x_P$, $y_{PO}$) being used as a key, the corresponding amount of B's chromatic aberration of magnification in the x-direction $\Delta Bx(x_P, y_{PO})$ is searched from the B's magnification chromatic aberration correcting data notified from the auto-setup engine 344; the coordinates of data $B(x_{PB}', y_{PO})$ that represent the density value of B in the pixel having the coordinates value ($x_{PB}'$, $y_{PO}$) after the correction of distortion in x-direction are transformed in accordance with the following formula; and these steps are repeated for all pixels:

$B(x_{PB}, y_{PO}) \leftarrow B(x_{PB}', y_{PO})$ where $$x_{PB} = x_{PB}' + \Delta Bx(x_P, y_{PO})$$
$$= x_P + Dx(x_P, y_{PO}) + \Delta Bx(x_P, y_{PO}).$$

By these procedures, the distortion is corrected in x-direction and the R and B chromatic aberration of magnifications are corrected in x-direction, whereupon the positions of the individual pixels represented by the image data are shifted in the x-direction for each of the R, G and B colors in an independent manner.

The one-dimensional electronic scaling part 262 does the following: it first determines the inherent position of each pixel in the original image in x-direction for the case where X, or the number of pixels in the original image as counted in the x-direction, was changed to XX'(=X·mX') on the basis of the corrected electronic scaling ratio mx' in x-direction as calculated in step 420 of the previous auto-setup process (said inherent position is hereunder expressed by the coordinates value ($x_{PO}$, $y_{PO}$)).

Then, the density value of R at the position of the coordinates value ($x_{PO}$, $y_{PO}$) is determined by arithmetic operations for interpolation on the basis of data $R(x_{PR}, y_{PO})$ that has been subjected to the correction of distortion and chromatic aberration of magnification and which is located in two adjacent positions interposed by the coordinates ($x_{PO}$, $y_{PO}$) in x-direction. The density value of G at the position of the coordinates value ($x_{PO}$, $y_{PO}$) is determined by arithmetic operations for interpolation on the basis of data $G(x_{PG}, y_{PO})$ that has been subjected to the correction of distortion and chromatic aberration of magnification and which is located in two adjacent positions interposed by the coordinates value ($x_{PO}$, $y_{PO}$) in x-direction. The density value of B at the position of the coordinates value ($x_{PO}$, $y_{PO}$) is determined by arithmetic operations for interpolation on the basis of data $B(x_{PB}, y_{PO})$ that has been subjected to the correction of distortion and chromatic aberration of magnification and which is located in two adjacent positions interposed by the coordinates value ($x_{PO}$, $y_{PO}$) in x-direction. These procedures are repeated for all pixels to complete electronic scaling in the x-direction.

If the image data representing an image having X pixels in x-direction and YY pixels in y-direction (see FIG. 22C) is corrected for distortion and chromatic aberration of magnification and subjected to electronic scaling in x-direction according to the procedures described above, the image area excluding blanks or regions having indeterminate density values has an outer edge that is curved on two of the four edge-defining sides of the image area that are parallel to the x-direction and has a maximum of XX' pixels in the x-direction (see FIG. 22D).

The effective image area extracting part 264 does the following: in accordance with the corrected amount of pixel loss Δx' as calculated in the previous auto-setup process and with reference being made to the center position of the image, the region corresponding to Δx' (pixel loss) is excluded from both sides of the image area parallel to the x-direction so that the effective image area is extracted. In this way, the effective image area extracting part 264 extracts image data that has the number of pixels in y-direction maintained at the desired value YY and in which the number of pixels in x-direction has been brought into agreement with the desired number XX (see FIG. 22E). This provides image data that has been corrected the geometric distortion and color divergence due to the lens distortion and chromatic aberration of magnification in high precision in both x- and y-directions with reference to the center position of the image, that has been subjected to electronic scaling such that the numbers of pixels in x- and y-directions after removal of pixel losses agree with the desired values XX and YY, and which is free of any pixel losses.

In the example under consideration, the print size ay is set to be slightly larger than the print size ax in order to perform the "finish to slender" technique, so compared to the proportion of the size of the original image in y-direction to that in x-direction, the image represented by the image data obtained as the result of the above-described procedures has a slightly increased size in y-direction relative to the size in x-direction. Therefore, if the image to be read is a film image that shows a human subject taken from the front, he appears more slender than he actually is.

In this connection, consider the case of printing using the image data obtained by the above-described procedures. If the preset print size is such that the original image need be reduced, the percentage of reduction is greater in x-direction than in y-direction (see FIG. 23A) and the human subject 310' in the printed image is more slender than the human subject 310 in the original image. If the preset print size is such that the original image need be enlarged, the percentage of enlargement is greater in y-direction than in x-direction (see FIG. 23B) and the human subject 310" in the printed image is more slender than the human subject 310 in the original image.

After the image data has been thusly subjected not only to the image processing in the y-direction but also to the image processing in the x-direction in the one-dimensional image processing portion 254, the controller 250 allows said image data to be input to the image processing portion 256 via the switching portion 252. In the image processing portion 256, the supplied image data is subjected to various image processing schemes under the processing conditions notified from the auto-setup engine 344. The image data that has been subjected to various image processing schemes in the image processing portion 256 is delivered from the image processor 340 as output image data, which is either used for image recording on photographic paper in the laser printer unit 218 or stored in an information storage medium such as a memory card via the extension slot 374.

As described above in detail, in the image processing method and apparatus of the example under consideration, the three different image processing schemes, the correction of distortion, the correction of chromatic aberration of magnification, and electronic scaling, are performed in x- and y-directions independently of each other and these are accomplished by a single image processing means (consisting of the one-dimensional aberration correcting amount computing part 258, one-dimensional magnification chromatic correcting amount computing parts 260R, 260B, and one-dimensional electronic scaling part 262); hence, the intended image processing schemes can be performed at high speed using a simple configuration.

In the image processing method and apparatus of the example under consideration, the electronic scaling ratio used in electronic scaling is varied between x- and y-directions and, hence, prints of different sizes from standardized ones can be generated to increase the flexibility of electronic scaling.

The example under consideration has been described with particular reference to the case of applying the "finish to slender" technique by setting the electronic scaling ratio in accordance with the print size preset by the operator. However, this is not the sole case of the invention and, if desired, one may apply a known technology to determine automatically whether the film image to be read contains a human subject and perform the "finish to slender" technique with specified aspect ratios only when a human subject is contained. This alternative approach has the advantage of skipping the time required to set the print size.

The example under consideration has been described with particular reference to the case where the electronic scaling ratio used in electronic scaling and the correction coefficients used in the correction of lens aberrations are selected as parameters that are varied between x- and y-directions. However, this is not the sole case of the invention and, if desired, other parameters such as the filter coefficients of various types of filters used in the image processing apparatus and the parameters used in sharpness enhancement may be employed.

The example under consideration has been described with particular reference to the case where the correction of lens aberrations (distortion and chromatic aberration of magnification) and electronic scaling are performed in both x- and y-directions. However, this is not the sole case of the invention and, if desired, either the correction of lens aberrations or electronic scaling or both may be performed in either x- or y-direction only. In another case, the correction of the color divergence that occurs in y-direction due to the line CCDs may be corrected only in the y-direction.

The example under consideration has been described on the assumption that the invention is applied to the case of performing the "finish to slender" technique in accordance with the print size preset by the operator. However, this is not the sole case of the invention and it may be applied to the case where the reading resolution differs between the main and auxiliary scanning directions. Take, for example, the case where the image read with an area CCD sensor (which is hereunder referred to simply as "area CCD") is adjusted to a certain size. The electronic scaling ratio may be identical between the x- and y-directions since the area CCD typically has the same reading resolution in the main and auxiliary scanning directions. However, if the image read with line CCDS is to be adjusted to a certain size as in the example described above, the reading resolution in the main scanning direction may sometimes differ from that in the auxiliary scanning direction; if this is the case, the electronic scaling ratio has to be varied between the x-and y-directions.

The foregoing description concerns the case where the removal of pixel losses (the extraction of the effective image area) is achieved by the effective image area extracting part 264 in the image processor 340. However, this is not the sole case of the invention and the image processor 340 may be constructed as shown in FIG. 24; a switching portion 266 of the same configuration as the switching portion 252 is provided at the input of the one-dimensional image processing portion 254 and the effective image area extracting part 264 is omitted. In this alternative case, the controller 250 ensures that the image data output from the one-dimensional electronic scaling part 262 after it has been corrected for distortion and chromatic aberration of magnification and subjected to electronic scaling in y-direction is stored temporarily in the frame memory 342 without removing any pixel losses and controls the reading address of the image data via the memory controller 338 such that the pixel losses on both sides of the image that are parallel to the y-direction are removed as the image data is read out of the frame memory 342.

As for the removal of the pixel losses on both sides of the image that are parallel to the x-direction, the controller 250 ensures that the image data output from the one-dimensional electronic scaling part 262 after it has been corrected for distortion and chromatic aberration of magnification and subjected to electronic scaling in x-direction is stored temporarily in the frame memory 342 without removing any pixel losses and controls the reading address of the image data via the memory controller 338 such that the pixel losses on both sides of the image that are parallel to the x-direction are removed as the image data is read out of the frame memory 342. Then, the switching portion 266 is connected to the other contact so that the image data thus read out of the frame memory 342 can bypass the one-dimensional image processing portion 254 to be input to the image processing portion 256.

In the foregoing description, the deterioration in image quality due to the lens characteristics is corrected only when the image data to be processed represents a film image that was recorded on the photographic film by means of a film with lens. However, this is not the sole case of the invention and the correction may be performed in other cases such as where the image data to be processed represents a film image that was recorded on the photographic film by means of a comparatively cheap compact camera and other cameras that will undergo an extensive drop in image quality due to the lens characteristics and where the image data to be processed is stored in an information storage medium by shooting with a digital camera that undergoes an extensive drop in image quality due to the lens characteristics. The correction may also be applied to all kinds of image data irrespective of how much of the image quality may be compromised by the lens characteristics and they include the image data that represent the images recorded on recording materials by using lenses and the image data obtained by shooting with lenses.

In the foregoing description, the correction of distortion, chromatic aberration of magnification, electronic scaling and the extraction of the effective image area are first performed in y-direction, then in x-direction. Selecting this order is based on the following fact: considering the curvature of field of the lens, a particular LF is designed according to the bulge aberration of the lens surface such that the image is exposed and recorded on the photographic film as it is curved in y-direction and, accordingly, the image exposed and recorded on the photographic film by means of the particular LF is geometrically or otherwise distorted by a smaller amount in y-direction than in x-direction (this is also the case of FIG. 22B, in which the corrected amount of pixel loss $\Delta y'$ is greater than the curvature on the two sides of the image that are parallel to the y-direction). Therefore, the above-described correction and processing schemes may be performed first in x-direction, then in y-direction; alternatively, the order of performing the correction and processing schemes (from y-direction to x-direction and vice versa) may be changed according to the lens type, the model of cameras including LF, and other factors.

The foregoing description also assumes that the geometric distortion of the image caused by lens distortion and the color divergence of the image due to the chromatic aberration of magnification of the lens are both corrected in the one-dimensional image processing portion 254. However, this is not the sole case of the invention and either one of the stated corrections alone may be performed in the one-dimensional image processing portion 254.

If the image recorded on a recording material such as a photographic film is read with an image reading apparatus such as the scanner 12 to produce the image data to be processed, the deterioration in image quality due to the characteristics of the lens provided in the image reading apparatus may also be corrected.

As described on the foregoing pages in detail, the image processing method according to the fifth embodiment of the invention is so designed that image data representing the image recorded on an image recording medium is subjected to image processing in either the first direction or the second direction crossing said first direction or both directions. As a result, the image processing of the image data can be performed at high speed. If the image processing is to be performed in both the first and second directions, the contents of the image processing in the first direction are changed from those in the second direction; hence, compared to the case of making no changes in their contents, the intended image processing schemes can be performed with a higher degree of flexibility.

In the preferred case of the image processing method according to the fifth embodiment, the contents of image processing are changed by varying the values of parameters in image processing between the first and second directions; hence, highly flexible image processing can be accomplished by a simple method of changing the values of pertinent parameters.

In the image processing apparatus according to the fifth embodiment of the invention, image data representing the image recorded on an image recording medium is subjected to image processing in either the first direction or the second direction crossing said first direction or both directions. As a result, the image processing of the image data can be performed at high speed. If the image processing is to be performed in both the first and second directions, the contents of the image processing in the first direction are changed from those in the second direction; hence, compared to the case of making no changes in their contents, the intended image processing schemes can be performed with a higher degree of flexibility. As a further advantage, if the image processing is to be performed in both the first and second directions, the image processing in the first direction and that in the second direction can be executed by a single image processing means and this helps simplify the construction of the image processing apparatus.

In a preferred case of the image processing apparatus according to the fifth embodiment, the contents of image processing are changed by varying the values of parameters in image processing between the first and second directions; hence, as in the preferred case of the image processing method according to the fifth embodiment, highly flexible image processing can be accomplished by a simple method of changing the values of pertinent parameters.

Described above are the basic features of the image processing method according to the fifth embodiment of the invention, as well as the basic construction of the image processing apparatus for implementing the method.

While the image processing method and apparatus of the invention have been described above with reference to many examples, the invention is by no means limited to these examples only and various improvements and design modifications are of course possible without departing from the scope and spirit of the invention.

What is claimed is:

1. An image processing method, comprising the steps of:
   acquiring not only input image data from the image recorded optically with a taking lens but also an information about the taking lens used to record said image;
   obtaining lens characteristics of said taking lens from the acquired lens information; and
   performing image processing schemes on said input image data by using the obtained lens characteristics and a position information for said recorded image;

wherein said input image data is subjected to the image processing schemes in a first direction of said recorded image and a second direction crossing the first direction and wherein said imaae processing schemes are performed in said first and second directions independently of each other.

2. The image processing method according to claim 1, wherein said image processing schemes include at least one of correction of aberrations derived from said taking lens, electronic scaling and sharpening.

3. The image processing method according to claim 2, wherein said correction of the aberrations includes at least one of distortion, chromatic aberration of magnification, deterioration of marginal lumination, and defocusing.

4. The image processing method according to claim 1, wherein an order of said image processing schemes is selectable in said first and second directions.

5. The image processing method according to claim 1, further comprising the step of:

performing unidirectional image processing in at least one of said first and second directions.

6. The image processing method according to claim 5, wherein when said input image data is acquired by line sensors that read the image recorded on a film, said unidirectional image processing is color divergence correction that corrects the color divergence derived from said line sensors.

7. The image processing method according to claim 1, wherein contents of said image processing schemes are altered in each of said first and second directions.

8. The image processing method according to claim 7, wherein the contents of said image processing schemes are altered by changing a kind or degree of said image processing schemes.

9. The image processing method according to claim 7, wherein the contents of said image processing schemes are altered by changing values of parameters in the image processing schemes in each of said first and second directions.

10. The image processing method according to claim 9, wherein parameters in said image processing schemes are at least one of a filter coefficient of a filter used; a correction coefficient for correction of distortion; a correction coefficient for correction of chromatic aberration of magnification; a correction coefficient for correction of deterioration of marginal lumination; a correction coefficient for correction of defocusing; an electronic scaling ratio; and a coefficient of sharpening.

11. The image processing method according to claim 1, wherein if said image processing schemes include at least correction of distortion and chromatic aberration of magnification, either an amount of correction of chromatic aberration of magnification or an amount of correction of distortion or both amounts differ between said first and second directions.

12. The image processing method according to claim 1, wherein if said image processing schemes include at least correction of distortion and chromatic aberration of magnification, the correction in whichever of said first and second directions that requires the chromatic aberration of magnification and distortion to be corrected in smaller amounts precedes the correction in the other direction.

13. The image processing method according to claim 1, wherein if said input image data is acquired by photoelectric reading of said recorded image with line sensors that have said first direction as a main scanning direction and said second direction as an auxiliary scanning direction, said image processing schemes in said second direction further include correction of color divergence caused by said line sensors.

14. The image processing method according claim 1, wherein said first and second directions cross at right angles.

15. An image processing apparatus which acquires input image data from the image recorded optically with a taking lens and performs specified image processing schemes on the input image data to produce output image data, comprising: acquisition means for acquiring an information about the taking lens used to record said image;

storage means for storing characteristics of said taking lens in accordance with the information about said taking lens; and image processing means which performs the image processing schemes on said input image data in both a first direction of said recorded image and a second direction crossing the first direction, by using an information about pixel positions of the input image and the characteristics of the related taking lens as read from said storage means in accordance with the information about the taking lens acquired by said acquisition means, wherein said image processing means performs said image processing schemes in said first and second directions independently of each other.

16. The image processing apparatus according to claim 15, wherein said image processing means has at least two parts of first and second distortion correcting parts that correct distortion in said first and second directions, respectively; first and second magnification chromatic aberration correcting parts that correct chromatic aberration of magnification in said first and second directions, respectively; first and second marginal lumination deterioration correcting parts that correct deterioration of marginal lumination in said first and second directions, respectively; first and second defocusing correcting parts that correct defocusing in said first and second directions, respectively; first and second electronic scaling parts that perform electronic scaling in said first and second directions, respectively; and first and second sharpening parts that perform sharpening in said first and second directions, respectively.

17. The image processing apparatus according to claim 15, wherein said image processing means has a first image processing part and a second image processing part that perform image processing schemes independently of each other in said first and second directions.

18. The image processing apparatus according to claim 17, wherein said image processing means is capable of selecting an order of said image processing schemes that are performed by said first and second image processing parts.

19. The image processing apparatus according to claim 15, further including unidirectional image processing means for performing unidirectional image processing in at least one of said first and second directions.

20. The image processing apparatus according to claim 19, wherein if said input image data is acquired by line sensors that read the image recorded on a film, said unidirectional image processing means has a color divergence correcting part that corrects the color divergence derived from said line sensors.

21. The image processing apparatus according to claim 15, further including control means for altering contents of said image processing schemes in each of said first and second directions.

22. The image processing apparatus according to claim 21, wherein said control means alters the contents of said image processing schemes by changing a kind or degree of said image processing schemes.

23. The image processing apparatus according to claim 21, wherein said control means alters the contents of said image processing schemes by changing values of parameters in the image processing schemes in each of said first and second directions.

24. The image processing apparatus according to claim 23, wherein the parameters in said image processing schemes are at least one of a filter coefficient of a filter used; a correction coefficient for correction of distortion; a correction coefficient for correction of chromatic aberration of magnification; a correction coefficient for correction of deterioration of marginal lumination; a correction coefficient for correction of defocusing; an electronic scaling ratio; and a coefficient of sharpening.

25. The image processing apparatus according to claim 15, wherein if said image processing means includes at least a distortion correcting part and a magnification chromatic aberration correcting part, either an amount of correction of chromatic aberration of magnification or an amount of correction of distortion or both amounts in said distortion and magnification chromatic aberration correcting parts differ between said first and second directions.

26. The image processing apparatus according to claim 15, wherein if said image processing means includes at least a distortion correcting part and a magnification chromatic aberration correcting part, correction in whichever of said first and second directions that requires chromatic aberration of magnification and distortion to be corrected in smaller amounts precedes the correction in the other direction.

27. The image processing apparatus according to claim 15, which, if said input image data is acquired by photoelectric reading of said recorded image with line sensors that have said first direction as a main scanning direction and said second direction as an auxiliary scanning direction, further includes a color divergence correcting part that corrects the color divergence derived from said line sensors in said second direction.

28. The image processing apparatus according to claim 15, wherein said image processing means allows said first and second directions to cross at right angles.

29. An image processing method, comprising the step of subjecting image data representing an image recorded on an image recording medium to image processing schemes in either a first direction or a second direction crossing said first direction or both directions, wherein if said image processing schemes are to be performed in both said first and second directions, contents of the image processing schemes in each of said first and second directions are altered.

30. The image processing method according to claim 29, wherein the contents of said image processing schemes are altered by changing values of parameters in the image processing schemes in each of said first and second directions.

31. An image processing apparatus comprising:

image processing means for performing unidirectional image processing schemes on image data that represents an image recorded on an image recording medium; and control means for controlling said image processing means such that image processing schemes are performed on said image data in either a first direction or a second direction crossing said first direction or both directions, wherein if said control means controls said image processing means such that said image processing schemes are performed in both said first and second directions, said control means alters contents of said image processing schemes in each of said first and second directions.

32. The image processing apparatus according to claim 32, wherein said control means alters the contents of said image processing schemes by changing values of parameters in the image processing schemes in each of said first and second directions.

33. The image processing apparatus according to claim 32, wherein the parameters in said image processing schemes comprise at least one of a filter coefficient of a filter used; a coefficient of sharpening; a correction coefficient for correction of aberrations; and an electronic scaling ratio.

* * * * *